United States Patent
Ferren et al.

(10) Patent No.: US 12,403,494 B2
(45) Date of Patent: Sep. 2, 2025

(54) WORK VEHICLE SPRAYER SYSTEM AND METHOD WITH NOZZLE MONITORING

(71) Applicant: Deere & Company, Moline, IL (US)

(72) Inventors: Bran Ferren, Beverly Hills, CA (US); Donald Lariviere, Glendale, CA (US); Houstin Lichtenwalner, Macungie, PA (US); Omar Peraza, Canyon Country, CA (US); Robert Liebersbach, Glendale, CA (US)

(73) Assignee: DEERE & COMPANY, Moline, IL (US)

( * ) Notice: Subject to any disclaimer, the term of this patent is extended or adjusted under 35 U.S.C. 154(b) by 50 days.

(21) Appl. No.: 17/383,050

(22) Filed: Jul. 22, 2021

(65) Prior Publication Data
US 2022/0062934 A1   Mar. 3, 2022

Related U.S. Application Data

(60) Provisional application No. 63/070,611, filed on Aug. 26, 2020.

(51) Int. Cl.
*B05B 12/04* (2006.01)
*B05B 12/00* (2018.01)
(Continued)

(52) U.S. Cl.
CPC .......... *B05B 12/004* (2013.01); *B05B 15/528* (2018.02); *B05B 15/55* (2018.02);
(Continued)

(58) Field of Classification Search
CPC ....... B05B 12/00; B05B 12/02; B05B 12/004; B05B 12/008; B05B 12/08; B05B 15/40;
(Continued)

(56) References Cited

U.S. PATENT DOCUMENTS

| | | |
|---|---|---|
| 336,089 A | 2/1886 | Chamberland |
| 492,161 A | 2/1893 | Hill |

(Continued)

FOREIGN PATENT DOCUMENTS

| | | |
|---|---|---|
| DE | 102014010843 A1 | 1/2016 |
| EP | 0409817 A1 | 1/1991 |

(Continued)

OTHER PUBLICATIONS

Marwala et al., "Computational intelligence for condition monitoring." arXiv preprint arXiv:0705.2604 (2007) (Year: 2007).*

(Continued)

*Primary Examiner* — Catherine T. Rastovski
*Assistant Examiner* — Matthew W. Baca
(74) *Attorney, Agent, or Firm* — KLINTWORTH & ROZENBLAT LLP

(57) ABSTRACT

A nozzle monitoring system is provided for a sprayer system of a work vehicle. The system includes a first sensor configured to generate signals associated with vibrations of a first nozzle apparatus on the work vehicle that disperses a primary fluid from the sprayer system during operation; and a controller having a processor receiving the signals generated by the first sensor and having a memory coupled to the processor and storing instructions. The processor executes the stored instructions to: convert the vibrations into a frequency domain representation; generate an image from the frequency domain representation; classify the image to generate a clog condition probability; and generate, based on the clog condition probability, a command to initiate a cleaning event of the first nozzle apparatus.

20 Claims, 26 Drawing Sheets

(51) Int. Cl.
*B05B 15/528* (2018.01)
*B05B 15/55* (2018.01)
*G01H 1/00* (2006.01)
*G06F 18/21* (2023.01)
*G06T 5/10* (2006.01)

(52) U.S. Cl.
CPC .............. *G01H 1/00* (2013.01); *G06F 18/21* (2023.01); *G06T 5/10* (2013.01); *G06F 2218/12* (2023.01)

(58) Field of Classification Search
CPC ......... B05B 15/50; B05B 15/52; B05B 15/55; B05B 15/528; B05B 15/5225; B05B 1/14; B05B 1/3026; B05B 9/0403; B05B 9/0423; B05B 9/0426; B05B 9/06; B05B 13/005; G01H 1/00; G06F 18/21; G06F 18/211; G06F 2218/00; G06F 2218/12; G06T 5/10; A01M 7/0089; A01M 7/005; A01G 25/09; A01B 79/005
See application file for complete search history.

(56) References Cited

U.S. PATENT DOCUMENTS

| | | |
|---|---|---|
| 774,175 A | 11/1904 | Heard |
| 895,768 A | 8/1908 | Koenigkramer et al. |
| 1,130,725 A | 3/1915 | Getts |
| 1,199,350 A | 9/1916 | Collin |
| 1,689,277 A | 10/1928 | Burns |
| 1,691,867 A | 11/1928 | Burns |
| 1,803,477 A | 5/1931 | Kullander |
| 1,858,352 A | 5/1932 | Young |
| 1,906,391 A | 5/1933 | Mckinley |
| 1,944,267 A | 1/1934 | Rathbun |
| 1,979,200 A | 10/1934 | Hoare |
| 1,987,142 A | 1/1935 | Clements |
| 2,125,532 A | 8/1938 | Wells |
| 2,173,060 A | 9/1939 | Andrews |
| 2,204,349 A | 6/1940 | Forrest |
| 2,246,866 A | 6/1941 | Striblig et al. |
| 2,338,418 A | 1/1944 | Forrest et al. |
| 2,338,419 A | 1/1944 | Forrest et al. |
| 2,372,445 A | 3/1945 | Morgan |
| 2,399,994 A | 5/1946 | Feagin |
| 2,606,663 A | 8/1952 | Blackman et al. |
| 2,959,359 A | 11/1960 | Casaletto |
| 3,017,029 A | 1/1962 | Berninger |
| 3,365,065 A | 1/1968 | Varjabedian |
| 3,445,002 A | 5/1969 | Muller |
| 3,463,397 A | 8/1969 | Mecklin et al. |
| 3,491,949 A | 1/1970 | Hairston |
| 3,550,775 A | 12/1970 | Cooley |
| 3,550,861 A | 12/1970 | Teson |
| 3,623,607 A | 11/1971 | Loos |
| 3,762,563 A | 10/1973 | Petersen |
| 3,850,802 A | 11/1974 | Berger |
| 3,853,762 A | 12/1974 | Moatti |
| 3,974,964 A | 8/1976 | Pearce et al. |
| 3,994,810 A | 11/1976 | Schaeffer |
| 4,042,153 A | 8/1977 | Callahan et al. |
| 4,042,504 A | 8/1977 | Drori |
| 4,081,171 A | 3/1978 | Morgan et al. |
| 4,156,651 A | 5/1979 | Mehoudar |
| 4,243,034 A | 1/1981 | Brandt |
| 4,295,963 A | 10/1981 | Drori |
| 4,360,037 A | 11/1982 | Kendall |
| 4,454,033 A | 6/1984 | Verduyn |
| 4,518,501 A | 5/1985 | Lennartz et al. |
| 4,532,036 A | 7/1985 | Clifford |
| 4,549,961 A | 10/1985 | Bellemann et al. |
| 4,552,655 A | 11/1985 | Granot |
| 4,564,127 A | 1/1986 | Garabedian et al. |
| 4,602,742 A | 7/1986 | Penson |
| 4,624,785 A | 11/1986 | Drori |
| 4,632,757 A | 12/1986 | Rosenberg |
| 4,638,924 A | 1/1987 | Newsom |
| RE32,537 E | 11/1987 | Drori |
| 4,714,196 A | 12/1987 | McEachern et al. |
| 4,725,004 A | 2/1988 | Baran, Jr. |
| 4,762,615 A | 8/1988 | Drori |
| 4,789,104 A | 12/1988 | Anderson |
| 4,821,959 A | 4/1989 | Browning |
| 4,826,083 A | 5/1989 | Vanderjagt |
| 4,844,346 A | 7/1989 | Coffey |
| 4,854,482 A | 8/1989 | Bergner |
| 4,859,335 A | 8/1989 | Whyte |
| 4,906,357 A | 3/1990 | Drori |
| 4,913,345 A | 4/1990 | Setter |
| 4,949,656 A | 8/1990 | Lyle et al. |
| 4,967,957 A | 11/1990 | Bachman |
| 4,970,973 A | 11/1990 | Lyle et al. |
| 4,986,454 A | 1/1991 | Riley |
| 5,013,461 A | 5/1991 | Drori |
| 5,014,914 A | 5/1991 | Wallenäs |
| 5,016,779 A | 5/1991 | Williamson |
| 5,016,817 A | 5/1991 | Ghate et al. |
| 5,074,999 A | 12/1991 | Drori |
| 5,087,365 A | 2/1992 | Davis et al. |
| 5,106,500 A | 4/1992 | Hembree et al. |
| 5,127,581 A | 7/1992 | Kuwana et al. |
| 5,164,079 A | 11/1992 | Klein |
| 5,190,218 A | 3/1993 | Kayser et al. |
| 5,198,111 A | 3/1993 | Davis |
| RE34,218 E | 4/1993 | Drori |
| 5,223,137 A | 6/1993 | Hattori et al. |
| 5,228,993 A | 7/1993 | Drori |
| 5,232,156 A * | 8/1993 | Csordas ................. B05B 15/50 239/117 |
| 5,260,875 A | 11/1993 | Tofte et al. |
| 5,323,963 A | 6/1994 | Ballu |
| 5,364,539 A | 11/1994 | Castagno et al. |
| 5,372,350 A | 12/1994 | Kawabe |
| 5,433,380 A | 7/1995 | Hahn |
| 5,497,946 A | 3/1996 | Laidler |
| 5,527,462 A | 6/1996 | Davis et al. |
| 5,545,321 A | 8/1996 | Drori |
| 5,558,761 A | 9/1996 | Elliot-Moore et al. |
| 5,569,383 A | 10/1996 | Vander Ark, Jr. et al. |
| 5,591,339 A | 1/1997 | Robinson |
| 5,632,907 A | 5/1997 | Norbury |
| 5,653,389 A | 8/1997 | Henderson et al. |
| 5,704,546 A | 1/1998 | Henderson et al. |
| 5,733,464 A | 3/1998 | Bunch |
| 5,788,466 A | 8/1998 | Thompson |
| 5,804,072 A | 9/1998 | Yang |
| 5,824,229 A | 10/1998 | Larkey et al. |
| 5,833,144 A | 11/1998 | Kinter |
| 5,855,799 A | 1/1999 | Herrmann |
| 5,858,231 A | 1/1999 | Drori |
| 5,901,745 A | 5/1999 | Buchtel |
| 5,911,362 A | 6/1999 | Wood et al. |
| 5,918,808 A | 7/1999 | Weddle |
| 5,967,066 A | 10/1999 | Giles et al. |
| 6,029,904 A | 2/2000 | Taylor |
| 6,056,210 A | 5/2000 | Weddle |
| 6,062,496 A | 5/2000 | Kinter |
| 6,077,422 A | 6/2000 | Ryles |
| 6,138,770 A | 10/2000 | Kayser |
| 6,251,294 B1 | 6/2001 | Davis et al. |
| 6,318,563 B1 | 11/2001 | Drori |
| 6,318,706 B1 | 11/2001 | Montaz |
| 6,395,186 B1 | 5/2002 | De Kock et al. |
| 6,438,239 B1 * | 8/2002 | Kuchen ................. B05B 12/082 239/74 |
| 6,443,312 B1 | 9/2002 | Racine |
| 6,475,397 B1 | 11/2002 | Sanderson |
| 6,637,452 B1 | 10/2003 | Alman |
| 6,749,131 B2 | 6/2004 | Knight |
| 6,787,046 B2 | 9/2004 | De Kock et al. |
| 6,833,071 B2 | 12/2004 | Duby |
| 6,957,798 B1 | 10/2005 | Schmidt |
| 6,958,118 B2 | 10/2005 | Hill et al. |

(56) References Cited

U.S. PATENT DOCUMENTS

| | | |
|---|---|---|
| 7,055,699 B2 | 6/2006 | Takatsuka |
| 7,093,721 B2 | 8/2006 | Imanse et al. |
| 7,124,961 B2 | 10/2006 | Wilting |
| 7,311,004 B2 | 12/2007 | Giles |
| 7,322,556 B2 | 1/2008 | Bernstein |
| 7,445,166 B2 | 11/2008 | Williams |
| 7,765,875 B2 | 8/2010 | Guo |
| 7,811,454 B2 | 10/2010 | Duby |
| 7,845,914 B2 | 12/2010 | Engelbrecht et al. |
| 7,883,624 B2 | 2/2011 | Robert et al. |
| 8,001,889 B2 | 8/2011 | Gaugenrieder et al. |
| 8,133,397 B2 | 3/2012 | Duby |
| 8,524,075 B1 | 9/2013 | Quintel |
| 8,574,436 B2 | 11/2013 | Duby |
| 8,640,972 B2 | 2/2014 | Otto et al. |
| 8,821,720 B2 | 9/2014 | Lee et al. |
| 8,828,223 B2 | 9/2014 | Savage et al. |
| 9,016,526 B2 | 4/2015 | Evans et al. |
| 9,067,223 B2 | 6/2015 | Fulkerson et al. |
| 9,327,218 B2 | 5/2016 | Linster et al. |
| 9,347,570 B2 | 5/2016 | Shamir et al. |
| 9,415,332 B2 | 8/2016 | Shaw et al. |
| 9,527,039 B2 | 12/2016 | Dale et al. |
| 9,532,681 B2 | 1/2017 | Savage et al. |
| 9,545,588 B2 | 1/2017 | Lee et al. |
| 9,550,557 B2 | 1/2017 | Lee et al. |
| 9,561,455 B2 | 2/2017 | Fraser et al. |
| 9,616,363 B2 | 4/2017 | Osman Oguz |
| 9,669,335 B2 | 6/2017 | Takahashi |
| 9,795,977 B2 | 10/2017 | Grimm et al. |
| 9,839,867 B2 | 12/2017 | Estes et al. |
| 10,035,085 B2 | 7/2018 | Cartarius et al. |
| 10,046,253 B2 | 8/2018 | Takahashi et al. |
| 10,220,138 B2 | 3/2019 | Bolz |
| 10,238,243 B1 | 3/2019 | Coulston et al. |
| 10,265,658 B2 | 4/2019 | Chia |
| 10,306,879 B2 | 6/2019 | Proharam |
| 10,369,585 B2 | 8/2019 | Brooks et al. |
| 10,420,333 B2 | 9/2019 | Mellin |
| 10,433,674 B2 | 10/2019 | Savage et al. |
| 10,444,048 B2 | 10/2019 | Humpal et al. |
| 10,499,562 B2 | 12/2019 | Schwalbe et al. |
| 10,525,384 B2 | 1/2020 | Takahashi |
| 10,532,299 B2 | 1/2020 | Prost et al. |
| 10,568,257 B2 | 2/2020 | Shivak |
| 10,631,531 B2 | 4/2020 | Engelbrecht et al. |
| 10,646,801 B2 | 5/2020 | Tameroglu |
| 10,712,187 B2 | 7/2020 | Posselius et al. |
| 10,751,764 B2 | 8/2020 | Dagan |
| 10,773,215 B2 | 9/2020 | Kulkarni et al. |
| 10,842,143 B2 | 11/2020 | Humpal et al. |
| 10,875,039 B1 | 12/2020 | Coulston et al. |
| 11,051,505 B2 | 7/2021 | Humpal et al. |
| 11,071,247 B2 | 7/2021 | Shivak et al. |
| 11,140,891 B2 | 10/2021 | Wahabzada et al. |
| 11,148,158 B2 | 10/2021 | Engelbrecht et al. |
| 11,160,204 B2 | 11/2021 | Michael |
| 11,192,128 B2 | 12/2021 | Posselius et al. |
| 11,213,846 B1 | 1/2022 | Sandey et al. |
| 11,219,156 B2 | 1/2022 | Davis et al. |
| 11,219,912 B2 | 1/2022 | Bharatiya et al. |
| 11,220,421 B1 | 1/2022 | Sandey et al. |
| 11,231,305 B2 | 1/2022 | Conrad et al. |
| 11,235,914 B2 | 2/2022 | Pozzi |
| 11,241,004 B2 | 2/2022 | Bharatiya et al. |
| 11,241,706 B2 | 2/2022 | Needham |
| 11,406,096 B2 | 8/2022 | Brooks et al. |
| 11,445,080 B1 | 10/2022 | Hornback |
| 11,590,522 B2 | 2/2023 | Booher et al. |
| 11,596,964 B2 | 3/2023 | Hendrickson et al. |
| 11,612,160 B2 | 3/2023 | Krosschell et al. |
| 11,659,828 B2 | 5/2023 | Grimm et al. |
| 11,708,061 B2 | 7/2023 | Sandey et al. |
| 11,744,239 B2 | 9/2023 | Kocer et al. |
| 11,779,006 B2 | 10/2023 | Ballu |
| 11,786,849 B2 | 10/2023 | Trask et al. |
| 11,801,464 B2 | 10/2023 | Jibert |
| 12,092,136 B2 | 9/2024 | Judge et al. |
| 2002/0040868 A1 | 4/2002 | Lockwood |
| 2003/0213756 A1 | 11/2003 | Duby |
| 2004/0104152 A1 | 6/2004 | Mukai |
| 2005/0000277 A1* | 1/2005 | Giles ............... A01M 7/0089 |
| | | 73/114.51 |
| 2005/0045537 A1 | 3/2005 | Imanse |
| 2005/0211608 A1 | 9/2005 | Lockwood |
| 2007/0164048 A1 | 7/2007 | Lou |
| 2008/0017568 A1 | 1/2008 | Robert et al. |
| 2008/0114498 A1 | 5/2008 | Giles et al. |
| 2008/0271618 A1* | 11/2008 | Gaugenrieder ....... B05B 15/555 |
| | | 101/147 |
| 2008/0282905 A1 | 11/2008 | Savage et al. |
| 2012/0193376 A1 | 8/2012 | Evans |
| 2012/0292402 A1 | 11/2012 | Otto et al. |
| 2013/0206862 A1 | 8/2013 | Worden et al. |
| 2014/0231320 A1 | 8/2014 | Lee et al. |
| 2014/0238911 A1 | 8/2014 | Lee et al. |
| 2014/0246378 A1 | 9/2014 | Lee et al. |
| 2014/0272035 A1 | 9/2014 | Estes et al. |
| 2014/0284358 A1 | 9/2014 | Evans et al. |
| 2014/0305862 A1 | 10/2014 | Zur et al. |
| 2014/0366493 A1 | 12/2014 | Takahashi |
| 2015/0174513 A1 | 6/2015 | Shaw et al. |
| 2016/0030963 A1 | 2/2016 | Southern |
| 2016/0121356 A1 | 5/2016 | Ballu |
| 2016/0250572 A1 | 9/2016 | Takahashi et al. |
| 2017/0006852 A1 | 1/2017 | Engelbrecht et al. |
| 2017/0014736 A1 | 1/2017 | Osman Oguz |
| 2018/0015395 A1 | 1/2018 | Prost et al. |
| 2018/0111135 A1 | 4/2018 | Zito, Jr. et al. |
| 2020/0003659 A1* | 1/2020 | Davies ............... G01R 19/2513 |
| 2021/0023482 A1 | 1/2021 | Eisen et al. |
| 2021/0154604 A1 | 5/2021 | Trask et al. |
| 2022/0047973 A1 | 2/2022 | Eisen et al. |
| 2022/0062922 A1 | 3/2022 | Ferren et al. |
| 2022/0062934 A1 | 3/2022 | Ferren et al. |
| 2022/0062939 A1 | 3/2022 | Ferren et al. |
| 2022/0062940 A1 | 3/2022 | Ferren et al. |
| 2022/0397114 A1 | 12/2022 | Krutzenbichler et al. |
| 2023/0182046 A1 | 6/2023 | Gilboa |

FOREIGN PATENT DOCUMENTS

| | | |
|---|---|---|
| EP | 0482369 A1 | 4/1992 |
| GB | 987723 A1 | 3/1965 |
| JP | 2016107179 A | 6/2016 |

OTHER PUBLICATIONS

Chen et al., "An Acoustic Signal Identification Method Based on Convolutional Neural Networks," 2019 2nd International Conference on Safety Produce Informatization (IICSPI), Chongqing, China, 2019, pp. 12-16. (Year: 2019).*

John Deere 3D Nozzle YouTube, Enhanced Utility Flat Fan Nozzle, https://www.youtube.com/watch?v=XwqZ9fSIEMw&t=62s, Jul. 2017. (3 pages).

John Deere New ExactApply Nozzle Control System, YouTube, https://www.youtube.com/watch?v=vV33kXDC0jk, Jul. 2017. (3 pages).

John Deere Self-Propelled Application Equipment Brochure, Jun. 2018. (32 pages).

John Deere website printout of Sprayers & Applicators, 400 & 600 Series Sprayers, https://www.deere.com/en/sprayers/, Jul. 21, 2021. (12 pages).

Wikipedia, Nyquist frequency, Apr. 9, 2021. (3 pages).

TensorFlow, An end-to-end open source machine learning platform software, undated, admitted prior art. (11 pages).

Extended European Search Report and Written Opinion issued in European Patent Application No. 21189389.6, dated Feb. 1, 2022, in 10 pages.

Extended European Search Report and Written Opinion issued in European Patent Application No. 21189394.6 dated Feb. 10, 2022, in 05 pages.

(56) References Cited

OTHER PUBLICATIONS

Extended European Search Report and Written Opinion issued in European Patent Application No. 21189397.9 dated Feb. 10, 2022, in 05 pages.
Extended European Search Report and Written Opinion issued in European Patent Application No. 21189401.9 dated Jan. 1, 2022, in 07 pages.
USPTO Non-Final Office Action issued in U.S. Appl. No. 17/383,027 dated Apr. 29, 2024.
USPTO Non-Final Office Action issued in U.S. Appl. No. 17/383,071 dated May 3, 2024.
USPTO Final Office Action issued in U.S. Appl. No. 17/383,027 dated Oct. 31, 2024.

* cited by examiner

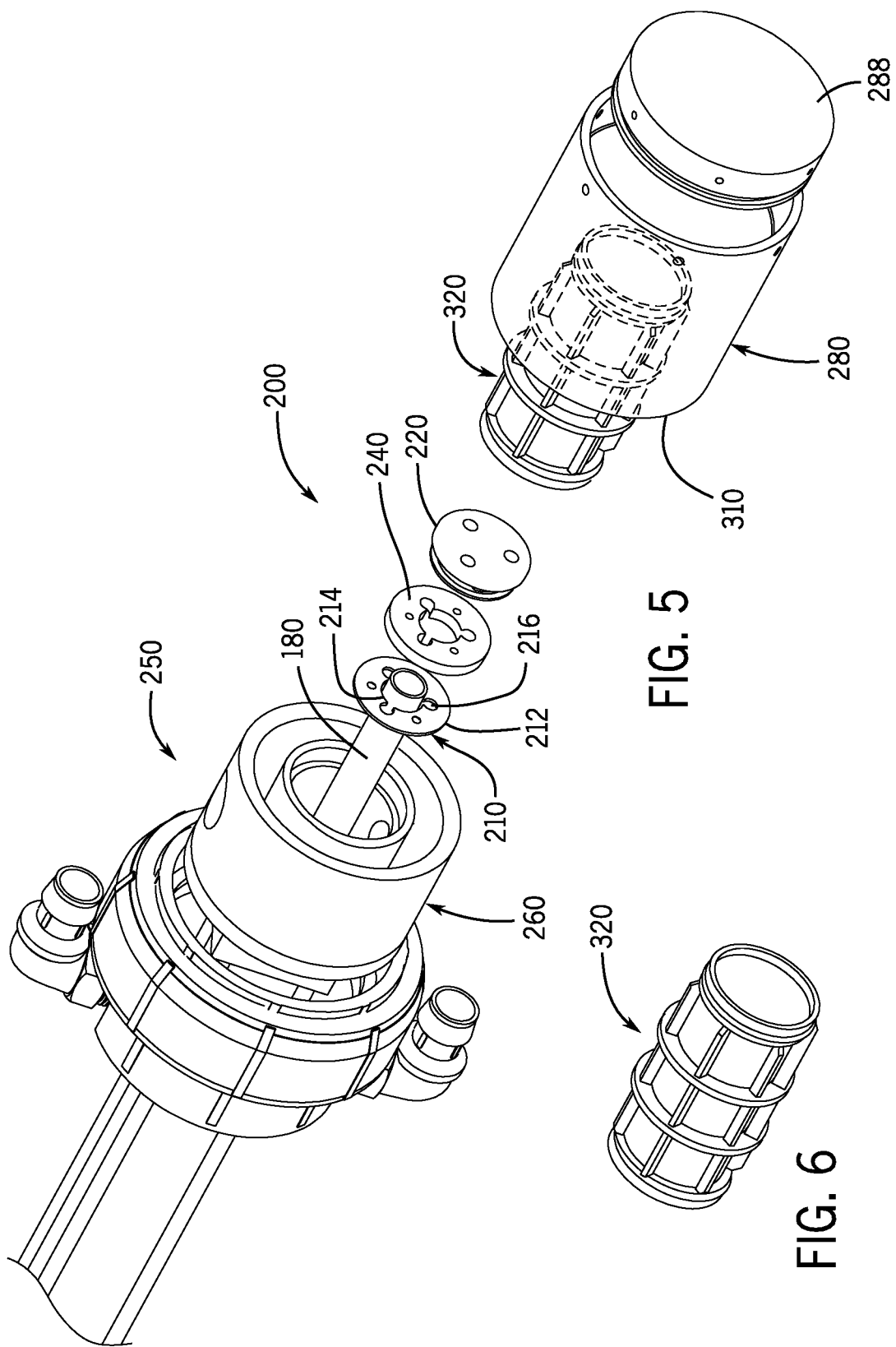

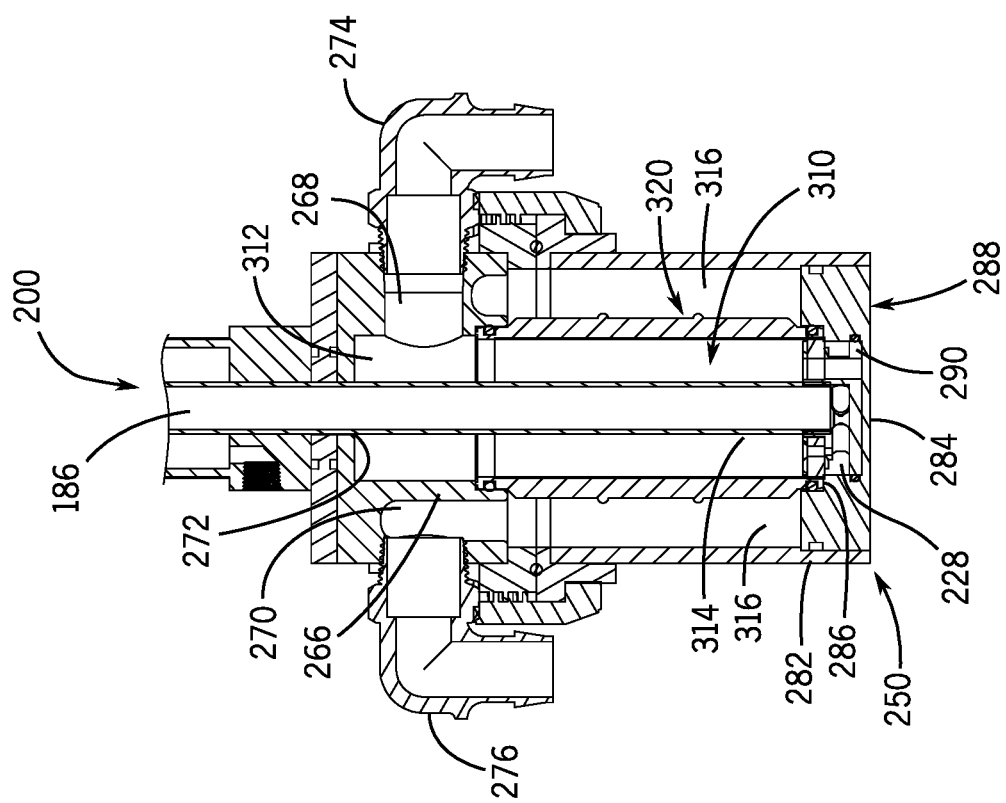
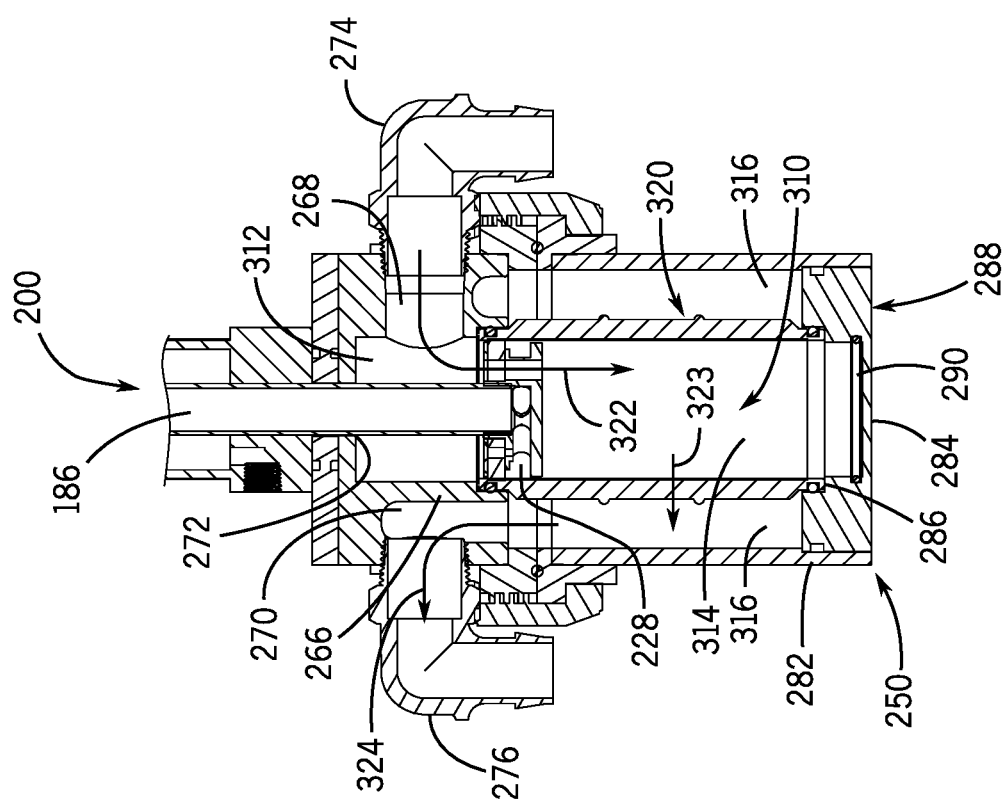
FIG. 8A
FIG. 8B

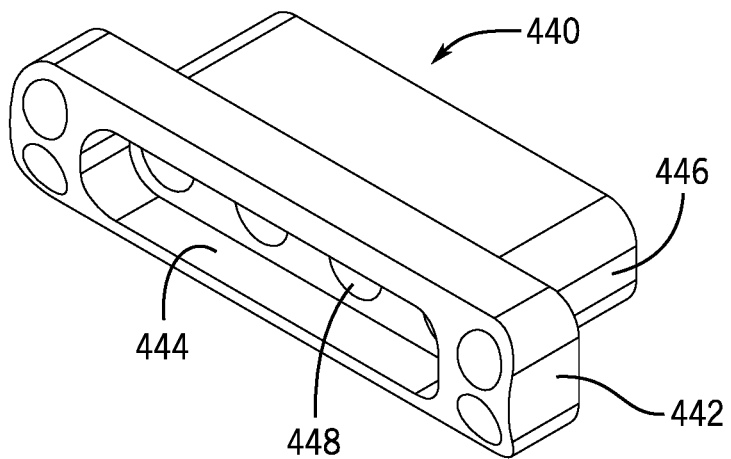
FIG. 16A
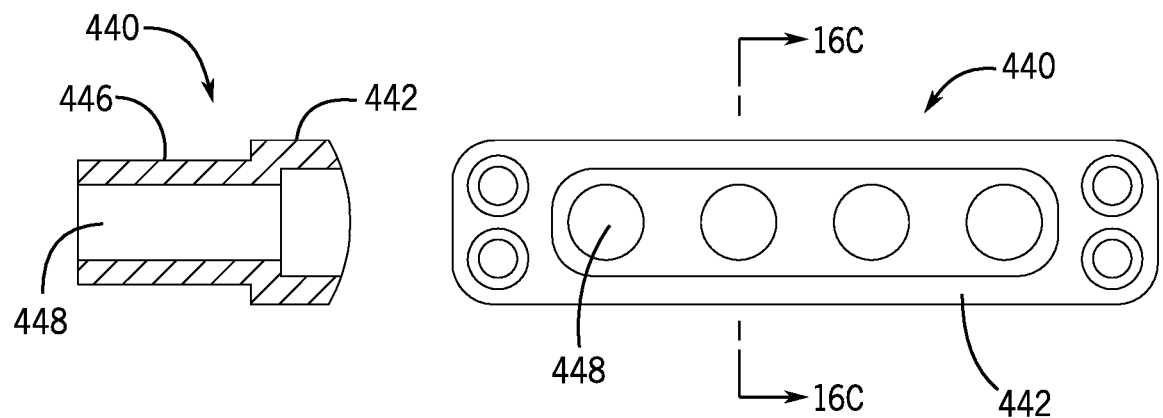
FIG. 16C
FIG. 16B

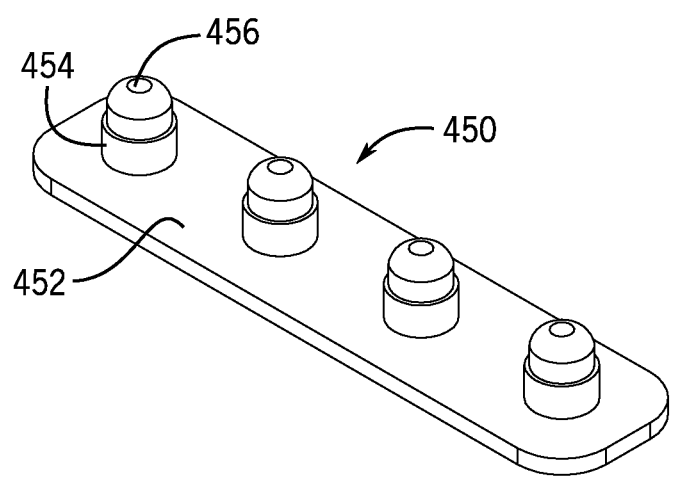
FIG. 17A
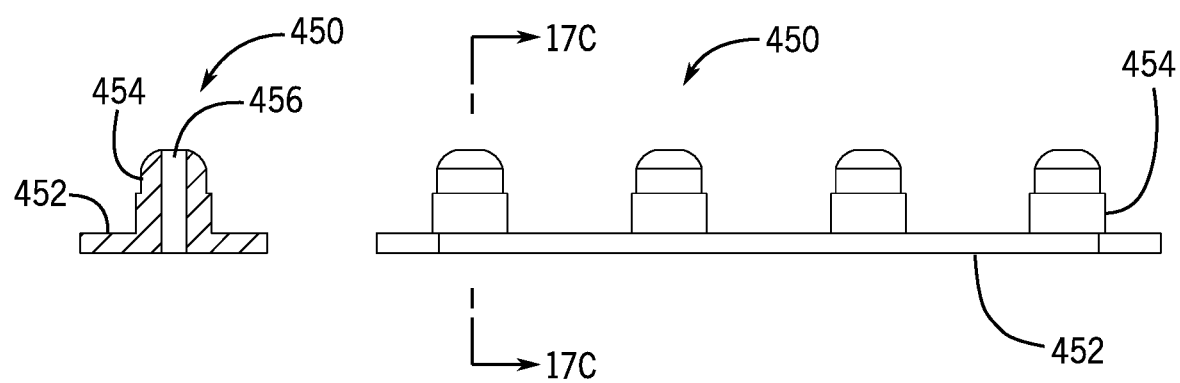
FIG. 17C
FIG. 17B

WORK VEHICLE SPRAYER SYSTEM AND METHOD WITH NOZZLE MONITORING

CROSS-REFERENCE TO RELATED APPLICATION(S)

This application is a nonprovisional application of, and claims priority to U.S. Provisional Patent Application 63/070,611, filed Aug. 26, 2020 and incorporated herein by reference.

STATEMENT OF FEDERALLY SPONSORED RESEARCH OR DEVELOPMENT

Not applicable.

FIELD OF THE DISCLOSURE

This disclosure generally relates to fluid sprayer systems such as those used in agriculture, manufacturing, and industrial applications.

BACKGROUND OF THE DISCLOSURE

Agricultural sprayer systems use a collection of components like filter and nozzle apparatuses for distributing one or more types of fluids, such as fertilizer, pesticide, fungicide, herbicides, water, insecticide, adjuvants, chemical products, or combinations thereof over a field or other type of geographical area. The sprayer system may have numerous filter and nozzle apparatuses. Proper functioning of such apparatuses ensure that fluid dispersal occurs evenly and as expected, thereby improving operational efficiency and agricultural yields.

SUMMARY OF THE DISCLOSURE

The disclosure provides a system and method for monitoring, evaluating, and addressing clog and debris issues associated with a sprayer system.

In one aspect, a nozzle monitoring system is provided for a sprayer system of a work vehicle. The system includes a first sensor configured to generate signals associated with vibrations of a first nozzle apparatus on the work vehicle that disperses a primary fluid from the sprayer system during operation; and a controller having a processor receiving the signals generated by the first sensor and having a memory coupled to the processor and storing instructions. The processor executes the stored instructions to: convert the vibrations into a frequency domain representation generate an image from the frequency domain representation; classify the image to generate a clog condition probability; and generate, based on the clog condition probability, a command to initiate a cleaning event of the first nozzle apparatus.

In a further aspect, a sprayer system is provided for dispersing a primary fluid on a work vehicle. The sprayer system includes at least a first nozzle apparatus configured to disperse the primary fluid and to execute a cleaning event; a first sensor configured to generate signals associated with vibrations of the first nozzle apparatus during operation; and a controller having a processor receiving the signals generated by the first sensor and having a memory coupled to the processor and storing instructions. The processor executes the stored instructions to: convert the vibrations into a frequency domain representation; generate an image from the frequency domain representation; classify the image with a neural network to generate a clog condition probability; compare the clog condition probability to a clog condition threshold; and generate, when the clog condition probability meets or exceeds the clog condition threshold, a command to initiate the cleaning event of the first nozzle apparatus.

The details of one or more embodiments are set forth in the accompanying drawings and the description below. Other features and advantages will become apparent from the description, the drawings, and the claims.

BRIEF DESCRIPTION OF THE DRAWINGS

FIG. 5 is a partial exploded view of the filter apparatus of FIG. 3 according to an example embodiment;

FIG. 6 is an isometric view of a screen device of the filter apparatus of FIG. 3 according to an example embodiment;

FIGS. 8A and 8B are cross-sectional views of a portion of the filter apparatus of FIG. 3 respectively depicting the plunger assembly in a nominal position and a cleaning position according to an example embodiment;

FIGS. 16A-16C are various views of a nozzle retainer of the switching nozzle apparatus of FIGS. 10 and 11 according to an example embodiment;

FIGS. 17A-17C are various views of a nozzle array of the switching nozzle apparatus of FIGS. 10 and 11 according to an example embodiment;

Like reference symbols in the various drawings indicate like elements.

DETAILED DESCRIPTION

Figure 1:
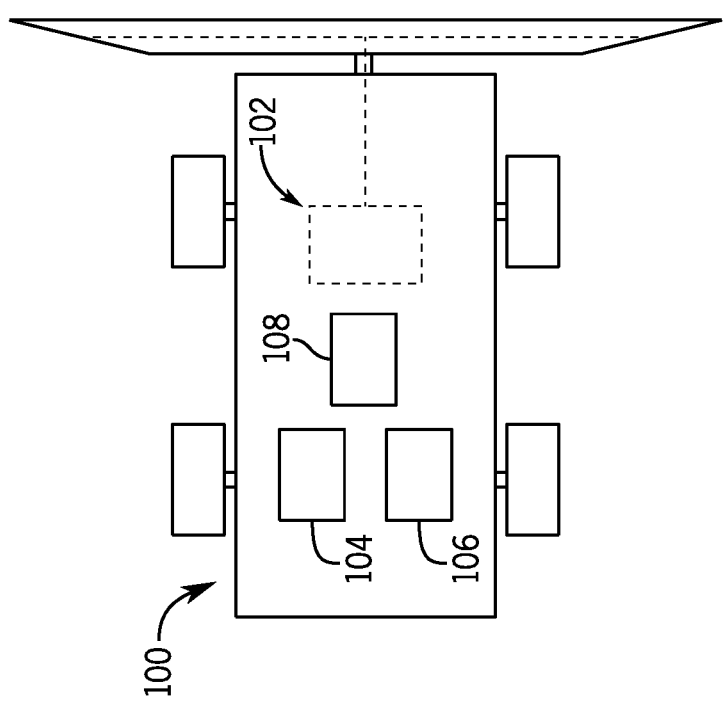
FIG. 1 illustrates an agricultural work vehicle in which a spraying system may be used according to an example embodiment.

The following describes one or more example embodiments of the disclosed system and method, as shown in the accompanying figures of the drawings described briefly above. Various modifications to the example embodiments may be contemplated by one of skill in the art.

Agricultural sprayer systems use a collection of components like filter and nozzle apparatuses for distributing one or more types of fluids, such as fertilizer, pesticide, fungicide, water, or insecticide, accurately and/or appropriately over a field or other type of geographical area. In addition to the fluid intended for dispersal, the fluid may contain "debris," including dirt, dust, constituent suspensions, inert materials, micro-encapsulated materials, biological materials, or fluid coagulation, that may lead to blockages or other types of clogs that impede fluid flow. In particular, the sprayer systems may include an array of nozzles distributed across large booms in which each nozzle has one or more relatively small passageways that are especially susceptible to clogs. Such clogs may be difficult to identify and/or address due to the location and overall number of nozzles. Clogged nozzles may adversely impact fluid distribution, work efficiency, and agricultural efficacy.

In various examples, the sprayer systems described below provide mechanisms to identify and address debris and clogs, including one or more self-cleaning filter apparatuses, one or more self-cleaning nozzle apparatuses, and/or a nozzle monitoring system to identify the nozzle clogs and/or to command the nozzle apparatuses to initiate the cleaning event.

In one example, the self-cleaning filter apparatus may include a filter unit that houses a screen device that, during nominal operation, filters at least a portion of debris out of the primary fluid. The filter apparatus may further include a plunger unit coupled to the filter unit and having a plunger rod supporting a plunger assembly within the interior of the screen device that, upon actuation, executes a cleaning event in which a friction element of the plunger assembly contacts the interior surface of the screen device to dislodge at least a portion of the debris. The plunger assembly further includes a flow plate that functions to direct the dislodged debris out of the filter unit and out of the filter apparatus.

In a further example, sprayer system may include a first nozzle apparatus, referenced below as a switching nozzle apparatus, that performs a self-cleaning function during a cleaning event. The switching nozzle apparatus includes a manifold defining a nozzle cavity into which a nozzle holder is incorporated. The nozzle holder may support one or more components, including one or more nozzle elements, that define an internal partial flow path. The switching nozzle apparatus further includes an actuator that is coupled to selectively pivot the nozzle holder and the associated internal partial flow path within the manifold. As a result, the nozzle holder within the switching nozzle apparatus may have a first or nominal position in which the internal partial flow path is aligned with the primary fluid inlet and outlet of the manifold to distribute the primary fluid during typical operation. Moreover, during a cleaning event, the actuator may pivot the nozzle holder such that the associated internal partial flow path is aligned with a cleaning flow path in which air and/or primary fluid may be used to dislodge debris of a potential clog within the nozzle elements and to direct the debris out of the switching nozzle apparatus.

In a further example, the sprayer system may include a second nozzle apparatus, referenced below as a pinching nozzle apparatus, that performs a self-cleaning function during a cleaning event and/or an adjustment function during a spray adjustment event. The pinching nozzle apparatus includes a support plate supporting a sprayer manifold onto which a nozzle element is mounted and a pincher gear assembly onto which pinchers are arranged surrounding the nozzle element. Generally, an actuator may drive the pincher gear assembly between a pinched position in which the nozzle element is at least partially closed and/or squeezed by pincher elements and an unpinched position in which the nozzle element is more open with respect to the pinched position and/or unsqueezed by the pincher elements. In effect, the repositioning of the pincher elements functions to modify the cross-sectional shape of the nozzle element. During a cleaning event, a controller commands the repositioning of the pincher elements in order to dislodge debris of a potential clog within the nozzle element and direct the debris out of the pinching nozzle apparatus. During a spray adjustment event, the controller commands the repositioning of the pincher elements in order to modify a spray pattern of the fluid out of the nozzle element of the pinching nozzle apparatus. In some implementations, the actuator may drive the pincher gear assembly between one or more intermediate pinched positions in which the pincher elements are driven to modify the cross-sectional shapes into other cross-sectional shapes (e.g., that are "less pinched" than those of the pinched position).

In a further example, a nozzle monitoring system and method may be used within or associated with the sprayer system to identify and address a partially or fully clogged nozzle element by initiating a cleaning event. Generally, one or more sensors may be used to collect nozzle or vehicle vibrations in the form of audio signatures or waveforms that may be converted into images of Mel-frequency cepstrum scale (MFC) coefficient, which may in turn be classified by a neural network to generate a clog condition probability representing the presence (or absence) of a clogged nozzle element used to selectively initiate the cleaning event.

It will also be understood that, while terms such as "top," "bottom," "upper," "lower," "clockwise," "counterclockwise", "above," "below," "front," "back," and the like may be utilized below with respect to an orientation or operation depicted in a particular figure, such terms may be used in a relative sense and are not intended to limit the disclosure to the particular orientation or operation described. Various modifications to the example embodiments may be contemplated by one of skill in the art.

As will be discussed in greater detail below, the sprayer system may include one or more filter apparatuses, one or more nozzle apparatuses, and one or more nozzle clog monitoring systems, which may be used in combination or individually. The overall sprayer system will be briefly described prior to a more detailed discussion of more specific aspects.

FIG. 1 is an example work vehicle 100 in which a sprayer system 102 may be primarily implemented to distribute and/or disperse a primary fluid (e.g., fertilizer, insecticide, water, or other fluid) across a geographical area (e.g., a field). Generally, the sprayer system 102 may be implemented in, or associated with, any suitable type of work machine or work vehicle 100. In one embodiment, the work vehicle 100 is in the form of a self-propelled vehicle (e.g., a tractor) that houses or otherwise supports the sprayer system 102. In some examples, portions of the sprayer system 102 may be towed behind the work vehicle 100. In various implementations, the work vehicle 100 may be either a manned or autonomous vehicle. In some implementations, the work vehicle 100 may be an aerial vehicle. Moreover, in some examples, the work vehicle 100 may be omitted and the sprayer system 102 may be implemented in a stationary or stand-alone sprayer system, such as an irrigation system. Additional details regarding an example sprayer system 102 are provided below.

Although not described in detail, the work vehicle 100 may be formed by a vehicle frame supporting a cab and powertrain that generates power for propulsion and/or other tasks to be performed by the work vehicle 100. For example, such a powertrain may include an engine, transmission, steering system, wheels, and the like for propelling and maneuvering the work vehicle 100, either autonomously or based on commands by the operator. The work vehicle 100 may include various other components or systems that are typical on work vehicles, including actuation systems, lubrication and cooling systems, battery systems, exhaust treatment systems, braking systems, and the like.

The work vehicle 100 may further include a vehicle controller 104 (or multiple controllers) to control various aspects of the operation of the work vehicle 100, including operation of the sprayer system 102. For example, the vehicle controller 104 may facilitate automatic or manual maneuvering of the work vehicle 100 traversing the field and actuation of the sprayer system 102. As more specific examples, the controller 104 may implement one or more mechanisms for detecting and addressing clogs and/or accumulation of debris within sprayer system 102, including within the one or more filter apparatuses and/or one or more nozzle apparatuses of the sprayer system 102, as discussed in greater detail below.

Generally, the vehicle controller 104 (or others) may be configured as a computing device with associated processor devices and memory architectures, as a hard-wired computing circuit (or circuits), as a programmable circuit, as a hydraulic, electrical or electro-hydraulic controller, or otherwise. As such, the vehicle controller 104 may be configured to execute various computational and control functionality with respect to the work vehicle 100 and sprayer system 102. In some embodiments, the vehicle controller 104 may be configured to receive input signals in various formats from a number of sources (e.g., including from the operator via operator interfaces 106 and various sensors 108, as well as units and systems onboard or remote from the work vehicle 100); and in response, the vehicle controller 104 generates one or more types of commands for implementation by the various systems on or outside the work vehicle 100.

In some embodiments, the vehicle controller 104 may be configured to receive input commands and to interface with an operator via human-vehicle (or "operator") interface 106 in the form of one or more operator input devices and/or one or more display devices, which may be disposed inside the cab of the work vehicle 100 for easy access by the vehicle operator. The input devices of the operator interface 106 may be configured in a variety of ways, including one or more joysticks, various switches or levers, one or more buttons, a touchscreen interface, a keyboard, a speaker, a microphone associated with a speech recognition system, or various other human-machine interface devices. In some examples, the input devices of the operator interface 106 may be used to actuate or otherwise operate the sprayer system 102. A display device of the operator interface 106 may be implemented as a flat panel display or other display type that is integrated with an instrument panel or console of the work vehicle 100. As such, the display device of the operator interface 106 may include any suitable technology for displaying information, including, but not limited to, a liquid crystal display (LCD), light emitting diode (LED), organic light emitting diode (OLED), plasma, or a cathode ray tube (CRT). In some examples, the display device of the operator interface 106 may function to provide information associated with the sprayer system 102, including the identification and/or actuation associated with the accumulation of debris or the clogging of one or more filter or nozzle apparatuses, as discussed in greater detail below.

As introduced above, the work vehicle 100 further includes various sensors 108 that function to collect information associated with the work vehicle 100. Such information may be provided to the vehicle controller 104 for evaluation and, if necessary or desired, for actuation in response. In one example, one or more of the sensors 108 may be associated with the sprayer system 102, including one or more filter apparatus sensors and/or one or more nozzle apparatus sensors, as discussed in greater detail below.

Figure 2:
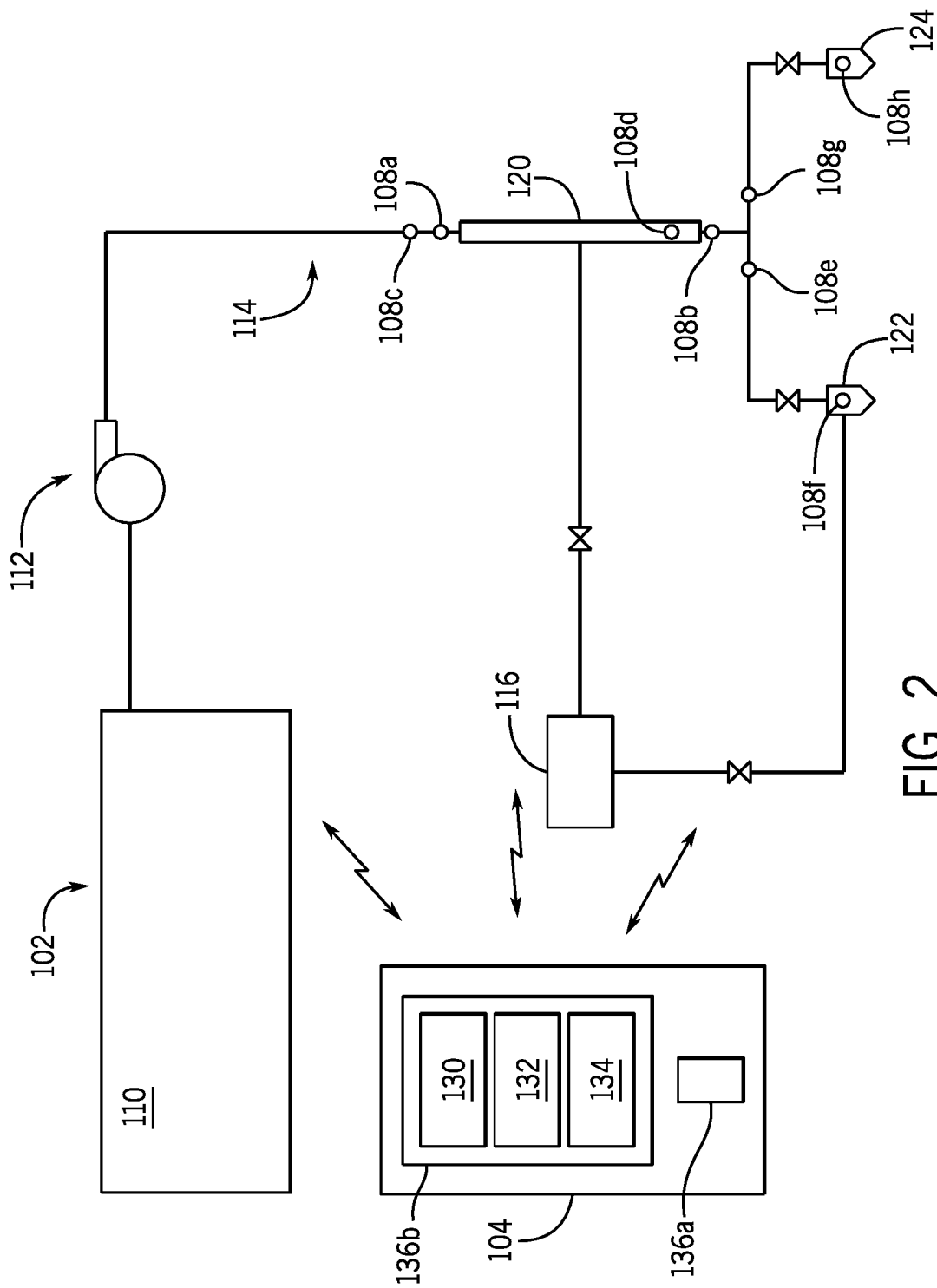
FIG. 2 is a schematic block diagram of the sprayer system of FIG. 1 according to an example embodiment.

FIG. 2 provides a simple schematic example of the sprayer system 102. As shown, the sprayer system 102 may be considered to include a fluid source 110 coupled to at least one filter apparatus 120, at least one first nozzle apparatus 122, and at least one second nozzle apparatus 124 via at least one pump 112 and an arrangement of plumbing 114, which generally corresponds to the system or array of lines, conduits, valves, tanks, and the like that facilitate flow of primary fluid (and other fluids) within the sprayer system 102. As described in greater detail below, the sprayer system 102 may further include an air source 116 and associated components, such as pumps, lines, and valves, to provide air flow to the filter apparatus 120, first nozzle apparatus 122, and/or second nozzle apparatus 124. Although not shown, the sprayer system 102 may further include one or more separators, clean water tanks, rinse tanks, strainers, hoses, recirculation lines, and the like.

Briefly, the filter apparatus 120 is upstream of the nozzle apparatuses 122, 124 and operates to filter debris out of the fluid flowing through the sprayer system 102. Although the sprayer system 102 of FIG. 2 depicts a single filter apparatus 120, the overall sprayer system 102 may include a number of filter apparatuses 120 arranged in series or in parallel to one another. In one example, a number of filter apparatuses 120 may be arranged progressively in series with apparatuses 120 having relatively coarse filter devices upstream of those with relatively fine filter devices.

The depicted nozzle apparatuses 122, 124 are generally representative of the one or more nozzle apparatuses that function to distribute and/or disperse the primary fluid from the sprayer system 102 along the geographical area. In one example, the first nozzle apparatus 122 is different than the second nozzle apparatus 124, as discussed in greater detail below. However, in some examples only the first nozzle apparatus 122 is provided in the sprayer system 102; while in other examples, only the second nozzle apparatus 124 is provided in the sprayer system 102; and in further examples, both of the first and second nozzle apparatuses 122, 124 are provided in the sprayer system 102. Moreover, although one of each is depicted in FIG. 2 as representative depictions, typically, an array of first nozzle apparatuses 122 and/or an array of second nozzle apparatuses 124 are spread across the work vehicle 100.

The schematic arrangement of the sprayer system 102 in FIG. 2 further depicts the approximate position of the sensors 108, which include sensors 108a-108h. In particular, the filter apparatus 120 may be associated with a first (or input) pressure sensor 108a, a second (or output) pressure sensor 108b, one or more flow sensors 108c, and an internal contact sensor 108d. As described in greater detail below, the input pressure sensor 108a may measure the pressure of the primary fluid entering the filter apparatus 120, and the output pressure sensor 108b may measure the pressure of the primary fluid exiting the filter apparatus 120, thereby enabling the determination of the pressure drop within the filter apparatus 120. The internal contact sensor 108d may be used to evaluate the position of a plunger assembly translating through the filter apparatus 120. Each of the nozzle apparatuses 122, 124 may be associated with a proximate nozzle sensor 108f, 108h and a baseline nozzle sensor 108e, 108g. Generally, the proximate nozzle sensors 108f, 108h and the baseline nozzle sensors 108e, 108g may be piezoelectric sensors that generate signals representing the surrounding vibrations. As described below, the proximate nozzle sensors 108f, 108h and the baseline nozzle sensors 108e, 108g may, in effect, function to collect audio waveforms that enable the identification of clogged nozzle elements of the nozzle apparatuses 122, 124. In some embodiments, more than one of the nozzle apparatuses 122, 124 may be associated with the same baseline nozzle sensor 108e, 108g (e.g., one of the baseline nozzle sensors 108e, 108g may be omitted), and in other embodiments, the baseline nozzle sensors 108e, 108g may be completely omitted.

As introduced above and depicted schematically in FIG. 2, one or more aspects of the sprayer system 102 may be controlled by the controller 104. In this context, the controller 104 may be considered a vehicle controller or a dedicated sprayer system controller in wired or wireless communication with one or more components of the sprayer system 102. Generally, the controller 104 may be organized into one or more functional units or modules 130, 132, 134 (e.g., software, hardware, or combinations thereof) implemented with processing architecture such as a processor 136a and memory 136b. For example, the modules 130, 132, 134 may be implemented based on instructions stored in memory 136b executed by the processor 136a. The controller 104 and/or modules 130, 132, 134 may further be implemented with an application specific integrated circuit (ASIC), a field programmable gate array (FPGA), or any type of electronic circuit.

The modules 130, 132, 134 of controller 104 include one or more of an operational module 130, a filter cleaning module 132, and/or a nozzle cleaning module 134. As also described in greater detail below, the modules 130, 132, 134 may operate based on signals from one or more of the sensors 108. In one example, the filter cleaning module 132 may receive signals from one or more filter apparatus sensors 108a-108d, including first and second pressure sensors 108a, 108b, flow sensor 108c, and filter apparatus contact sensor 108d, as discussed in greater detail below. Similarly, the nozzle clog module 134 may receive signals from one or more nozzle sensors 108e-108h associated with one or more of the nozzle apparatuses 122, 124, as also discussed in greater detail below.

In one example, the operational module 130 is configured to implement the general operation of the sprayer system 102. In particular, the operational module 130 may generate commands for the fluid source 110, the pump 112, the plumbing 114, the filter apparatus 120, the first nozzle apparatus 122, and the second nozzle apparatus 124 to circulate or otherwise direct primary fluid from the fluid source 110 to the nozzle apparatuses 122, 124 for application onto the geographical area.

Generally, the filter cleaning module 132 operates to monitor the amount of accumulation in the filter apparatus 120 during nominal or normal operation as a "nominal" (or non-cleaning) state, and upon reaching a predetermined amount of accumulation, to generate an actuation command to perform a filter cleaning event during a cleaning state. In particular, the first pressure sensor 108a may be positioned at or proximate to a fluid inlet of the filter apparatus 120 to collect upstream pressure values; the second pressure sensor 108b may be positioned at or proximate to a fluid outlet of the filter apparatus 120 to collect downstream pressure values; and the flow sensor 108c may be positioned in any suitable position (e.g., between the pump 112 and the filter apparatus 120) to collect flow rate values. In one example, the filter cleaning module 132 may compare and monitor the first and second pressure values to evaluate the pressure drop through the filter apparatus 120 in view of the fluid flow rate to the filter apparatus 120 over time. The filter cleaning module 132 may, in view of the flow rate values, compare the pressure drop values to predetermined values representing one or more debris accumulation conditions. In other words, a debris accumulation condition with relatively low debris accumulation may have a relatively low pressure drop value at a particular flow rate, and vice versa. Such values may have time characteristics, e.g., endpoints of potential clog indictive ranges over a time period may be used as thresholds to actuate cleaning. Upon reaching and identifying a predetermined pressure drop value (or debris accumulation condition), the filter cleaning module 132 declares a cleaning state and generates commands to perform a cleaning event. In some examples, the actuation command to implement the cleaning event may be generated by a request from the operator or in accordance with a time or usage schedule.

As noted above, the evaluation of debris accumulation and declaration of the cleaning state may be a function of pressure drop, flow rate, and other fluid characteristics. In one example, one or more debris accumulation thresholds representing a predetermined pressure drop as a function of flow rate may be established to trigger a cleaning state. In effect, the flow rate may provide a compensation or adjustment to improve the evaluation of the measured pressure drop in order to more accurately identify a suitable cleaning condition. Such debris accumulation thresholds may be expressed as one or more look-up tables and/or as one or more equations or algorithms. Moreover, such debris accumulation thresholds may be derived based on empirical or theoretical data. In some examples, the flow rate sensor 108c may be omitted and the flow rate value or values may be derived, calculated, or assumed based on any number of factors (e.g., flow settings or constant flow expectations).

The nozzle cleaning module 134 operates to monitor characteristics associated with one or more of the nozzles of the first and second nozzle apparatuses 122, 124; identify when one or more of the nozzles are clogged; and upon identification, generate one or more actuation commands for one or more of the nozzle apparatuses 122, 124 to address the clog condition, including by implementing a nozzle cleaning event in one or more of the nozzles apparatuses 122, 124. Additional information regarding the operation of the filter cleaning module 132 and the nozzle clog module 134 is provided below.

An example filter apparatus 120 will now be described with reference to FIGS. 3-9. As introduced above, the filter apparatus 120 generally functions to remove at least a portion of the debris from the primary fluid to prevent or mitigate the debris from forming a clog in one or more of the downstream nozzle apparatuses 122, 124. Moreover, as described in greater detail below, the filter apparatus 120 operates as a self-cleaning apparatus to at least partially clear accumulated debris from within the filter apparatus, upon command or upon determining that a predetermined amount of debris has accumulated.

Figure 3:
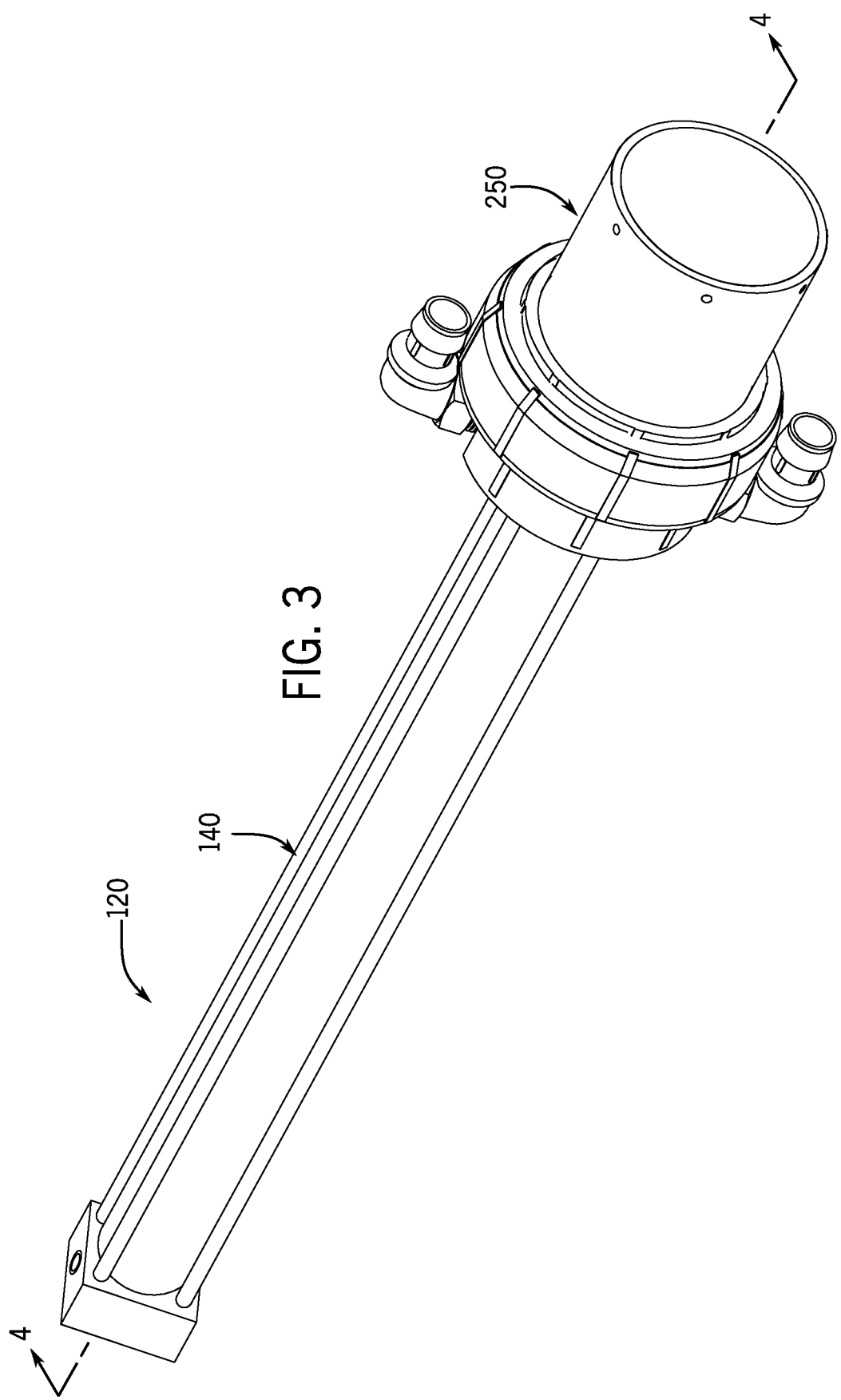
FIG. 3 is an isometric view of a filter apparatus that may be used in the sprayer system of FIG. 1 according to an example embodiment.
Figure 4:
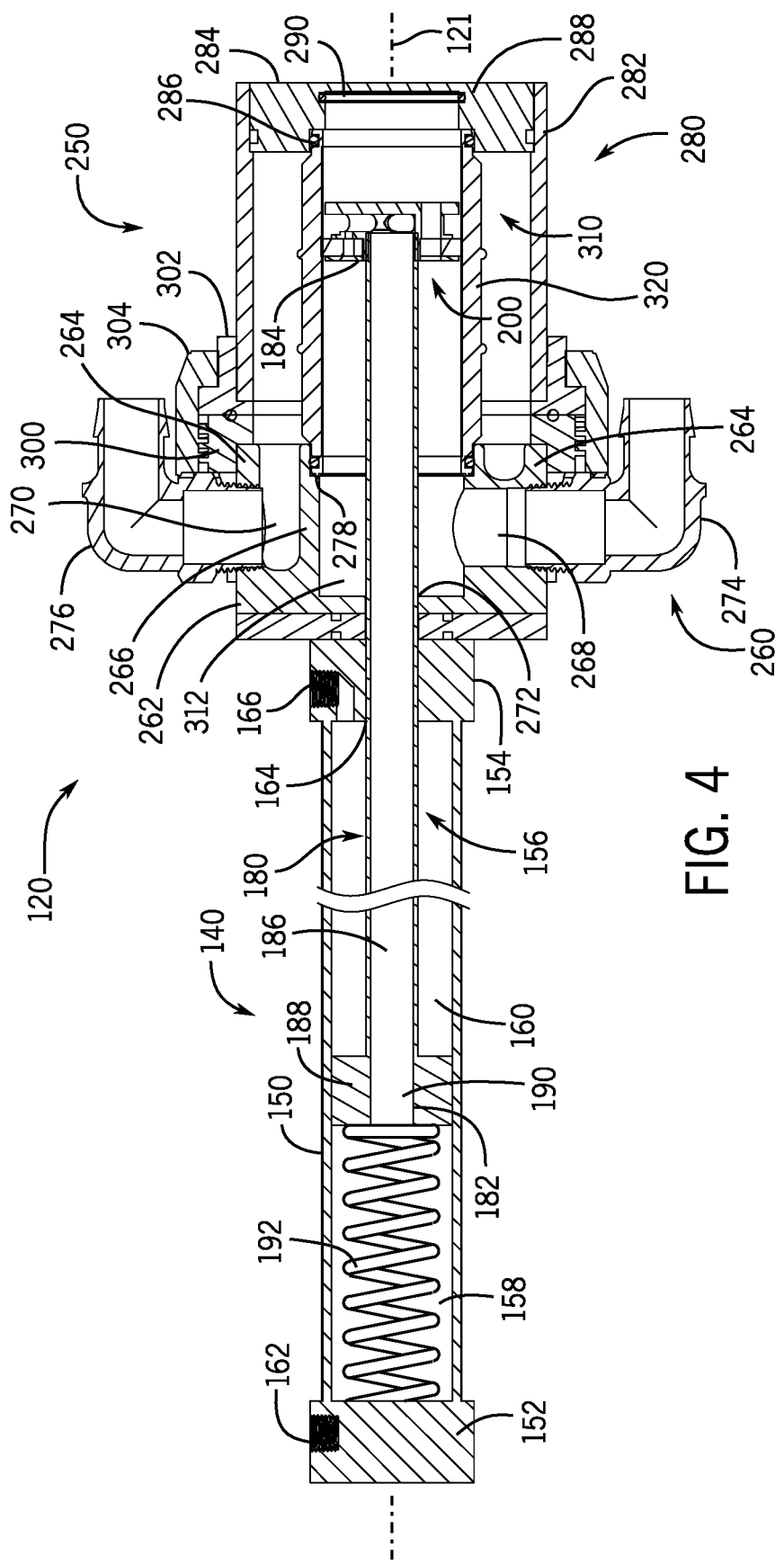
FIG. 4 is a cross-sectional view of the filter apparatus through line 4-4 of FIG. 3 according to an example embodiment.

Initial reference is made to FIG. 3, which is an isometric view of the filter apparatus 120, and FIG. 4, which is a partial cross-sectional view of the filter apparatus 120 of FIG. 3 through line 4-4. An example longitudinal axis 121 is depicted in FIG. 4 as a reference. In the discussion below, the terms "above" and "below" may be used as relative directions with respect to the longitudinal axis 121, but generally upon assembly, the filter apparatus 120 may have any spatial orientation.

Generally, the filter apparatus 120 may be considered to include a plunger unit 140 and a filter unit 250 that cooperate to filter the primary fluid and to perform the cleaning event described below. The plunger unit 140 is formed by a rod end housing 150 that extends between a first end 152 and a second end 154 and that defines a rod end housing interior 156, which may be subdivided into debris outlet chamber 158 and a rod end housing pressure chamber 160, discussed in greater detail below. Generally, the rod end housing 150 may have any suitable shape, including a cylindrical shape.

The first end 152 of the rod end housing 150 is generally sealed, except for a debris outlet 162 that is fluidly coupled to the debris outlet chamber 158 and that provides an outlet for debris to be directed out of the filter apparatus 120. Generally, the second end 154 of the rod end housing 150 is mounted to the filter unit 250. Although not shown, the debris outlet 162 may be fluidly coupled to a separator, a drain, a further downstream filter apparatus, or any other suitable component of the sprayer system 102 for receiving (and/or disposing of) the flow of debris from the filter apparatus 120. The second end 154 of the rod end housing 150 defines a rod opening 164 along the longitudinal axis 121 of the plunger unit 140 and a pressure line 166 extending from the rod end housing 150 that is fluidly coupled to the rod end housing pressure chamber 160, each of which are discussed in greater detail below. In one example, the pressure line 166 may be selectively controlled to introduce pressurized air from the air source 116 (FIG. 2) into the rod end housing pressure chamber 160 or to vent pressurized air from the rod end housing pressure chamber 160, as discussed in greater detail below.

The plunger unit 140 further includes a rod 180 at least partially arranged within the rod end housing 150. The rod 180 may be considered to include a first end 182 arranged within the interior of the rod end housing 150 and second end 184 arranged within the filter unit 250, discussed below. The rod 180 has an at least partially hollow interior that forms a rod debris passage 186. As shown, the first end 182 of the rod 180 is enlarged to form a rod seal member 188 that engages the inner wall of the rod end housing 150. As such, the rod seal member 188 functions to fluidly isolate the debris outlet chamber 158 from the rod end housing pressure chamber 160 while enabling changes in relative chamber sizes during longitudinal translation of the rod 180. As a result of this arrangement, the interior of the plunger unit 140 may be considered to be formed by effectively three areas: the debris outlet chamber 158 of the rod end housing 150 extending between the rod seal member 188 and the first end 152 of the rod end housing 150; the rod end housing pressure chamber 160 between the inner walls of the rod end housing 150 and the outer walls of the rod 180 and between the second end 154 of the rod end housing 150 and the rod seal member 188; and at least a portion of the rod debris passage 186 of the rod 180. As shown, the rod debris passage 186 is in fluid communication with the debris outlet chamber 158 via an opening 190 extending through the rod seal member 188, which in turn is in fluid communication with the debris outlet 162 in the first end 152 of the rod end housing 150.

A biasing mechanism 192 is positioned within debris outlet chamber 158 of the rod end housing interior 156 with a first end pressed against the first end 152 of the rod end housing 150 and the second end pressed against the rod seal member 188 of the rod 180. As discussed in greater detail below, the spring 192 (or other biasing mechanism) functions to provide a bias to facilitate repositioning of the rod 180 within the filter apparatus 120. As discussed in greater detail below and in accordance with many embodiments, the biasing mechanism 192 may be a spring device which functions to provide a mechanical bias to facilitate repositioning of the rod 180 within the filter apparatus 120. In some other embodiments, the biasing mechanism may include, for example and without limitation, an electrical system, a pressure system, a magnetic system, actuatable motors and drivers, and/or other mechanical actuators.

As introduced above, the second end 184 of the rod 180 extends into the filter unit 250. In one example, a plunger assembly 200 is secured to the second end 184 of the rod 180 and positioned within the filter unit 250 to perform the cleaning function discussed below.

Figure 7A:
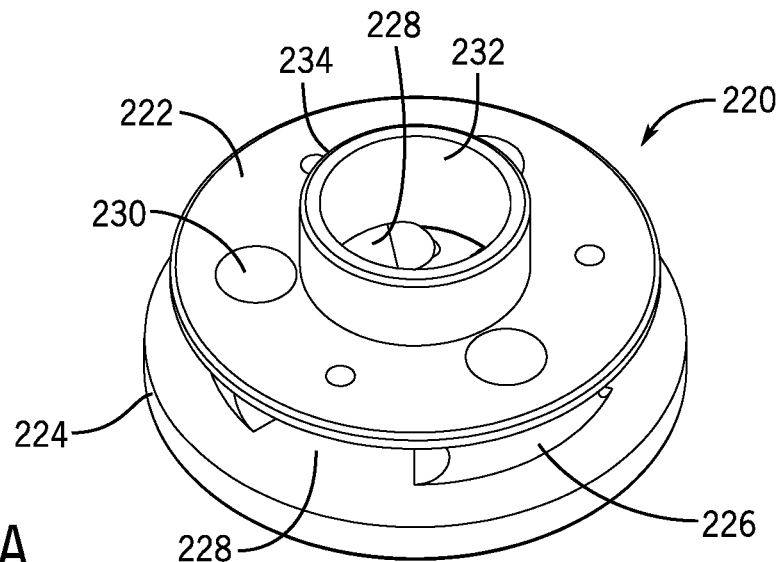
FIGS. 7A-7C are various views of a plunger assembly of the filter apparatus of FIG. 3 according to an example embodiment.
Figure 7B:
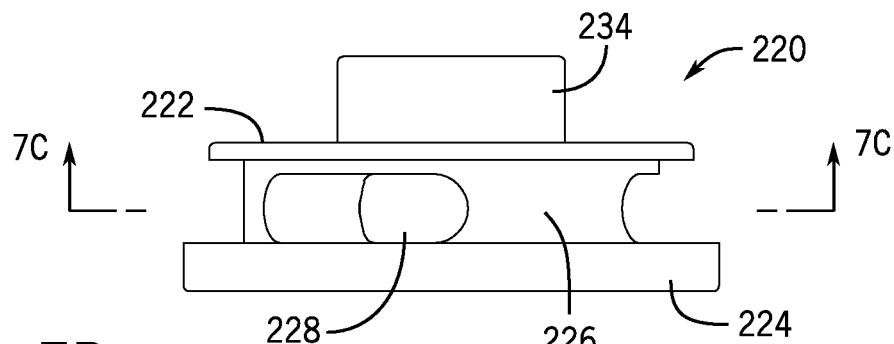
Figure 7C:
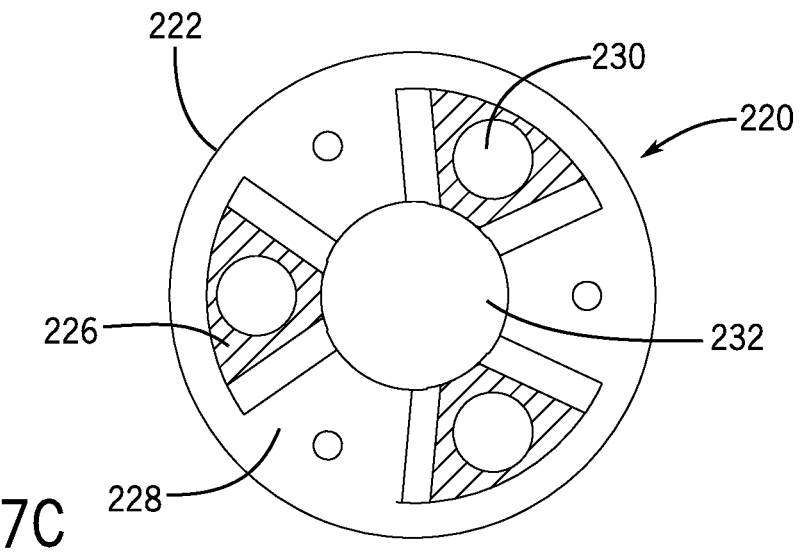
Figure 7D:
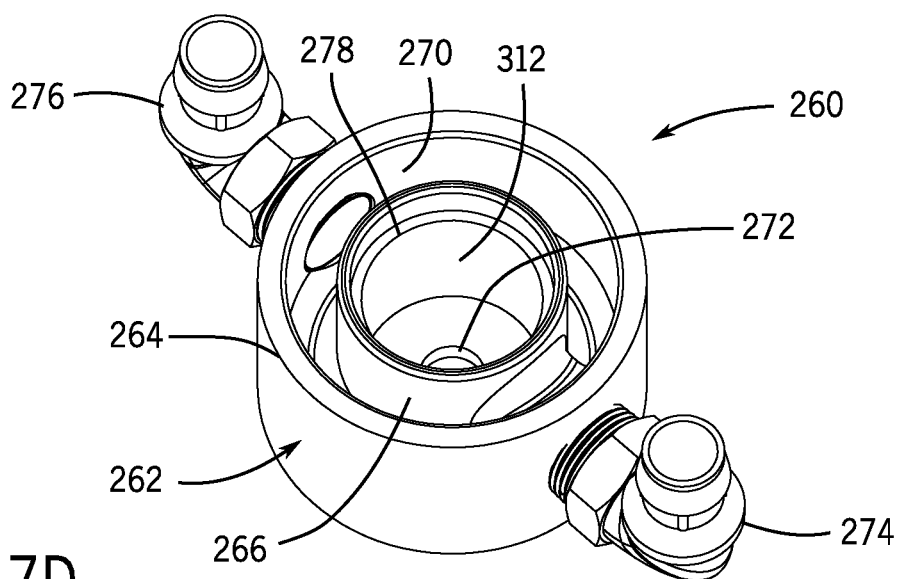
FIGS. 7D-7F are various views of a filter unit upper housing of the filter apparatus of FIG. 3 according to an example embodiment.
Figure 7E:
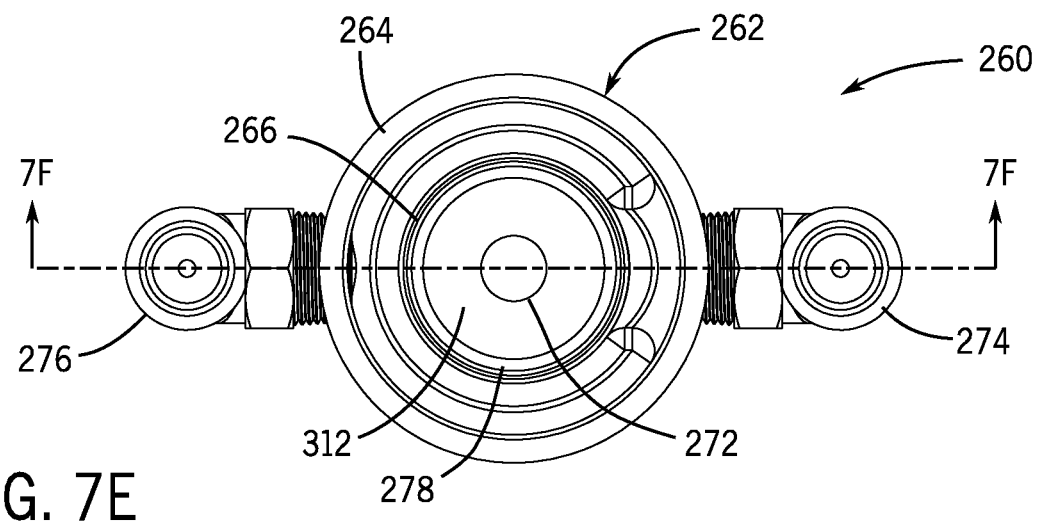
Figure 7F:
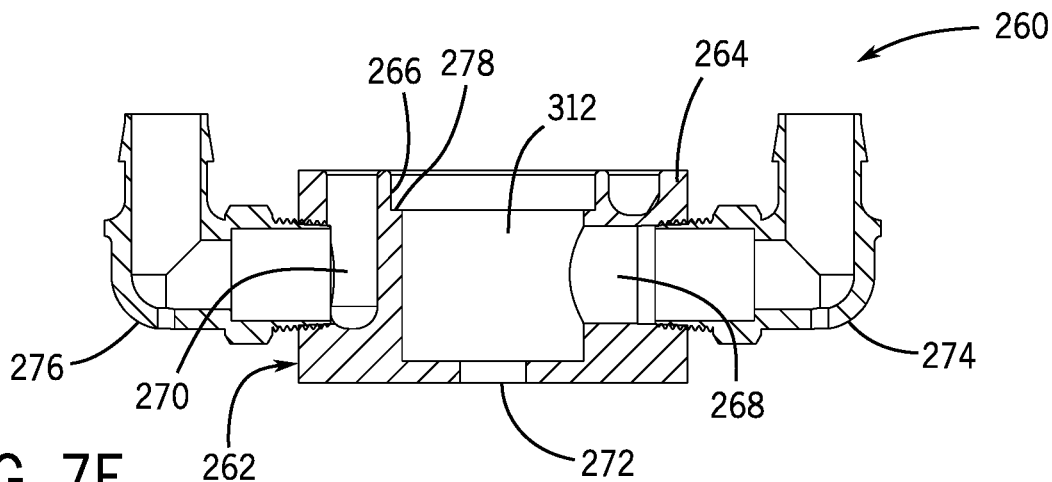
Figure 7G:
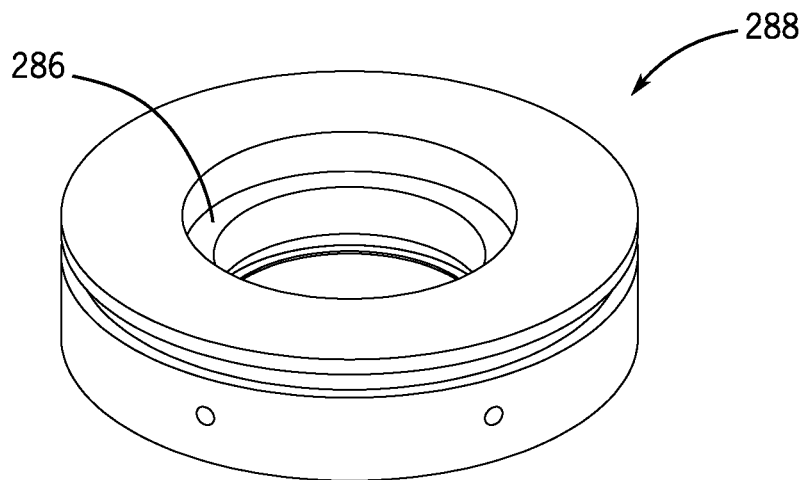
FIGS. 7G-7I are various views of a flow plate seat of the filter apparatus of FIG. 3 according to an example embodiment.
Figure 7H:
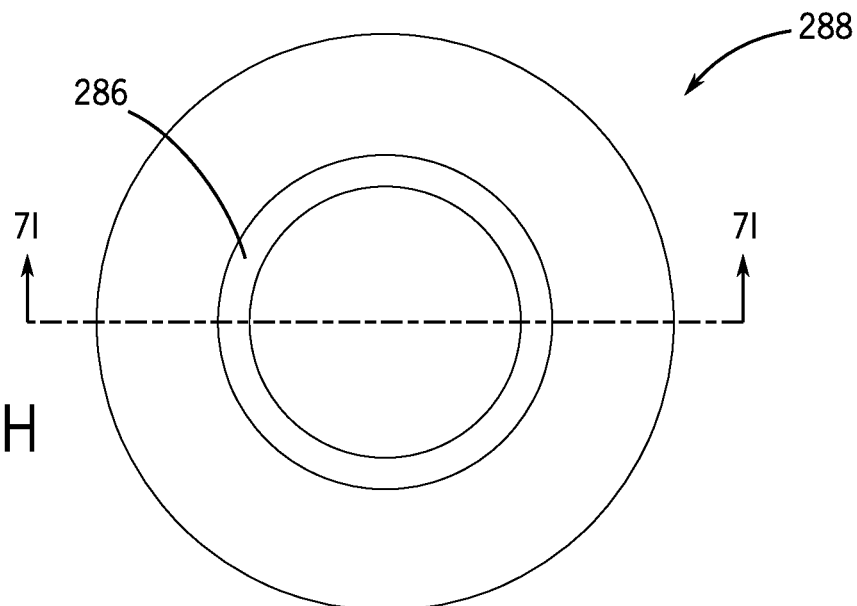
Figure 7I:
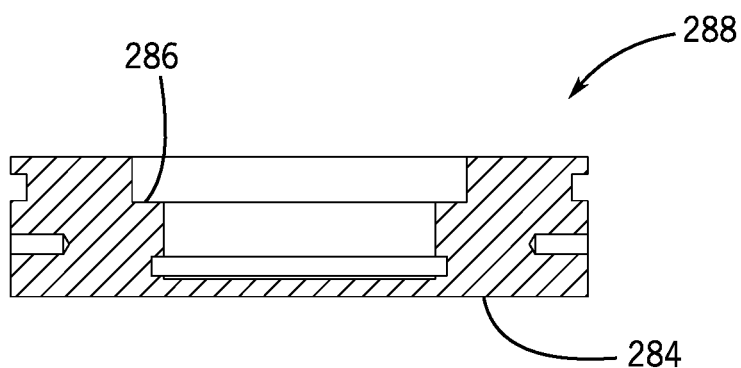

Additional reference is now made to FIG. 5, which is an exploded view of the plunger assembly 200 and the filter unit 250; FIGS. 7A-7C, which are various views of a flow plate 220 of the plunger assembly 200; FIGS. 7D-7F, which are various views of a filter unit upper housing 262 of the filter apparatus 260; FIGS. 7G-7I, which are various views of a flow plate seat device 288 of the filter apparatus 260; and FIGS. 8A and 8B, which are cross-sectional views of the plunger assembly 200 and the filter unit 250.

As best shown by FIG. 5, the plunger assembly 200 may be considered to include an upper support plate 210 and a flow plate 220. The upper support plate 210 is formed by an upper support plate body 212 that defines an upper support plate central opening 214, at which the upper support plate 210 is mounted on the rod 180, and a number of upper support plate passages 216 spaced around the upper support plate central opening 214. Any number of upper support plate passages 216 may be provided.

As best shown by FIGS. 7A-7C, the flow plate 220 of the plunger assembly 200 is formed by upper flow plate section 222, a lower flow plate section 224, and an intermediate flow plate section 226 extending between the upper flow plate section 222 and the lower flow plate section 224, the combination of which collectively forms a central plate cavity 232. A mounting flange 234 may circumscribe the central plate cavity 232 and extend from the top side of the upper flow plate section 222 for mounting the flow plate 220 on the second end 184 of the rod 180 with the upper support plate 210. A number of radial flow plate passages 228 are defined in the intermediate flow plate section 226. The radial flow plate passages 228 are fluidly coupled to the central plate cavity 232, which is in flow communication with the rod debris passage 186, and thus, to the debris outlet chamber 158 and the debris outlet 162.

The flow plate 220 further includes a number of axial flow plate passages 230 that are formed in one, two, or all of the upper flow plate section 222, lower flow plate section 224, and intermediate flow plate section 226. Upon assembly, the axial flow plate passages 230 may be aligned with the upper support plate passages 216. The axial flow plate passages 230 are generally interspersed in between and may be considered fluidly isolated from the radial flow plate passages 228, as discussed in greater detail below.

The plunger assembly 200 further includes a friction (or squeegee) element 240 positioned on the second end of the rod 180 in between the upper support plate 210 and the flow plate 220. As described below, the friction element 240 has a perimeter that engages a filter unit screen device 320 and functions as a friction component during the cleaning event described below. In one example, the friction element 240 may have axial holes that, upon assembly, are aligned with the axial flow plate passages 230 of the flow plate 220 and the upper support plate passages 216 of the upper support plate 210. In various examples, the friction element 240 may be formed from a sponge material, elastomeric material, or any suitable malleable abrasive material.

As best shown in FIG. 4, the filter apparatus 120 further includes the filter unit 250 that cooperates with the plunger unit 140. The filter unit 250 generally includes an upper housing 260 and a lower housing 280. As described below, the upper and lower housings 260, 280 collectively form a filter cavity 310 that generally houses a filter unit screen device 320.

Referring to FIGS. 7D-7F, the filter unit upper housing 260 is formed by a filter unit upper housing base 262 that is generally cylindrical and configured to be mounted to the plunger unit 140, particularly to the rod end housing 150 of the plunger unit 140. The upper housing base 262 may be considered to include an outer upper housing base portion 264 and inner upper housing base portion 266 that are generally concentric to one another with the outer upper housing base portion 264 surrounding the inner upper housing base portion 266 to at least partially define the fluid path described below.

The upper housing base 262 defines an upper housing inlet passage 268 extending through the inner upper housing base portion 266 and the outer upper housing base portion 264, and further defines an upper housing outlet passage 270 extending through the outer upper housing base portion 264. The upper housing base 262 further includes an upper housing central opening 272 to accommodate the rod 180, and the inner upper housing base portion 266 defines a first primary inlet cavity portion 312, discussed below. The first primary inlet cavity portion 312 is fluidly coupled to the upper housing inlet passage 268.

The filter unit upper housing 260 may further be considered to include an upper housing base inlet element 274 mounted to the upper housing base 262 proximate to the outer upper housing base portion 264 as a fitting or coupling to receive primary fluid from the upstream section of the sprayer system 102 and is fluidly coupled to the upper housing inlet passage 268. The filter unit upper housing 260 further includes an upper housing base outlet element 276 mounted to the outer upper housing base portion 264 as a fitting or coupling to provide the filtered primary fluid to the downstream section of the sprayer system 102 and is fluidly coupled to the upper housing outlet passage 270. As described below, the upper housing inlet passage 268 and upper housing outlet passage 270, along with the filter cavity 310, form a primary flow path for fluid flowing through the filter apparatus 120. The upper housing 260 further includes upper housing screen device seat 278 that at least partially houses and secures the screen device 320, discussed below.

The filter unit lower housing 280 is formed by a filter unit lower housing base 282 that, with the upper housing 260, defines at least part of the filter cavity 310. The filter unit housing base 282 has a first end that is affixed to the upper housing 260 and a second end that is closed by a filter unit lower housing plate 284. Additionally, and further referring to FIGS. 7G-7I, the filter unit lower housing plate 284 defines a screen device seat 286 and a flow plate seat device 288, as described below. A filter unit lower housing plate seal 290 may be positioned within the flow plate seat device 288.

The filter unit upper housing 260 and filter unit lower housing 280 may be joined together by a first inner sleeve 300 mounted on the outer surface of the upper housing 260, a second inner sleeve 302 mounted on the outer surface of lower housing 280, and an outer sleeve 304 that functions to secure the first and second inner sleeves 300, 302 to one another, thereby securing the upper and lower housings 260, 280 to one another.

The filter unit 250 further includes the screen device 320 positioned within the filter cavity 310. As best shown by the isolated view of FIG. 6, the screen device 320 is generally cylindrical and formed by a frame structure supporting a screen wrapped around the frame structure. The screen of the screen device 320 is perforated to enable the flow of fluid therethrough but to capture or otherwise prevent the flow of debris larger than the perforations through the screen. The screen device 320 may be considered to include a first (or upper) end oriented towards the rod end housing 150 and an opposite second (or lower) end. At least the upper end of the screen device 320 is open. As shown in the assembled view of FIG. 4, the upper end of the screen device 320 is seated in the upper housing screen device seat 278 and the lower end of the screen device 320 is seated in the lower housing plate screen device seat 286.

As described in greater detail below and best shown by the cross-sectional views of FIGS. 8A and 8B, the filter cavity 310 within the filter unit 250 may be considered to include the first primary inlet cavity portion 312 generally formed within the inner upper housing base portion 266 of the upper housing 260 (e.g., above the screen device 320), a second primary inlet cavity portion 314 generally defined within the interior of the screen device 320 (e.g., within the screen device 320), and a primary outlet cavity portion 316 generally defined in between the exterior of the screen device 320 and the lower housing base 282 (e.g., outside of the screen device 320). In effect, and as introduced above, the internal cavity of the debris passage 186 is isolated from fluid flow within the primary inlet cavity portions 312, 314 except through the radial flow plate passages 228 of the plunger assembly 200.

Operation of the filter apparatus 120 will now be described during typical operation with reference to FIG. 8A and during a cleaning event with reference to FIG. 8B. Further reference is made to FIG. 9, which depicts various flows through the plunger assembly 200 as the plunger assembly 200 moves through the filter unit 250 during the cleaning event.

In some embodiments, during normal or nominal operation (e.g., during a non-cleaning state), air pressure is supplied and maintained, via the pressure line 166, to the rod end housing pressure chamber 160 of the rod end housing 150, which operates to press the rod seal member 188 and first end 182 of the rod 180 in a first (or upward) direction toward the first end 152 of the rod end housing 150. In this position of the rod 180, the spring 192 within the debris outlet chamber 158 is compressed. Additionally, and as reflected in the view of FIG. 8A, in this position of the rod 180, the plunger assembly 200 is positioned within the upper housing 260 of the filter unit 250 at a position proximate to the upper end of the screen device 320 and proximate to the upper housing screen device seat 278.

During the nominal operation, primary fluid enters the filter apparatus 120 via the upper housing base inlet element 274. At this point, the primary fluid may include debris. In these embodiments, a flow control valve (not shown) may be fluidly coupled to debris outlet 162 and may be closed when in the nominal position depicted in FIG. 8A, thereby fluidly isolating debris outlet 162 from the downstream passages and minimizing the fluid flow through plate passages 228. In this nominal position, the primary fluid flows from the upper housing base inlet element 274, through the upper housing inlet passage 268, and into the first primary inlet cavity portion 312. The primary fluid flows from the first primary inlet cavity portion 312 through the upper support plate passages 216 and the axial flow plate passages 230 in the plunger assembly 200 (e.g., flow arrow 322 of FIG. 8A) into the second primary inlet cavity portion 314 within the screen device 320. The debris in the primary fluid is generally captured by the screen device 320 on the inner surface as the de-particulated or "filtered" fluid is directed through the screen device 320 into the primary outlet cavity portion 316 (e.g., flow arrow 323 of FIG. 8A). The clean fluid flows from the primary outlet cavity portion 316, through the upper housing outlet passage 270, and out of the filter unit 250 through the upper housing base outlet element 276 (e.g., flow arrow 324 of FIG. 8A).

Furthermore during nominal operation, as the filter unit 250 continues to filter primary fluid, the concentration of debris may increase within the filter unit 250, particularly within the screen device 320, and eventually may impede primary fluid flow, that is, impede the fluid flow from the inlet element 274 to the outlet element 276. As introduced above, one or more sensors 108, such as sensors 108a, 108b, 108c (FIG. 2), may collect information associated with the filter unit 250, such as pressure readings and flow rates, which are provided to the filter cleaning module 132 of the controller 104. The filter cleaning module 132 of the controller 104 may evaluate this information to determine a pressure drop at the measured flow rate representing the flow impediment in the screen device 320, thereby indicating when an undesirable amount of debris has accumulated within the screen device 320. In response, the filter cleaning module 132 of the controller 104 may initiate a cleaning event. As described below, in many embodiments, a cleaning event may involve at least two "segments" corresponding respectively to two translation directions of the plunger assembly 200 through the screen device 320. Some example use instances may include a first or "primary" segment in which the plunger assembly 200 moves downward toward the lower housing plate 284 and a second or "return" segment in which the plunger assembly 200 moves upward back toward the upper housing 260. By way of non-limiting, illustrative example, the movement of plunger assembly 200 from that depicted in the view of FIG. 8A to that depicted in the view of FIG. 8B may correspond to a primary segment of the cleaning event, and the movement of the plunger assembly 200 from that depicted in the view of FIG. 8B to that depicted in the view of FIG. 8A may correspond to a return segment of the cleaning event. Other example use instances may include a first or "primary" segment in which the plunger assembly 200, moves upward toward upper housing 260 and a second or "return" segment in which the plunger assembly 200 moves back downward toward the lower housing plate 284. By way of non-limiting, illustrative example, the movement of plunger assembly 200 from that depicted in the view of FIG. 8B to that depicted in the view of FIG. 8A may correspond to a primary segment of the cleaning event, and the movement of the plunger assembly 200 from that depicted in the view of FIG. 8A to that depicted in the view of FIG. 8B may correspond to a return segment of the cleaning event.

Initially, upon initiation of a cleaning event in some examples, the primary fluid flow may be interrupted, while in other examples, the primary fluid flow may continue during the cleaning event. Moreover, a flow control valve (not shown) fluidly coupled to the debris outlet 162 may be opened, thereby allowing debris fluid to be drawn or jetted into the radial flow plate passages 228, described below. In some embodiments, to initiate the primary segment of the cleaning event, the air pressure within the rod end housing pressure chamber 160 of the rod end housing 150 is released such that the biasing mechanism 192 biases the rod 180 in a first (e.g., downward) direction. As the rod 180 moves in the first direction, the plunger assembly 200 moves in the first direction, through the length of the screen device 320.

Figure 9:
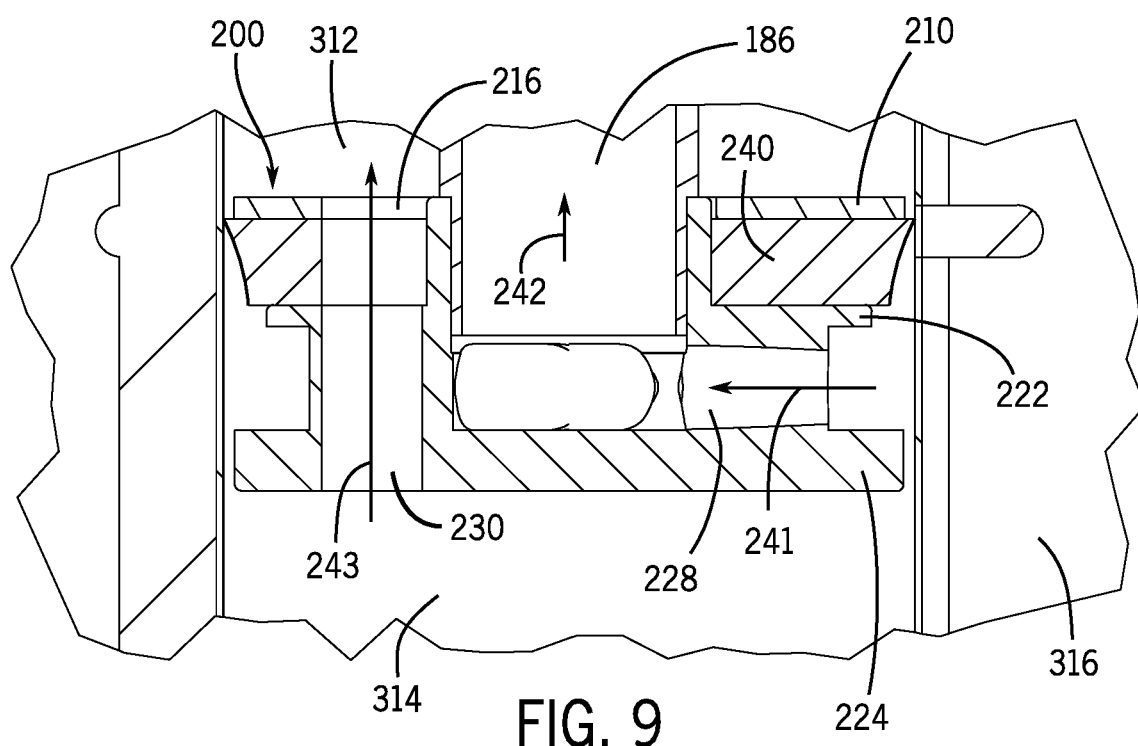
FIG. 9 is a more detailed cross-sectional view of the plunger assembly within the filter apparatus of FIG. 3 according to an example embodiment.

The view of FIG. 9 provides a more detailed indication of fluid and debris flow during downward movement of the plunger assembly 200 with the rod 180. During this movement, the friction element 240 of the plunger assembly 200 engages the interior surface of the screen device 320 to dislodge debris within the perforations of the screen device 320. As reflected by arrow 241 of FIG. 9, the dislodged debris flows with a portion of the fluid through the radial flow plate passages 228 into the rod debris passage 186. As particularly reflected by arrow 242 of FIG. 9, the debris flows through the rod debris passage 186, into the debris outlet chamber 158, and out of the filter apparatus 120 through the debris outlet 162. Moreover, primary fluid from second primary inlet cavity portion 314 may temporarily flow through passages 230, 216 to enable movement of the of the plunger assembly 200 through the filter unit 250, as reflected by the arrow 243 in FIG. 9. In effect, the friction element 240, in combination with the upper support plate 210 and the flow plate 220, may function to impart high-speed fluid flow along the inner surface of the screen device 320 to, in some examples, maximize the amount of debris and minimize the amount of fluid that enter the radial flow plate passages 228 to be removed from the filter apparatus 120.

The plunger assembly 200 extends all the way through the screen device 320 during the primary segment of the cleaning event until the plunger assembly 200 reaches the flow plate seat device 288, e.g., at the end of the filter unit 250. As noted above, a contact sensor 108d (FIG. 2) may be proximate to the flow plate seat device 288 to signal when the plunger assembly 200 completes the primary segment of the cleaning event, which is reflected by the view of FIG. 8B.

At this point, to initiate the return segment of the cleaning event, the air source 116 (FIG. 2) may be commanded to re-pressurize the rod end housing pressure chamber 160 to translate the plunger assembly 200 while also continuously contacting the screen device 320 with the friction element 240 to the position depicted in FIG. 8A, thereby completing the cleaning event. As such, the plunger assembly 200 may dislodge debris from the screen device 320 during each of the primary filter cleaning event segment and the return filter cleaning event segment or only during the primary filter cleaning event segment.

In some examples, the rate and nature of the venting and pressurizing of the rod end housing pressure chamber 160 to translate the rod 180 and the plunger assembly 200 may be based on a timing schedule. Further, in some examples, the cleaning event may be repeated additional times prior to resuming the primary flow of fluid, if previously interrupted.

In one embodiment and as best represented by FIG. 9, the friction element 240 may be considered to have a concave perimeter in which the outer diameter at the upper surface (e.g., toward the upper support plate 210) is greater than the outer diameter of the lower surface (e.g., toward the flow plate 220). This arrangement provides different directional characteristics of the friction element 240 when interacting with the screen device 320 as the plunger assembly 200 moves in the first direction (e.g., upward, toward the first end 152 of rod end housing 150) and in the second direction (e.g., downward, toward the filter unit lower housing plate 284). In particular, this arrangement enables the perimeter of the friction element 240 to bend to a first degree in the first direction when the plunger assembly 200 moves in the second direction (e.g., downward), and bend to a second degree in the second direction when the plunger assembly 200 moves in the first direction (e.g., upward). Due to the concave structure of the friction element 240, the first degree of bending is smaller than the second degree of bending.

Stated different, the friction element 240 is stiffer with less movement when moving downward during the primary segment of the cleaning event, thereby dislodging more debris from the screen device 320, and is less stiff when moving upward during the return segment of the cleaning event, thereby dislodging less debris from the screen device 320. In some examples, the friction element 240 may have a relatively flat perimeter (e.g., as opposed to a concave perimeter as depicted). Additionally, in the depicted example, the upper flow plate section 222 has a relatively shorter diameter as compared to the friction element 240 and/or the upper support plate body 212. This arrangement may further enable the friction element 240 to be stiffer (e.g., moving less) when moving downward during the primary segment of the cleaning event and less stiff during the return segment. Generally, the friction element 240, upper flow plate section 222, and/or upper support plate body 212 may have a number of different shapes, configurations, bending directions, and travel directions, depending upon the needs of the particular application.

In a further embodiment, the lower flow plate section 224 may be configured with a larger diameter, thus forming a high friction surface area between the outer edge of the flow plate section 224 and the inner surface of the filter screen device 320. During such cleaning segments, the high friction surface area may impede flow between the outer edge of the flow plate section 224 and the inner surface of the filter screen device 320, thereby resulting in a local reverse flow effect in which the flow path for filtered liquid from filter cavity 310 proximate to the lower flow plate section 224 is reversed (e.g., directed back through the filter device 320 and into radial flow plate passages 228).

An example operation of the filter apparatus 120 is described above, although other arrangements, configurations, and operations may be provided. For example, the plunger position depicted in FIG. 8B may be considered as the nominal (or non-cleaning) position in which air pressure is not supplied to rod end housing pressure chamber 160 during nominal filtering operation. During this operation, fluid may flow from upper housing base inlet element 274 through the upper housing inlet passage 268, then the first primary inlet cavity portion 312, directly into the second primary inlet cavity portion 314 (e.g., without flowing through passages of the plunger assembly 200), then into primary outlet cavity portion 316 to potentially capture debris in the intervening filter, continuing to housing outlet passage 270, and out of the filter unit 250 through the upper housing base outlet element 276 until a cleaning event is triggered (e.g., triggered as described above). In this example, to initiate a cleaning event, the pressure chamber 160 is pressurized to translate the plunger assembly 200, in a first direction, from seat device 288 to seat 278 as the primary segment, and depressurization of the pressure chamber for return translation, in a second direction, via biasing mechanism, from seat 278 to seat 288. This depressurization may be triggered by a contact sensor. In this example, a control valve may be omitted, since the plunger assembly 200 is fluidly isolated from cavity portions 310, 314, 316 upon being biased into seat device 288.

The first nozzle apparatus 122 will now be described with reference to FIGS. 10-20C. Generally, the first nozzle apparatus 122 may be referred to as a "switching nozzle apparatus" in the discussion below, as well as a self-cleaning nozzle apparatus. The switching nozzle apparatus 122 generally includes a nozzle unit 350 and an actuator 460 coupled together to selectively distribute a fluid and to address clogs or debris blockages, as discussed in greater detail below.

Figure 10:
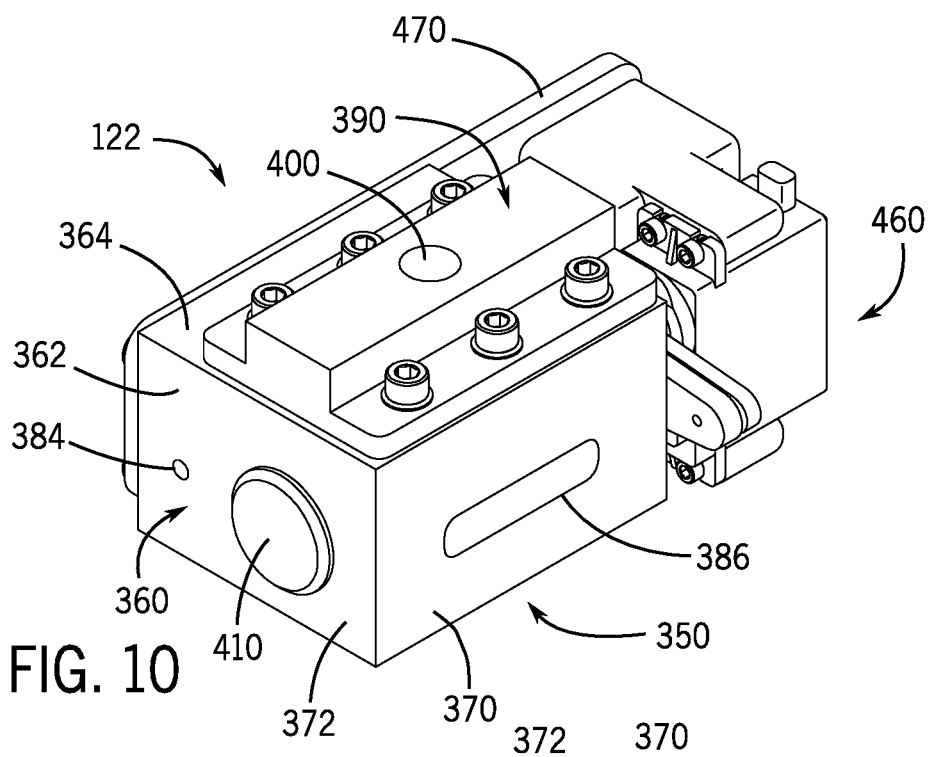
FIG. 10 is a first isometric view of a first (or switching) nozzle apparatus of the sprayer system of FIG. 1 according to an example embodiment.
Figure 11:
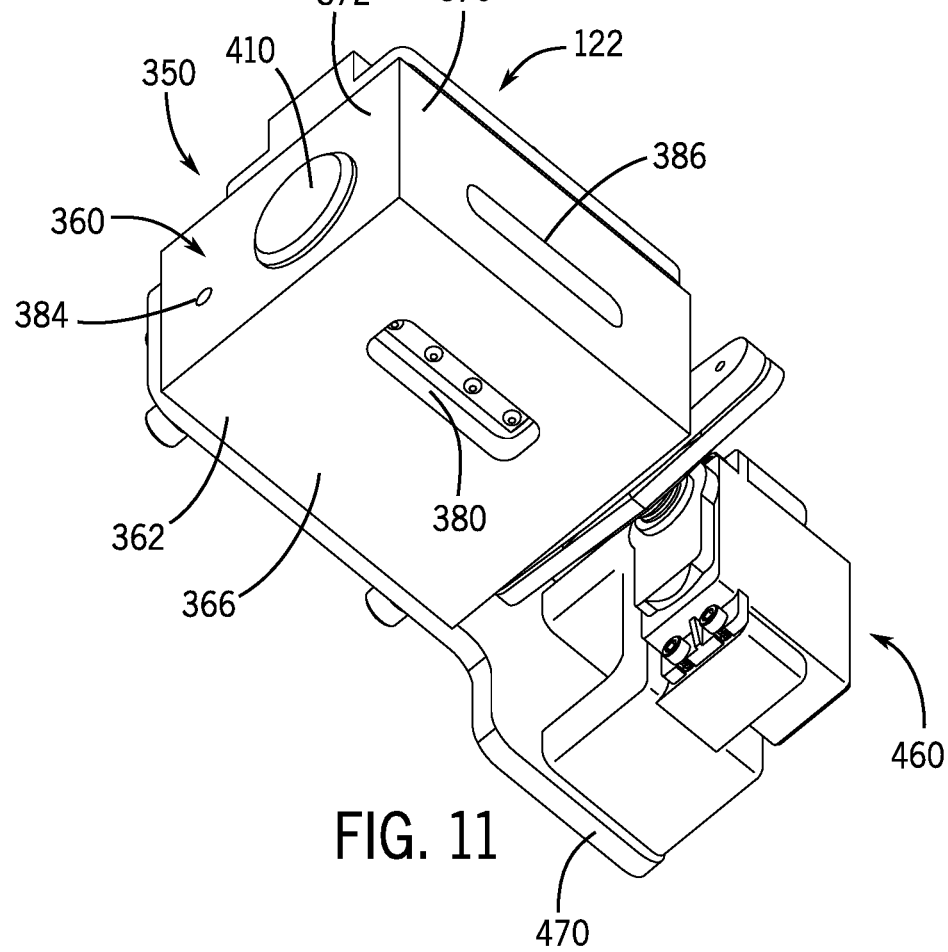
FIG. 11 is a second isometric view of the switching nozzle apparatus of the sprayer system of FIG. 1 according to an example embodiment.
Figure 12:
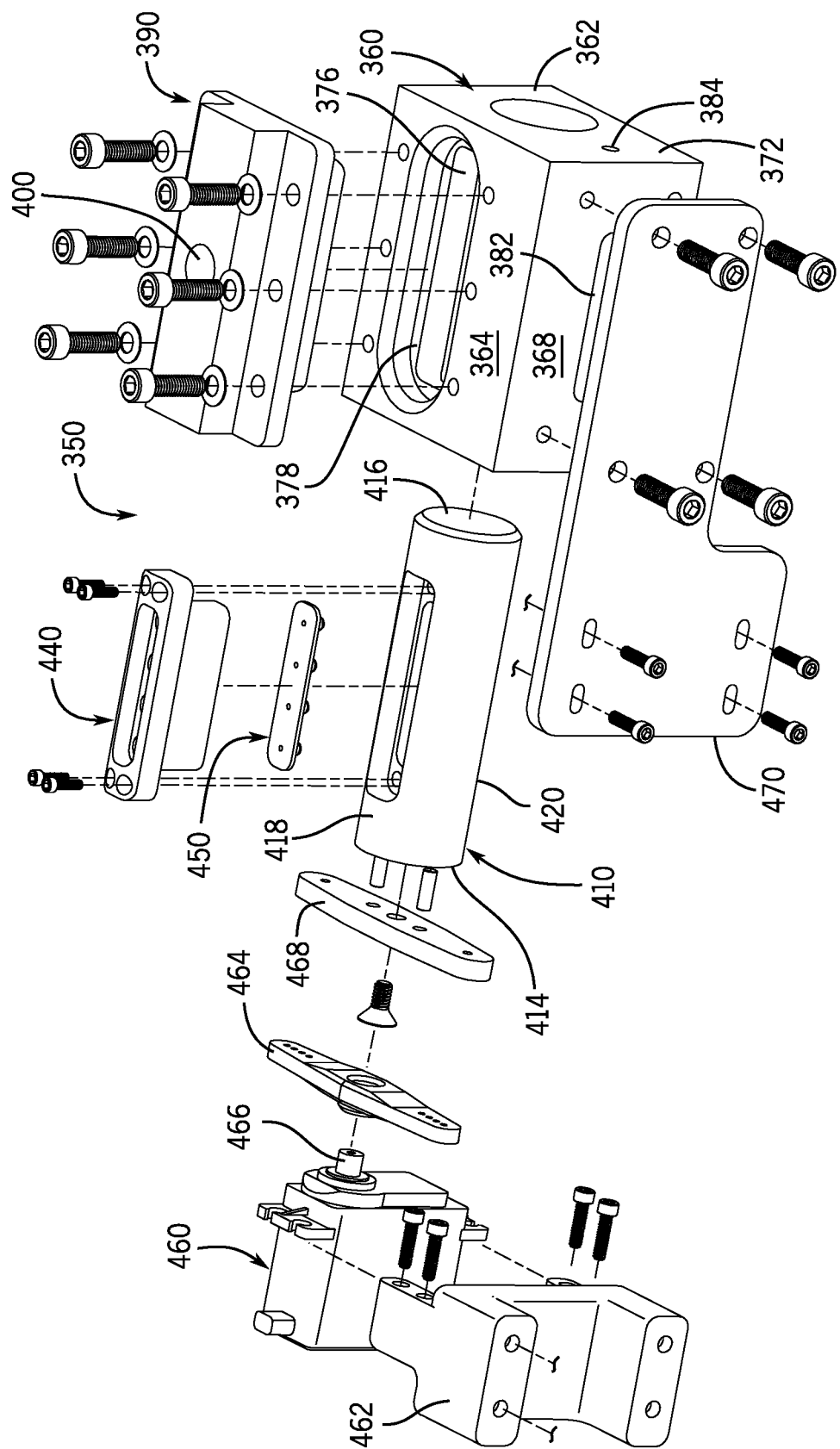
FIG. 12 is an exploded view of the switching nozzle apparatus of FIGS. 10 and 11 according to an example embodiment.

Initial reference is made to FIGS. 10 and 11, which are different isometric views of the switching nozzle apparatus 122; FIG. 12, which is an exploded view of the switching nozzle unit 350; and FIGS. 13-17C, which are individual views of various components removed from the switching nozzle apparatus 122, each of which are discussed below. In the discussion below, the terms "top" and "bottom" may be used as relative directions with respect to a longitudinal axis of the primary flow direction of the switching nozzle apparatus 122, but generally upon assembly, the switching nozzle apparatus 122 may have any spatial orientation.

With particular reference to FIGS. 10-13, the nozzle unit 350 includes a sprayer manifold 360 formed by a sprayer manifold base 362 that is generally cube-shaped to define a top face 364, a bottom face 366, a first side face 368, a second side face 370, a first end face 372, and a second end face 374. A nozzle cavity 376 is formed within the interior of the sprayer manifold base 362. In one example, the nozzle cavity 376 is generally cylindrical and extends between the first end face 372 and the second end face 374 of the sprayer manifold 360. As discussed in greater detail below, the sprayer manifold 360 of the nozzle unit 350 houses a nozzle holder 410 having a generally cylindrical shape extending between the first end face 372 and the second end face 374.

Figure 13:
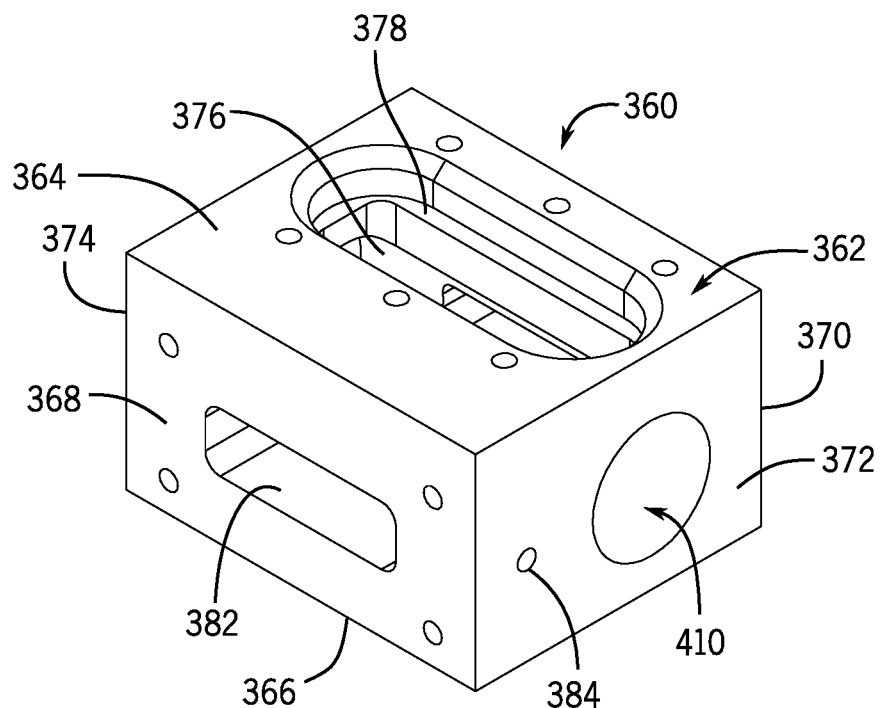
FIG. 13 is an isometric view of a manifold of the switching nozzle apparatus of FIGS. 10 and 11 according to an example embodiment.

As best shown in FIGS. 12 and 13, a fluid inlet seat 378 at least partially functioning as a fluid inlet passage is defined in the sprayer manifold base 362 between the top face 364 and the nozzle cavity 376. A fluid outlet passage 380 is defined in the sprayer manifold base 362 between the bottom face 366 and the nozzle cavity 376. An air inlet passage 382 is defined in the sprayer manifold base 362 and generally extends from an air inlet opening 384 in the first end face 372, opening up along the first side face 368, and fluidly coupled to the nozzle cavity 376. An air outlet passage 386 is defined in the sprayer manifold base 362 between the second side face 370 and the nozzle cavity 376.

Figure 14A:
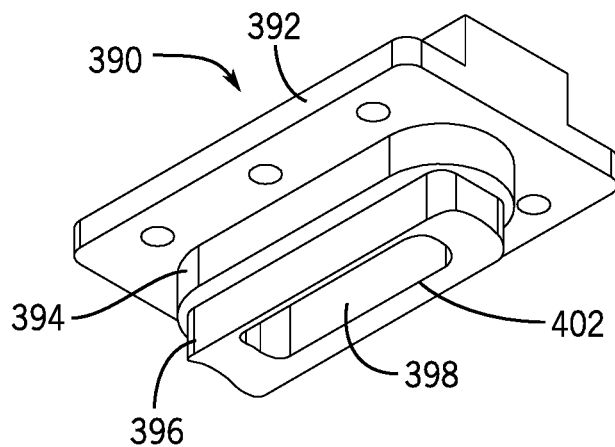
FIGS. 14A-14C are various views of an inlet plate of the switching nozzle apparatus of FIGS. 10 and 11 according to an example embodiment.
Figure 14C:
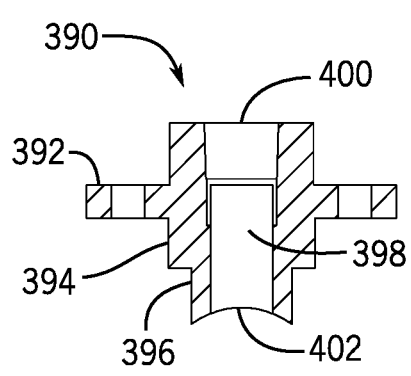
Figure 14B:
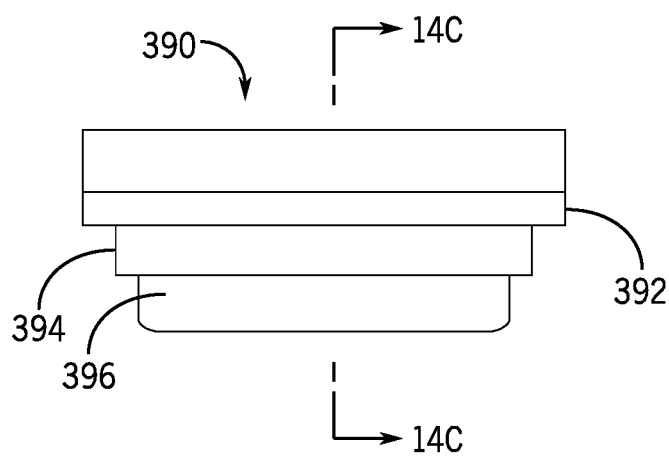

Additional reference is made to the views of FIGS. 14A-14C, which depict an isolated view of an inlet plate 390 of the nozzle unit 350 that, upon assembly, is coupled to the sprayer manifold 360. The inlet plate 390 is secured to the top face 364 of the sprayer manifold 360 with one or more mounting flanges 392 that define fastening holes that align with corresponding fastening holes on the top face 364 to receive fasteners (e.g., screws). As assembled, the inlet plate 390 has an inlet plate body 394 at least partially arranged within the fluid inlet seat 378. An inlet plate adapter 396 extends from the underside of the inlet plate body 394. Collectively, the inlet plate body 394 and the inlet plate adapter 396 may define an inlet plate passage 398 that extends from an inlet 400 at a top surface (or outward relative to the sprayer manifold 360) to an inlet plate outlet 402 on a distal end of inlet plate adapter 396. The inlet plate passage 398 may expand from the generally circular fluid inlet 400, to a larger interior cavity within the inlet plate body 394 and/or inlet plate adapter 396, and to the inlet plate outlet 402. In one embodiment, relative to the primary orientation of the fluid path through the nozzle apparatus 122, the inlet plate outlet 402 may have a generally oval shape in an axial-radial plane, and curved end surfaces in radial-tangential planes. As described in greater detail below, the inlet plate 390 is positioned to fluidly couple the inlet 400 and the inlet plate passage 398 to the nozzle cavity 376. In particular, the curved end surfaces of the inlet plate adapter 396 may have shapes that approximate the curved cylindrical shape of the nozzle holder 410, discussed below, to enable secure fluid communication in certain rotational positions of the nozzle holder 410.

Figure 15:
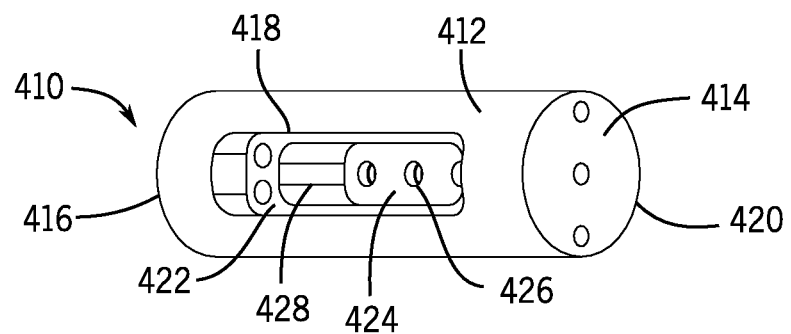
FIG. 15 is an isometric view of a nozzle holder of the switching nozzle apparatus of FIGS. 10 and 11 according to an example embodiment.

Additional reference is made to the view of FIG. 15, which depicts an isolated view of a nozzle holder 410 of the nozzle unit 350 that, upon assembly, generally supports a nozzle retainer 440 and nozzle array 450 (FIGS. 16A-16C and FIGS. 17A-17C, discussed below) in selectable rotational or pivotal positions within the nozzle cavity 376 of the sprayer manifold 360 to carry out the various functions described below. The nozzle holder 410 may be considered to be formed by a generally cylindrical body 412 having a first end 414, a second end 416, a first surface portion 418, and a second surface portion 420. In one example, the first surface portion 418 is located on an opposite side of the body 412 as the second surface portion 420.

The nozzle holder 410 has a nozzle holder cavity 428 proximate to the first surface portion 418 in which a nozzle seat 422 extends into the body 412 to a nozzle retainer seat 424. Generally, the nozzle seat 422 is a "stepped" surface within the body 412 around the perimeter of the nozzle holder cavity 428 between the first surface portion 418 and the nozzle retainer seat 424. The nozzle retainer seat 424 is an inner surface within the body 412 that defines a nozzle head holder array 426, which is formed by a number of holes that extend to the second surface portion 420.

With additional reference to FIGS. 16A-16C, the nozzle unit 350 further includes a nozzle retainer 440 that, upon assembly, is secured into the nozzle holder 410 and particularly includes a nozzle retainer flange 442 that is stepped down to a nozzle retainer body 446. The nozzle retainer flange 442 forms a number of fastener holes that may be aligned with corresponding fastener holes on the nozzle seat 422 to secure the nozzle retainer 440 into the nozzle holder 410 with fasteners (e.g., screws). The nozzle retainer flange 442 further defines a nozzle retainer flange cavity 444 that is circumscribed by the nozzle retainer flange 442. The nozzle retainer body 446 defines a number of flow passages 448 extending between the nozzle retainer flange cavity 444 and a distal end of the nozzle retainer 440.

With further reference to FIGS. 17A-17C, a nozzle array 450 is generally formed by a flange base 452 and an array of nozzle elements 454, each arranged on one side of the flange base 452 and defining series of nozzle element flow passages 456 with the flange base 452 having nozzle element inlets proximate to the flange base 452 and nozzle element outlets on the distal ends.

Upon assembly, the nozzle array 450 is arranged within the nozzle holder 410, particularly such that the nozzle elements 454 are positioned within the nozzle head holder array 426 and the flange base 452 is supported by the nozzle retainer seat 424. Upon installation of the nozzle array 450, the nozzle retainer 440 may be inserted into the nozzle holder 410, particularly secured to the nozzle seat 422 such that the nozzle retainer 440 maintains the position of the nozzle array 450. Collectively, the nozzle retainer flange cavity 444, the nozzle retainer flow passages 448 and the nozzle element flow passages 456 form a central or internal partial flow path. As described below, the internal partial flow path is adjustable within the sprayer manifold 360 by pivoting the nozzle holder 410.

As noted above, in one example, the nozzle retainer 440 and the nozzle array 450 may be installed into the nozzle holder 410, which in turn may be inserted into the nozzle cavity 376 of the sprayer manifold 360. For example, the nozzle holder 410 (including the nozzle retainer 440 and nozzle array 450) may be inserted through an opening in either end face 372, 374 of the sprayer manifold 360. Subsequent to the insertion of the nozzle holder 410, the inlet plate 390 is installed in the sprayer manifold 360 such that the inlet plate adapter 396 is proximate to the nozzle holder 410 within the nozzle cavity 376.

As introduced above and as best shown in FIG. 12, the switching nozzle apparatus 122 further includes the actuator 460 mounted to the nozzle unit 350 with an actuator mount 462 and a support plate (or other type of structure) 470. Generally, the actuator 460 may be a rotary actuator such as a motor, e.g., an indexing motor, a servo, or a stepper motor, although other types of actuators may be provided. In one example, the actuator mount 462 is secured to the actuator 460 with fasteners (e.g., screws) extending through corresponding fastening holes on the actuator 460 and the actuator mount 462. As shown, the actuator mount 462 may be generally formed by an H-shaped bracket.

In one example, the support plate 470 is a generally planar structure with a number of mounting holes that may be aligned to corresponding mounting holes on the actuator mount 462 and the nozzle unit 350. As best indicated by the exploded view of FIG. 12, the support plate 470, upon securement to the sprayer manifold 360 of the nozzle unit 350, defines a portion of the air flow path by covering the air inlet passage 382. Upon securing fasteners through the mounting holes and corresponding structure, the actuator 460 may be secured to the nozzle unit 350 via the actuator mount 462.

The actuator 460 may further include a first coupling element 464 on a distal end of a drive shaft 466 extending from the actuator 460. The nozzle unit 350 may further include a second coupling element 468 extending from the first end 414 of the nozzle holder 410 proximate to the second end face 374 of the sprayer manifold 360. The first coupling element 464 is secured to the second coupling element 468 such that the actuator 460 may rotationally drive the nozzle holder 410 within the sprayer manifold 360 into the various pivot positions described below.

Figure 18A:
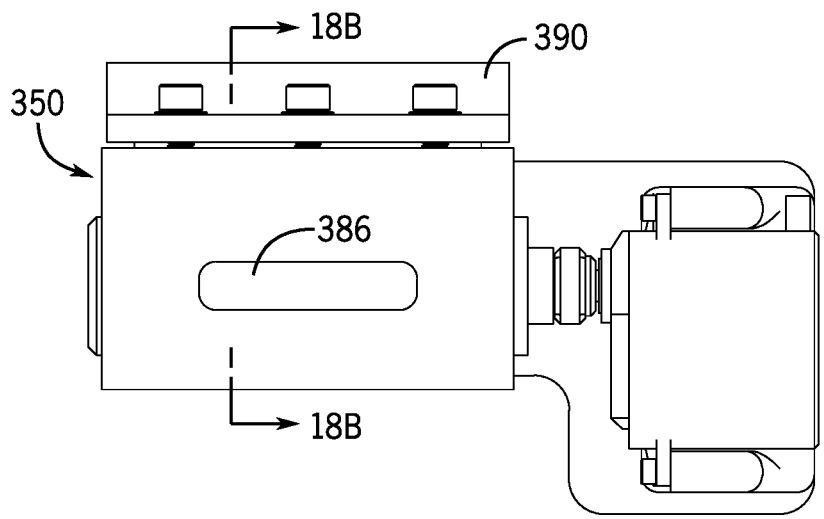
FIGS. 18A-18C are various views of the switching nozzle apparatus of FIGS. 10 and 11 in a nominal position according to an example embodiment.
Figure 18B:
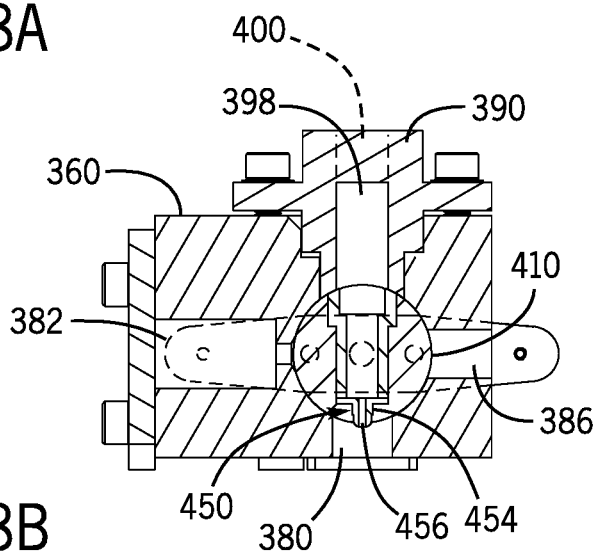
Figure 19A:
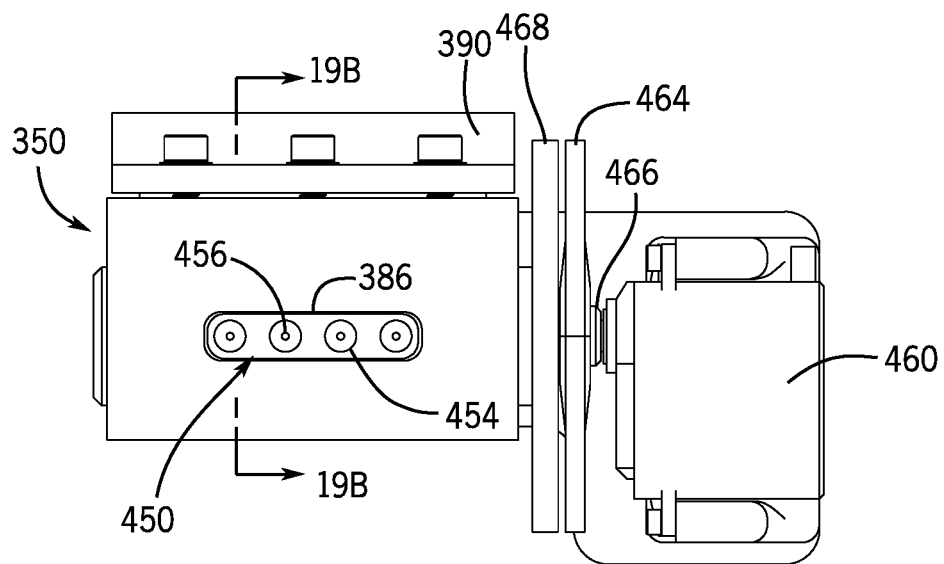
FIGS. 19A-19C are various views of the switching nozzle apparatus of FIGS. 10 and 11 in a cleaning position according to an example embodiment.
Figure 19B:
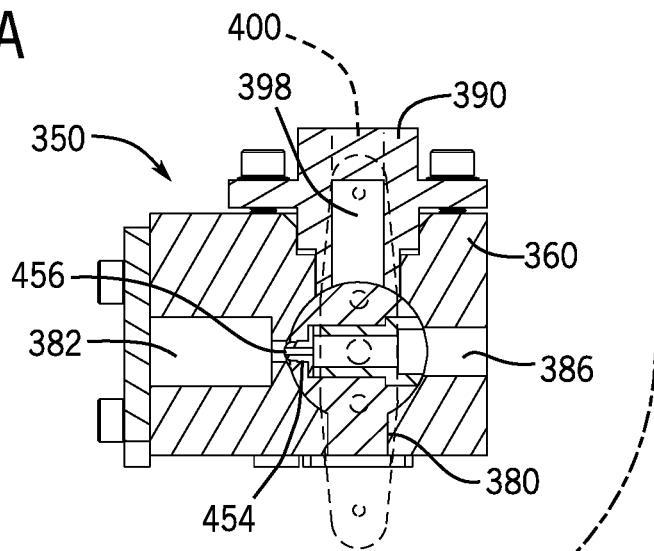
Figure 19C:
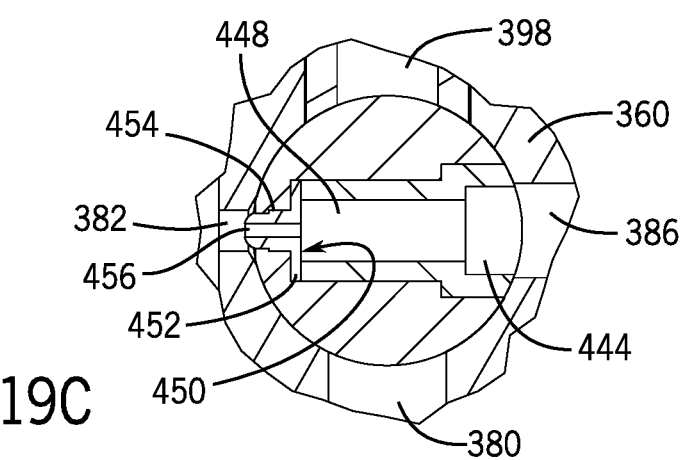
Figure 20A:
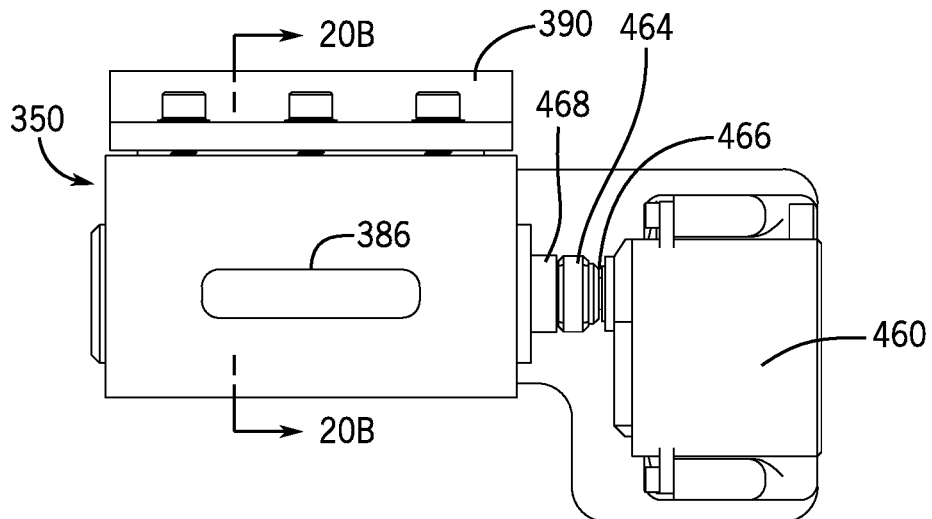
FIGS. 20A-20C are various views of the switching nozzle apparatus of FIGS. 10 and 11 in an additional cleaning position according to an example embodiment.
Figure 20B:
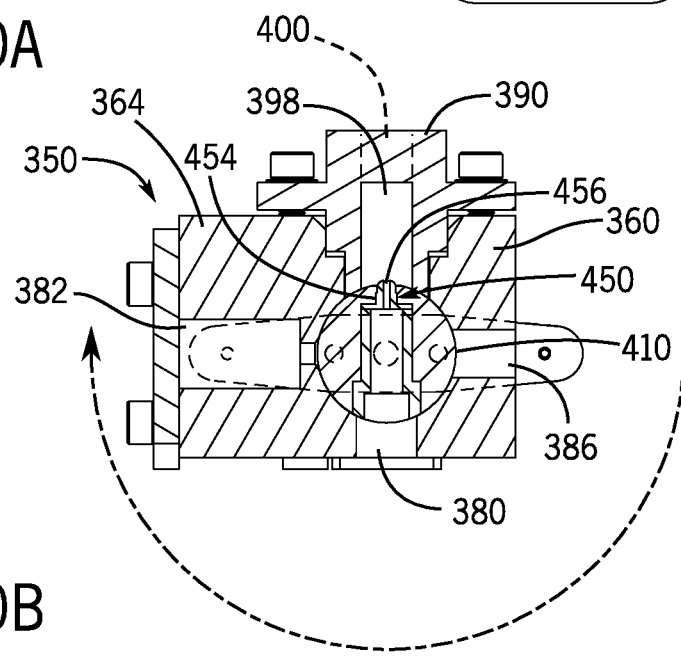
Figure 20C:
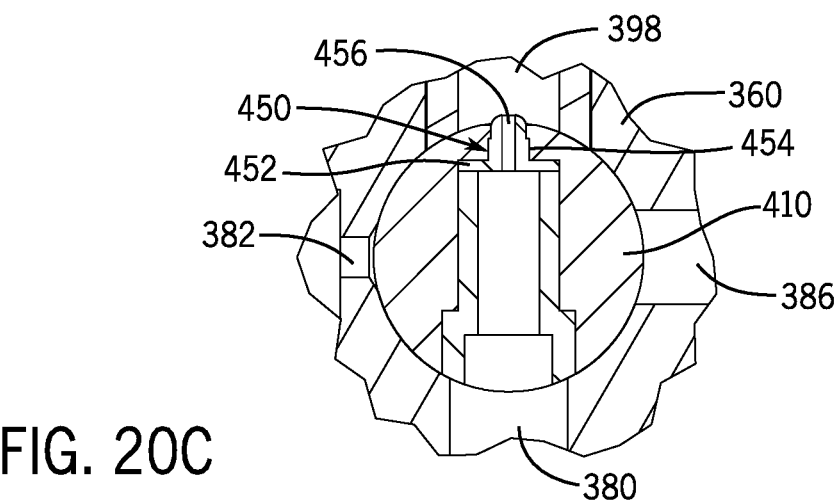
Figure 21:
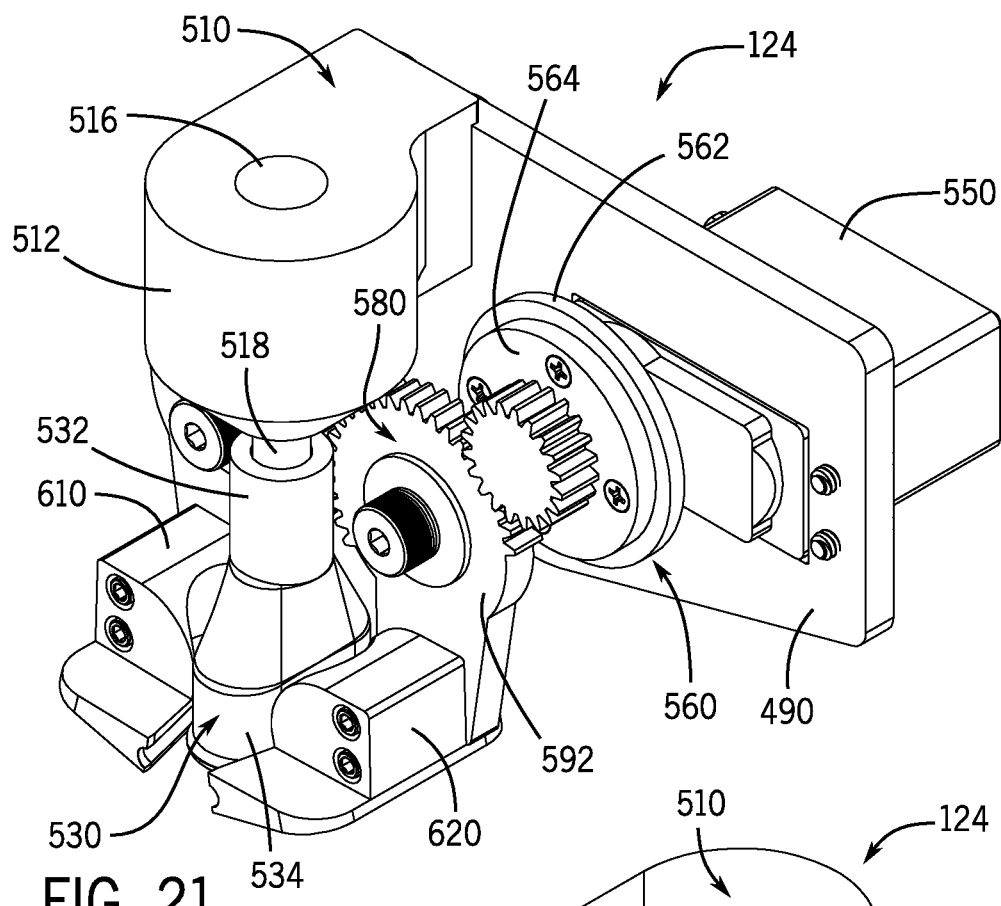
FIG. 21 is a first isometric view of a second (or pinching) nozzle apparatus of the sprayer system of FIG. 1 according to an example embodiment.
Figure 22:
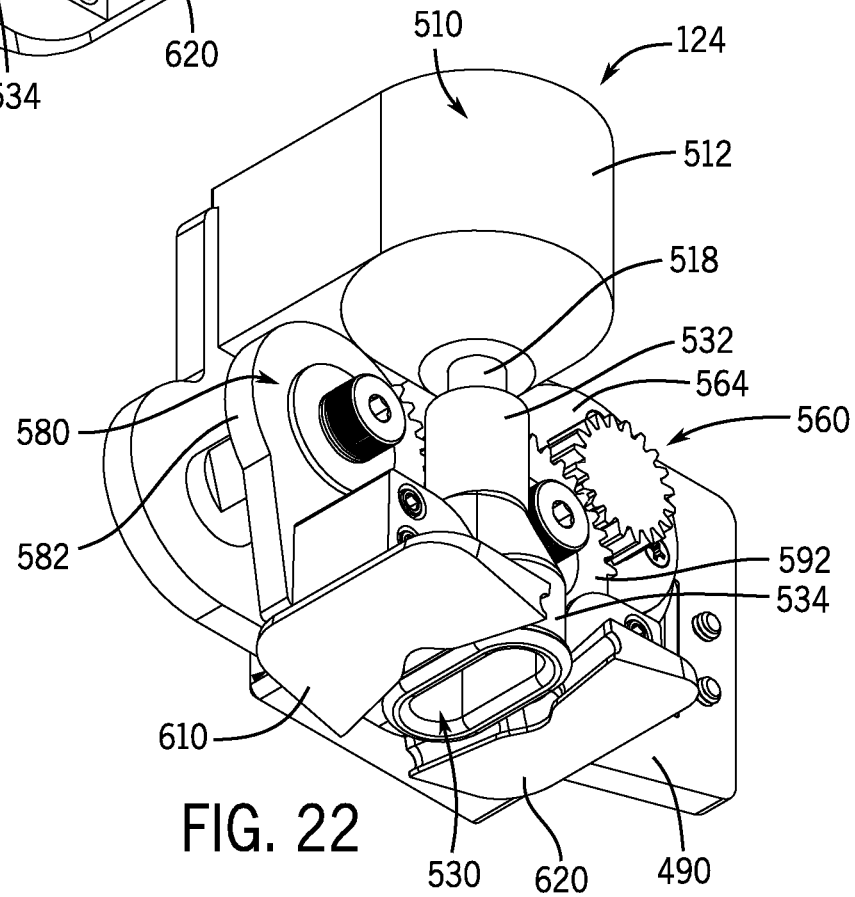
FIG. 22 is a second isometric view of the pinching nozzle apparatus of the sprayer system of FIG. 1 according to an example embodiment.
Figure 23:
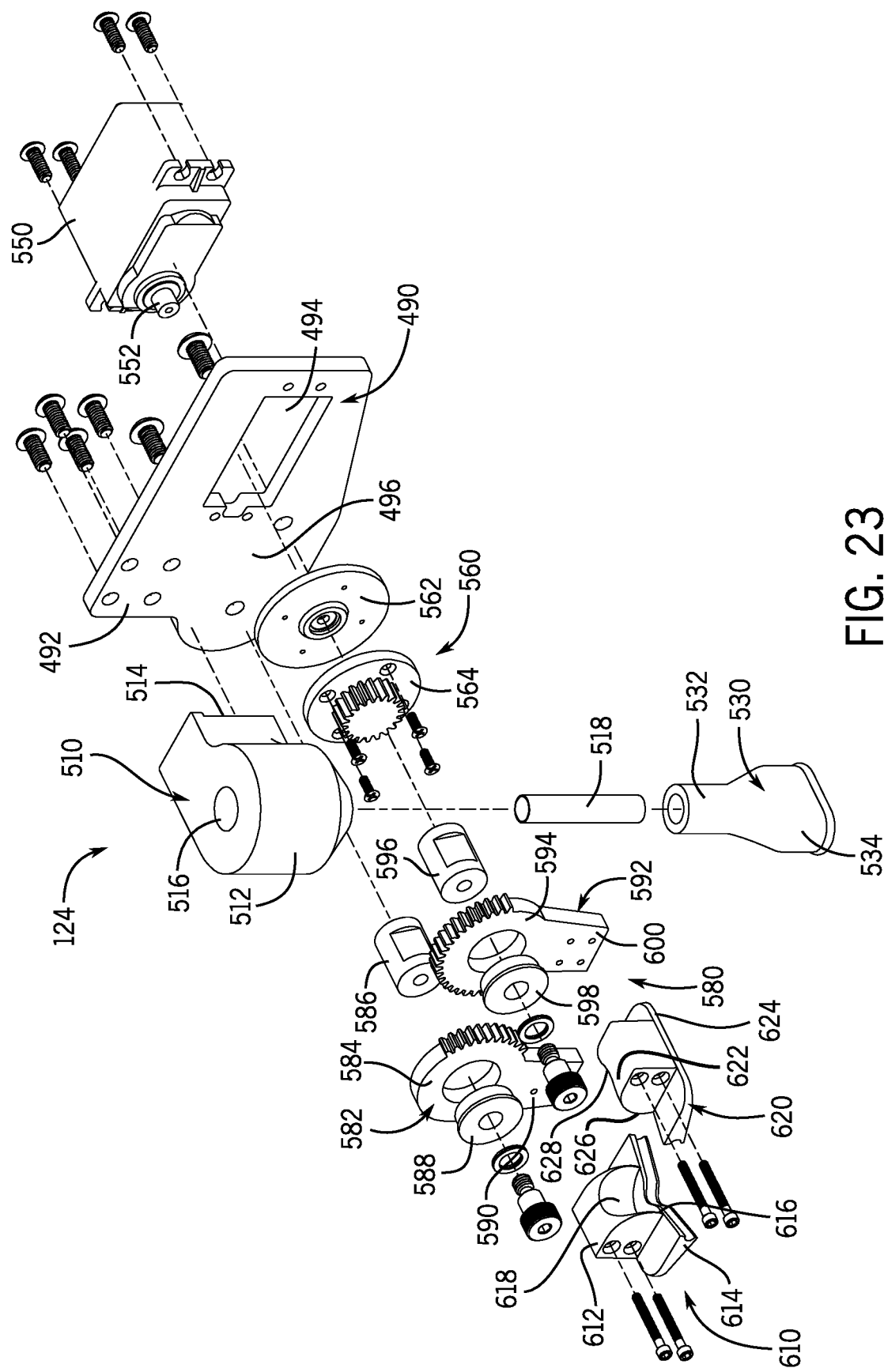
FIG. 23 is a first exploded view of the pinching nozzle apparatus of FIGS. 21 and 22 according to an example embodiment.
Figure 24:
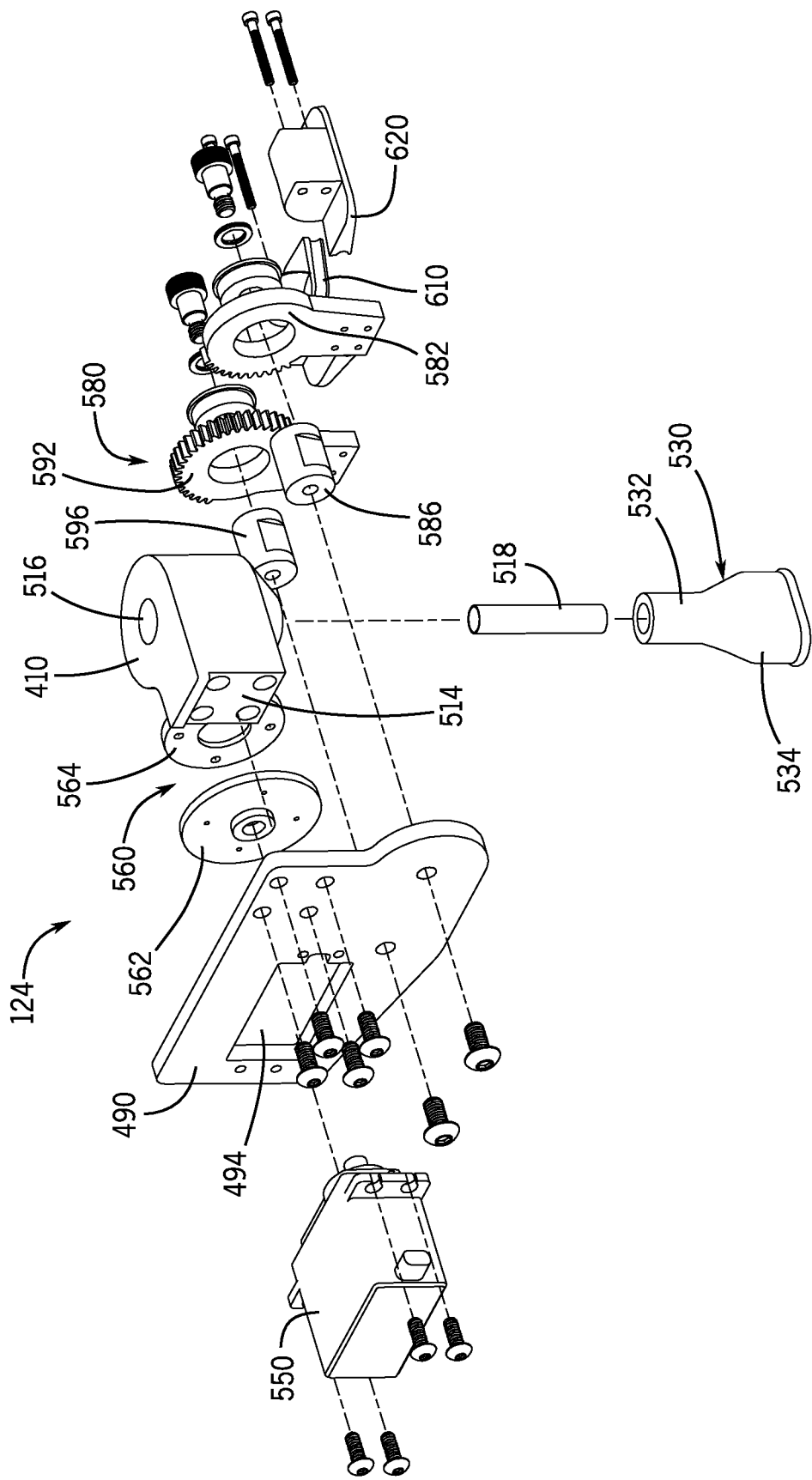
FIG. 24 is a second exploded view of the pinching nozzle apparatus of FIGS. 21 and 22 according to an example embodiment.

The rotation of the nozzle holder 410 (and associated internal partial flow path) enables the implementation of one or more functions, which will be discussed below with reference to FIGS. 18A-20C. In the discussion below, FIGS. 18A, 19A, and 20A are side views of the switching nozzle apparatus 122; FIGS. 18B, 19B, and 20B are cross-sectional views of the switching nozzle apparatus 122; and FIGS. 18C, 19C, and 20C are more detailed portions of the cross-sectional views of the switching nozzle apparatus 122.

In the description below, the views of FIGS. 18A-18C reflect the switching nozzle apparatus 122 in the normal or nominal position during typical operation to disperse the primary fluid; the views of FIGS. 19A-19C reflect the switching nozzle apparatus 122 in a first cleaning position during a first cleaning event to clear a clog; and the views of FIGS. 20A-20C reflect the switching nozzle apparatus 122 in a second cleaning position during a second cleaning event. The switching nozzle apparatus 122 may be commanded into the various positions by the nozzle cleaning module 134. In one example, the switching nozzle apparatus 122 may be placed into the first or second cleaning position for a cleaning event based on implementation of the nozzle monitoring system and method discussed below. In other examples, the switching nozzle apparatus 122 may be placed into a cleaning position for a cleaning event based on a timing or usage schedule, or based on an operator request or command. Each of the positions are discussed in greater detail below.

Figure 18C:
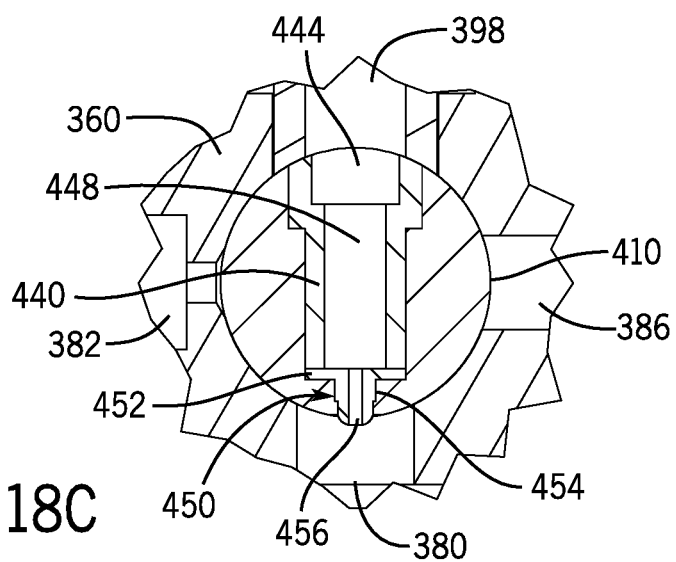

The views of FIGS. 18A-18C reflect a first (or nominal) position of the internal partial flow path of the nozzle holder 410 for spraying primary fluid during typical operation. In this position, nozzle holder 410 is oriented to be fluidly coupled to inlet 400 (represented in FIG. 18B in dashed lines) and such that the internal flow path within the nozzle holder 410 is aligned with the overall primary fluid flow path, e.g., such that the nozzle elements 454 are oriented toward the fluid outlet passage 380 on the bottom face 366 of the sprayer manifold 360 of the nozzle unit 350. Also, in the nominal position, the nozzle holder 410 functions to block the air inlet passage 382 and the air outlet passage 386 within the sprayer manifold 360.

As such, during normal spraying operation, the primary fluid may be commanded or directed through the inlet plate 390 via the inlet plate passage 398. In the nominal position, the inlet plate passage 398 is fluidly coupled to the nozzle retainer 440, particularly the nozzle retainer flange cavity 444 and the nozzle retainer body flow passages 448, which in turn, are fluidly coupled to the nozzle element flow passages 456 of the nozzle array 450. Subsequently, the fluid flows from the nozzle array 450 through the aligned fluid outlet passage 380 of the sprayer manifold 360 to exit the nozzle unit 350 and the switching nozzle apparatus 122.

The views of FIG. 19A-19C reflect a second position of the internal partial flow path within the nozzle holder 410. In many embodiments, the second position may be considered a first cleaning position. As introduced above, the nozzle cleaning module 134 of the controller 104 typically generates a command to place the nozzle holder 410 of the switching nozzle apparatus 122 into the first cleaning position upon indication of a clog condition and initiation of a cleaning event. In particular, upon identification of a clog condition, the actuator 460 receives a command to rotate the nozzle holder 410 to a cleaning position via the drive shaft 466 and the first and second coupling elements 464, 468. In the first cleaning position, the internal flow path within the nozzle holder 410 is "clocked" by 90° in a clockwise direction relative to the nominal position (in the depicted examples) to be oriented such that the internal partial flow path is perpendicular to the other portions of the primary fluid flow path. The internal partial flow path is aligned with an air flow path defined with the air inlet passage 382 and the air outlet passage 386, e.g., such that the nozzle elements 454 of the nozzle array 450 are oriented toward the air inlet passage 382 of the first side face 368 of the sprayer manifold 360 of the nozzle unit 350. In the first cleaning position, the nozzle holder 410 functions to block the inlet plate passage 398 and fluid outlet passage 380. In the first cleaning position, the air inlet passage 382 is fluidly coupled to the nozzle retainer 440, particularly the nozzle element flow passage 456, the nozzle retainer body flow passages 448, and the nozzle retainer flange cavity 444, which in turn, are fluidly coupled to the air outlet passage 386. In this position, upon command, air pressure may be applied through the air inlet passage 382, through the internal partial flow path, and out of the air outlet passage 386 and the switching nozzle apparatus 122. In this manner, the air pressure through the nozzle flow path may clear a clog or any blockage of debris.

The views of FIGS. 20A-20C reflect a third position of the internal partial flow path within the nozzle holder 410. In many embodiments, the third position may be considered a second cleaning position. As introduced above, the controller 104 typically generates a command to place the internal partial flow path within nozzle holder 410 of the switching nozzle apparatus 122 into the second cleaning position upon indication of a clog condition. In particular, upon identification of a clog condition, the actuator 460 receives a command to rotate the nozzle holder 410 via the drive shaft 466 and the first and second coupling elements 464, 468. In the second cleaning position, nozzle holder 410 is "clocked"

by 180° relative to the nominal position such that the internal partial flow path is aligned with the primary fluid flow path, albeit in a direction opposite to the primary fluid flow path. In contrast to the nominal position, the nozzle elements 454 of the nozzle array 450 are oriented toward the top face 364 of the sprayer manifold 360 of the nozzle unit 350. In the second cleaning position, the nozzle holder 410 functions to block the air inlet passage 382 and the air outlet passage 386 within the sprayer manifold 360. Upon command, typically corresponding to nominal or normal spraying operation, the fluid is directed through inlet 400, then to inlet passage 398, through nozzle opening 454, and out of fluid outlet passage 380, thereby functioning to reverse flush nozzle array 450 (e.g., such that any debris buildup in the nozzle array 450 is passed back out through the greater diameter nominal inlet).

The second nozzle apparatus 124 will now be described with reference to FIGS. 21-26B. Generally, the second nozzle apparatus 124 may be considered a pinching nozzle apparatus, as well as a self-cleaning nozzle apparatus. Initially referring to the isometric views of FIGS. 21 and 22 and exploded views of FIGS. 23 and 24, the pinching nozzle apparatus 124 may be considered to include a support bracket 490, a fluid manifold 510, a nozzle element 530, an actuator 550, an actuator gear assembly 560, a pincher gear assembly 580, a first pincher 610, and a second pincher 620. In the discussion below, the terms "above" and "below" may be used as relative directions with respect to a longitudinal axis of flow direction, but generally upon assembly, the pinching nozzle apparatus 124 may have any spatial orientation.

Generally, the support bracket 490 provides a base or mounting structure for the fluid manifold 510, nozzle element 530, actuator 550, actuator gear assembly 560, pincher gear assembly 580, first pincher 610, and second pincher 620. In particular, the support bracket 490 is a plate-structure that defines a manifold mounting portion 492, actuator aperture 494, and pincher gear mounting portion 496. In this example, the manifold mounting portion 492 is provided for mounting the fluid manifold 510 on one side (as a "first side") of the support bracket 490; the actuator aperture 494 is provided for mounting the actuator 550 on the other side (as a "second side") of the support bracket 490; and the pincher gear mounting portion 496 is generally positioned for mounting the pincher gear assembly 580 on the first side below the manifold mounting portion 492 and the actuator aperture 494.

The fluid manifold 510 generally includes a manifold base 512 that defines a manifold mount 514 that is oriented to be fastened to the support bracket 490, particularly the manifold mounting portion 492 of the support bracket 490, with any suitable fasteners (e.g., screws). The manifold base 512 further defines a manifold passage 516 into which a first end of a manifold passage element 518 may be inserted such that a second end of the manifold passage element 518 extends out of the manifold passage 516.

The nozzle element 530 is attached to an end of the manifold passage element 518. In one example, the nozzle element 530 is formed by a nozzle element inlet portion 532 and a nozzle element outlet portion 534. The nozzle element inlet portion 532 is a sleeve-type structure that at least partially slides onto the manifold passage element 518 to secure the nozzle element 530 to the overall pinching nozzle apparatus 124. The nozzle element outlet portion 534 flares outward in transverse directions from the distal end of the nozzle element inlet portion 532. In one example, the nozzle element outlet portion 534 is a fan or oval-shaped structure with a long axis extending transversely (e.g., front to back), perpendicular from the support bracket 490. In other examples, the nozzle element outlet portion 534 is a fan or oval-shaped structure with a long axis extending laterally (e.g., side to side), parallel to the plane of the support bracket 490.

The nozzle element 530, particularly the nozzle element outlet portion 534, may be formed by a resilient or flexible material, such as rubber or an elastomer material, that as discussed below, may be deformed to facilitate the clearance of debris that may otherwise clog the nozzle element 530 and overall primary flow path. In this example, the flow path defined by the manifold passage 516, the manifold passage element 518, and the nozzle element 530 is generally "downward," parallel to the orientation of the support bracket 490.

The pinching nozzle apparatus 124 further includes the actuator 550 that is attached to the second side of the support bracket 490 (e.g., the side opposite to the mounting side of the fluid manifold 510 and nozzle element 530) such that at least a portion of the actuator 550 extends through the actuator aperture 494. The actuator 550 may be a rotary actuator such as a motor, e.g., an indexing motor, a servo, or a stepper motor, although other types of actuators may be provided. In this example, the actuator 550 includes a drive shaft 552 that projects from the base of the actuator 550 through the actuator aperture 494.

The actuator gear assembly 560 is rotationally coupled to a distal end of the drive shaft 552 on an opposite side (e.g., the front side) of the support bracket 490 as the actuator 550. In particular, the actuator gear assembly 560 includes an actuator disk 562 that is rotationally coupled to the drive shaft 552 and an actuator gear 564 mounted to the actuator disk 562. The actuator gear 564 may be supported on the actuator disk 562 in any suitable manner, including by fasteners such as screws. As described in greater detail below, the actuator gear 564 is generally disk-shaped with a circular or cylindrical row of teeth projecting from a perimeter on a front side of the actuator gear 564.

The pincher gear assembly 580 is generally formed by a first pincher gear 582 and second pincher gear 592 that are actuated cooperatively to pinch the nozzle element 530. The first pincher gear 582 is formed by ring portion 584 that is mounted to the support bracket 490 with a pincher pivot element 586 and a pincher pivot mounting structure 588. In particular, a first end of the pincher pivot element 586 is secured to the support bracket 490 with a fastener (e.g., a screw) and the ring portion 584 is secured to a second end of the pincher pivot element 586 with the pincher pivot mounting structure 588. The pincher pivot mounting structure 588 may be at least partially inserted into the ring portion 584 of the first pincher gear 582 such that the first pincher gear 582 is pivotable relative to the pincher pivot element 586 or with the pincher pivot element 586 relative to the support bracket 490. The pincher pivot mounting structure 588 may include a screw or fastener, a bearing element, and/or a washer to secure the first pincher gear 582 while enabling a pivoting movement, as discussed below. As also described in greater detail below, the ring portion 584 of the first pincher gear 582 has an outer periphery section with outwardly extending teeth.

The first pincher gear 582 further includes a pincher element mount portion 590 that generally extends downward from the ring portion 584. As described in greater detail below, the pincher element mount portion 590 generally provides a mounting location that supports the first pincher 610 to pivot with the first pincher gear 582.

The second pincher gear 592 is generally similar to the first pincher gear 582. As such, the second pincher gear 592 is formed by a ring portion 594 that is mounted to the support bracket 490 with a pincher pivot element 596 and a pincher pivot mounting structure 598. In particular, a first end of the pincher pivot element 596 is secured to the support bracket 490 with a fastener (e.g., a screw) and the ring portion 594 is secured to a second end of the pincher pivot element 596 with the pincher pivot mounting structure 598. In particular, the pincher pivot mounting structure 598 may be at least partially inserted into the ring portion 594 of the second pincher gear 592 such that the second pincher gear 592 is pivotable relative to the pincher pivot element 596 or with the pincher pivot element 596 relative to the support bracket 490. The second pincher gear 592 further includes a pincher element mount portion 600 that generally extends downward from the ring portion 594. As described in greater detail below, the pincher element mount portion 600 generally provides a mounting location that supports the second pincher 620 to pivot with the second pincher gear 592.

The ring portion 594 of the second pincher gear 592 has an outer periphery section with outwardly extending teeth. In this example, the teeth of the second pincher gear 592 extend around the periphery of the ring portion 594 to a greater extent than that of the ring portion 584 of the first pincher gear 582.

Upon assembly, the teeth of the second pincher gear 592 engage both the teeth of the first pincher gear 582 and the teeth of the actuator gear assembly 560. As such, the actuator gear assembly 560 is positioned to drive both of the pincher gears 582, 592. Moreover, since the second pincher gear 592 is in between the first pincher gear 582 and the actuator gear 564, the actuator gear assembly 560 functions to drive each of the pincher gears 582, 592 in different directions, as discussed in greater detail below.

As noted above, the first and second pinchers 610, 620 are respectively mounted on the pincher gears 582, 592. Collectively, and optionally in combination with one or more other cooperating structures or elements, one or more of the pinchers 610, 620 and/or one or more of the pincher gears 582, 592 may be considered a pincher assembly.

Each pincher 610, 620 is formed by pincher base 612, 622 that is secured to the respective pincher gear 582, 592. Each pincher 610, 620 includes a pair of pincher flanges 614, 624 that extend in each direction on the underside of the pincher base 612, 622 to support the pincher 610, 620. Each pincher base 612, 622 and/or pincher flange 614, 624 may be considered to include a concave portion formed by pincher teeth 616, 626 on either side of a pincher mouth 618, 628. As shown, the pincher mouth 618 of the first pincher 610 is oriented towards the pincher mouth 628 of the second pincher 620. During operation, the pinchers 610, 620 may be selectively pivoted via the pincher gears 582, 592 through a range of positions between a first position and a second position (e.g., between a pinched position and an unpinched position or between a deformed position and an undeformed position).

As introduced above, the nozzle cleaning module 134 of the controller 104 may command a pinching, deformation, resizing, or modification of the pinching nozzle apparatus 124, particularly with respect to the eccentricity or shape of the nozzle element 530. In one example, the pinching nozzle apparatus 124 may nominally operate in a pinched position, and upon identification of a clogged condition, the nozzle cleaning module 134 may initiate a cleaning event in which the pinching nozzle apparatus 124 is placed into an unpinched position such that the widening and/or change in shape releases the clogging debris from the nozzle element 530. In a further example, the pinching nozzle apparatus 124 may nominally operate in an unpinched position, and upon identification of a clogged condition, the nozzle cleaning module 134 may initiate a cleaning event in which the pinching nozzle apparatus 124 is placed into a pinched position such that the nozzle element 530 is deformed to break apart and clear the clogging debris from the nozzle element 530. Either mechanism (e.g., pinching or unpinching) may be used, or such mechanisms may be used in combination to clean the nozzle element 530.

Figure 25A:
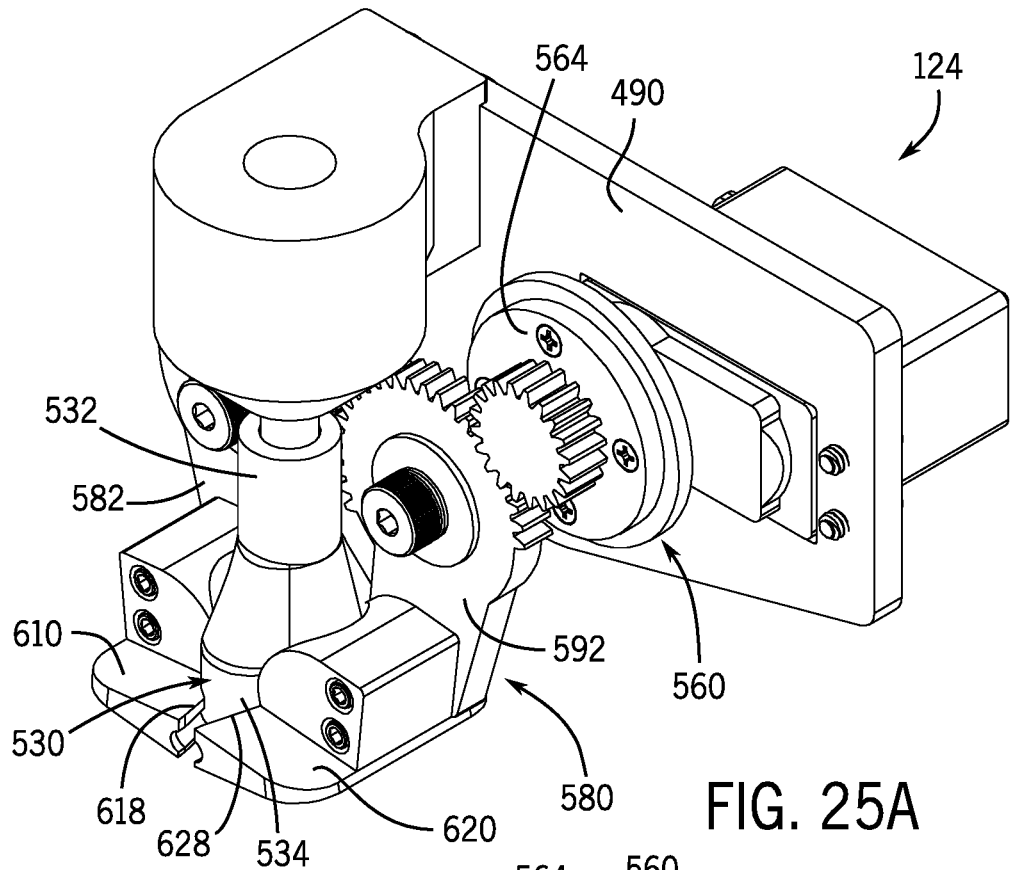
FIGS. 25A and 25B are respective isometric and cross-sectional views of the pinching nozzle apparatus of FIGS. 21 and 22 in a pinched position according to an example embodiment.
Figure 25B:
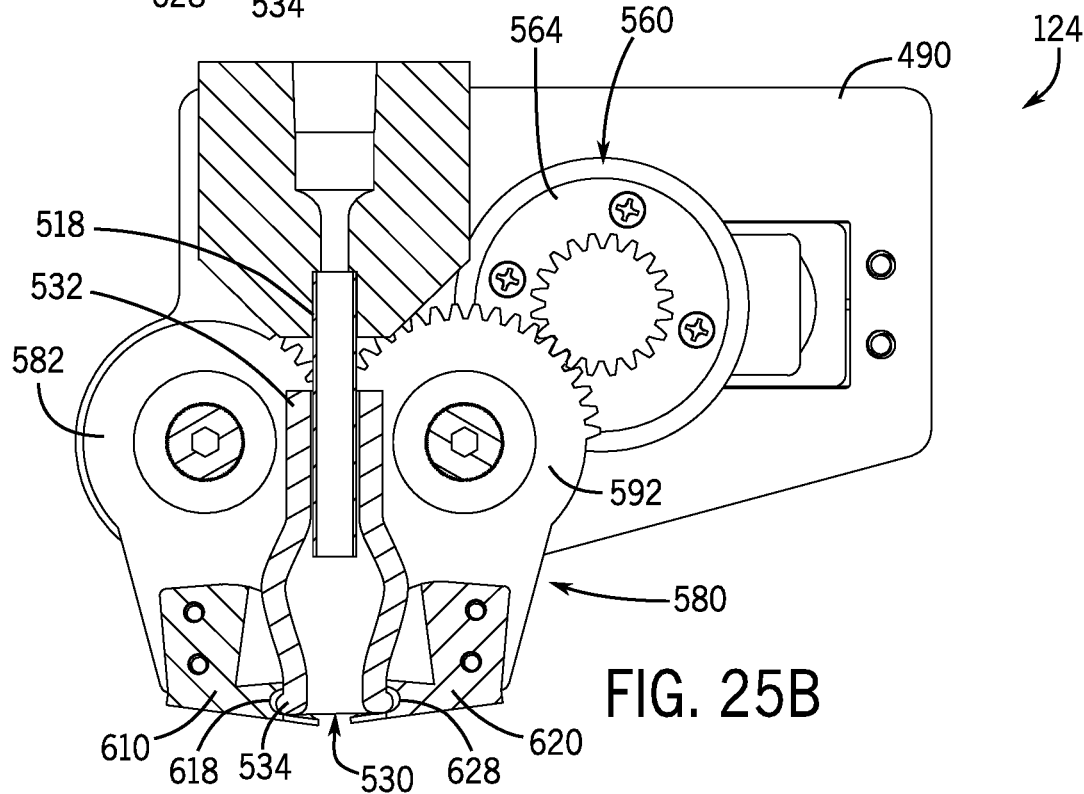

The pinching nozzle apparatus 124 in the pinched position will now be described with reference to FIG. 25A, which is a side or isometric view of the pinching nozzle apparatus 124, and FIG. 25B, which is a cross-sectional view of the pinching nozzle apparatus 124. In the pinched position, the actuator gear 564 and the engaged pincher gear assembly 580 have pivotal positions such that the pincher mouths 618, 628 of pinchers 610, 620 engage and deform the nozzle element outlet portion 534 of the nozzle element 530. In other words, in this position, the mouths 618, 628 of the pinchers 610, 620 are positioned to have a smaller width than a corresponding undeformed width of the nozzle element outlet portion 534.

As introduced above, in one example, the nozzle cleaning module 134 of the controller 104 may command a cleaning event in response to detection of a clog, or in accordance with a time schedule or upon manual request from the operator. The movement of the pinching nozzle apparatus 124 in response to a command for the cleaning event is depicted by the side view of FIG. 26A and the cross-sectional view of FIG. 26B. In particular, the nozzle cleaning module 134 provides a signal to the actuator 550 to drive the actuator gear 564 in a first direction (e.g., clockwise), which in turn drives the second pincher gear 592 in an opposite direction (e.g., counter-clockwise), which further drives the first pincher gear 582 in the first direction (e.g., clockwise), thereby resulting in the mounted pinchers 610, 620 moving away from one another to "unpinch" the nozzle element outlet portion 534. In this position, the pinchers 610, 620 generally surround the nozzle element outlet portion 534 so as to not deform the nozzle element outlet portion 534 of the nozzle element 530. In other words, in this position, the mouths 618, 628 are wider or otherwise approximate the size (e.g., the width) of the nozzle element outlet portion 534. In another example, the positions of the pinchers 610, 620 may be wider than the pinched positions, although still partially deforming the nozzle element 534 (e.g., "less pinched"). The resulting repositioning, resizing, and movement of the nozzle element outlet portion 534 may function to dislodge or otherwise allow passage of debris through the nozzle element 530, thereby clearing any clogs or potential clogs.

Figure 26A:
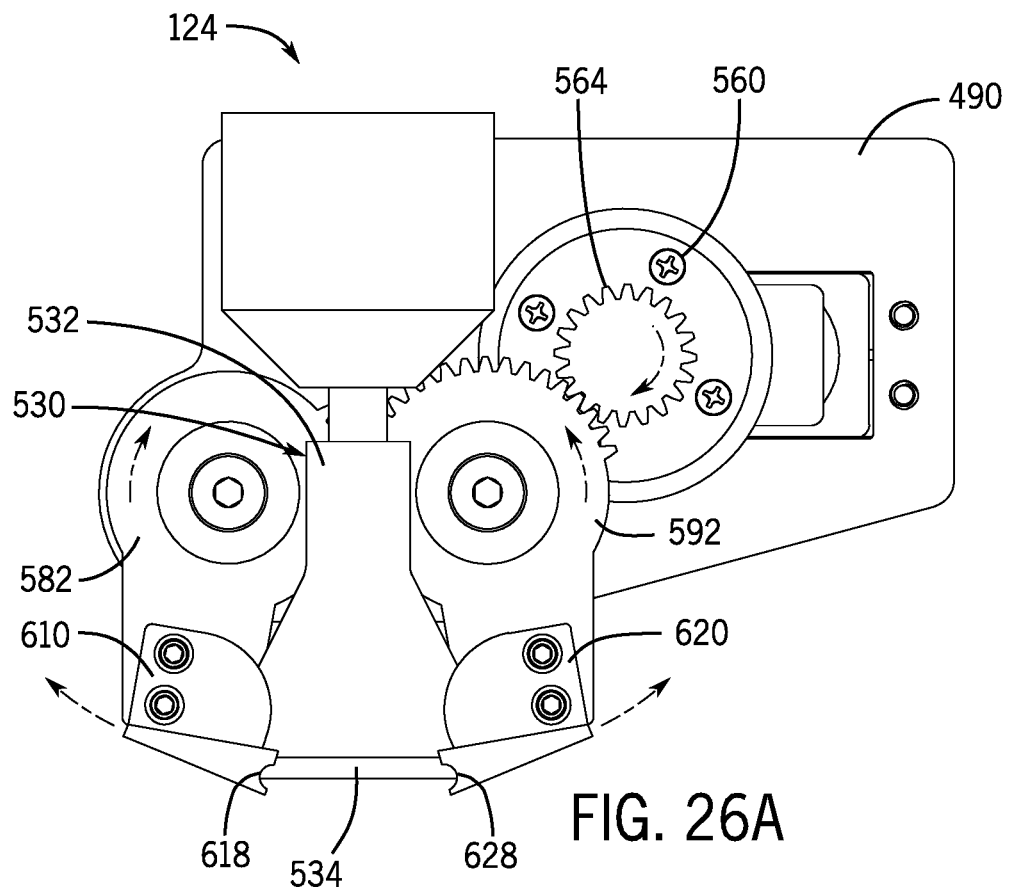
FIGS. 26A and 26B are respective side and cross-sectional views of the pinching nozzle apparatus of FIGS. 21 and 22 in an unpinched position according to an example embodiment.
Figure 26B:
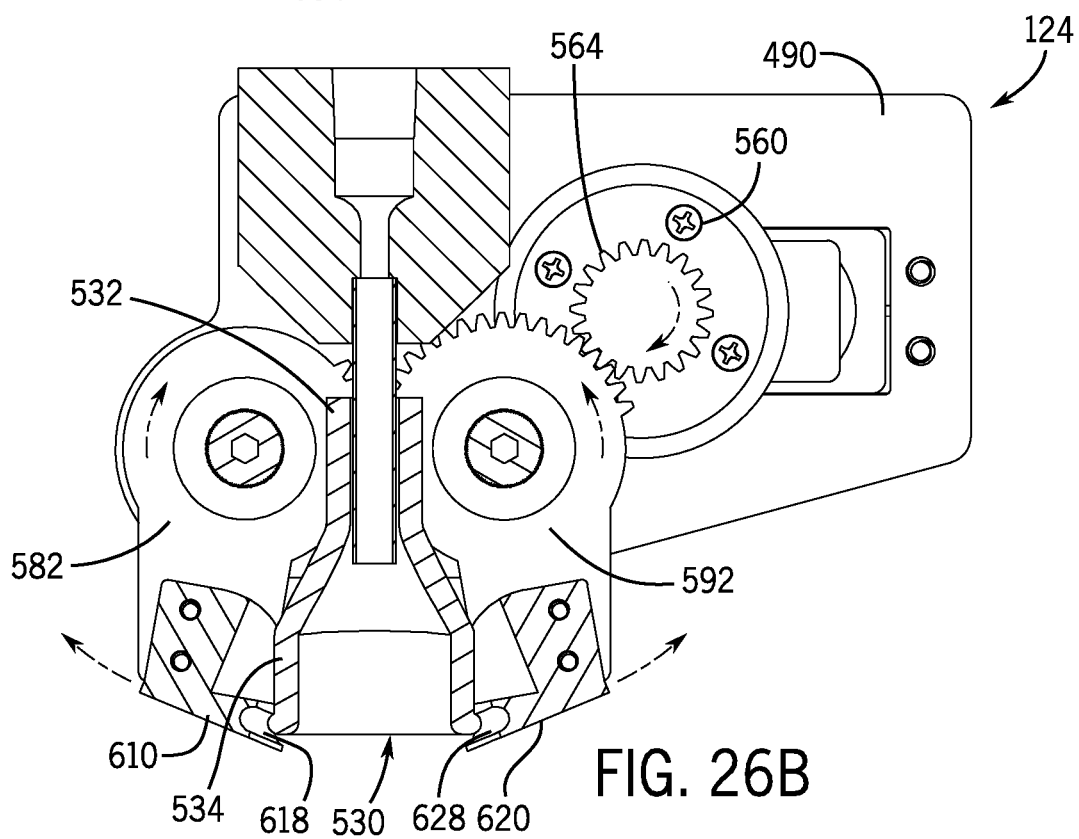

After unpinching of the nozzle element outlet portion 534, reflected in FIGS. 26A and 26B, the actuator 550 may be commanded to return the pinchers 610, 620 to the pinched position. In other words, the actuator 550 may drive the actuator gear 564 in the second direction (e.g., counter-clockwise), which in turn drives the second pincher gear 592 in the first direction (e.g., clockwise), which further drives the first pincher gear 582 in the second direction (e.g., counter-clockwise), thereby resulting in the mounted pinchers 610, 620 moving toward one another to again "pinch" the nozzle element outlet portion 530. In some embodiments, the pinching and releasing of the nozzle element outlet portion 534 may be repeated multiple times.

Although referenced above as being commanded by the nozzle cleaning module 134, the pinching nozzle apparatus 124 may also be used to set and/or modify a spray pattern of fluid through the nozzle element 530. In this context, the nozzle cleaning module 134 may further be considered a nozzle adjustment module and/or the controller 104 may additionally include a separate nozzle adjustment module such that the controller 104 may actively control spray patterns. Such spray patterns may be set and/or modified in order to enhance the efficacy of the sprayer system 102, for example, based on crop, spraying purpose, and/or fluid application conditions (terrain, weather, speed, and the like). In particular, the pinching nozzle apparatus 124 may provide a first spray pattern when the pinchers 610, 620 are placed in the pinched position (as discussed above), such as a more focused or tighter spray pattern; and the pinching nozzle apparatus 124 may provide a second spray pattern when the pinchers 610, 620 are placed in the unpinched position (as discussed above), such as a more diffuse or wider spray pattern. In further examples, the pinching nozzle apparatus 124 may provide additional spray patterns by placing the pinchers 610, 620 in intermediate or partially pinched positions.

In the depicted example and as noted above, the nozzle element outlet portion 534 flares outward as a fan or oval-shape. However, any suitable cross-sectional shape may be provided. In one example, the nozzle element outlet portion 534 may have a circular shape, e.g., with an eccentricity ratio of zero, in an unpinched position. In such an example, the pinching nozzle apparatus 124 may be commanded to other eccentricity ratios, including those between zero and one, in pinched positions in order to provide a desired spray pattern; and/or the pinching nozzle apparatus 124 may be initially commanded to a non-zero eccentricity ratio for nominal operation and then released to a zero eccentricity ratio in order to release debris that may be clogging the pinching nozzle apparatus 124 (or vice versa).

Aspects of the sprayer system 102 and the nozzle apparatuses 122, 124 may be considered within the context of a nozzle monitoring system that operates to monitor the sprayer system 102 for a partially or fully clogged nozzle element (generally, a "clogged nozzle element") and, if necessary or desired, generate a command to the appropriate nozzle apparatus 122, 124 to perform a cleaning event (examples of which are detailed above) to remove or mitigate the debris of the clogged respective nozzle element. As such, the nozzle monitoring system may be considered to be an aspect of the sprayer system 102 and particularly include the nozzle cleaning module 134 of the controller 104, one or more of the sensors 108, and/or one or more of the nozzle apparatuses 122, 124.

The monitoring operation of the nozzle cleaning module 134 will now be described in greater detail below with reference to FIG. 27, which depicts a flowchart of a method 700 for monitoring and cleaning a nozzle element (e.g., a nozzle element of one or more of the nozzle apparatuses 122, 124). The method 700 is described below within the context of a single nozzle element. However, the method 700 may be implemented with respect to a number of nozzle elements, either simultaneously, within some type of sequence, or a mixture thereof. Moreover, the method 700 may be implemented continuously, on demand, and/or according to a time, distance, or usage schedule. In the discussion below, the method 700 is described as being performed or facilitated by the nozzle cleaning module 134 (e.g., instructions stored in the memory 136b executed by the processor 136a), although other processing mechanisms may be provided.

Figure 27:
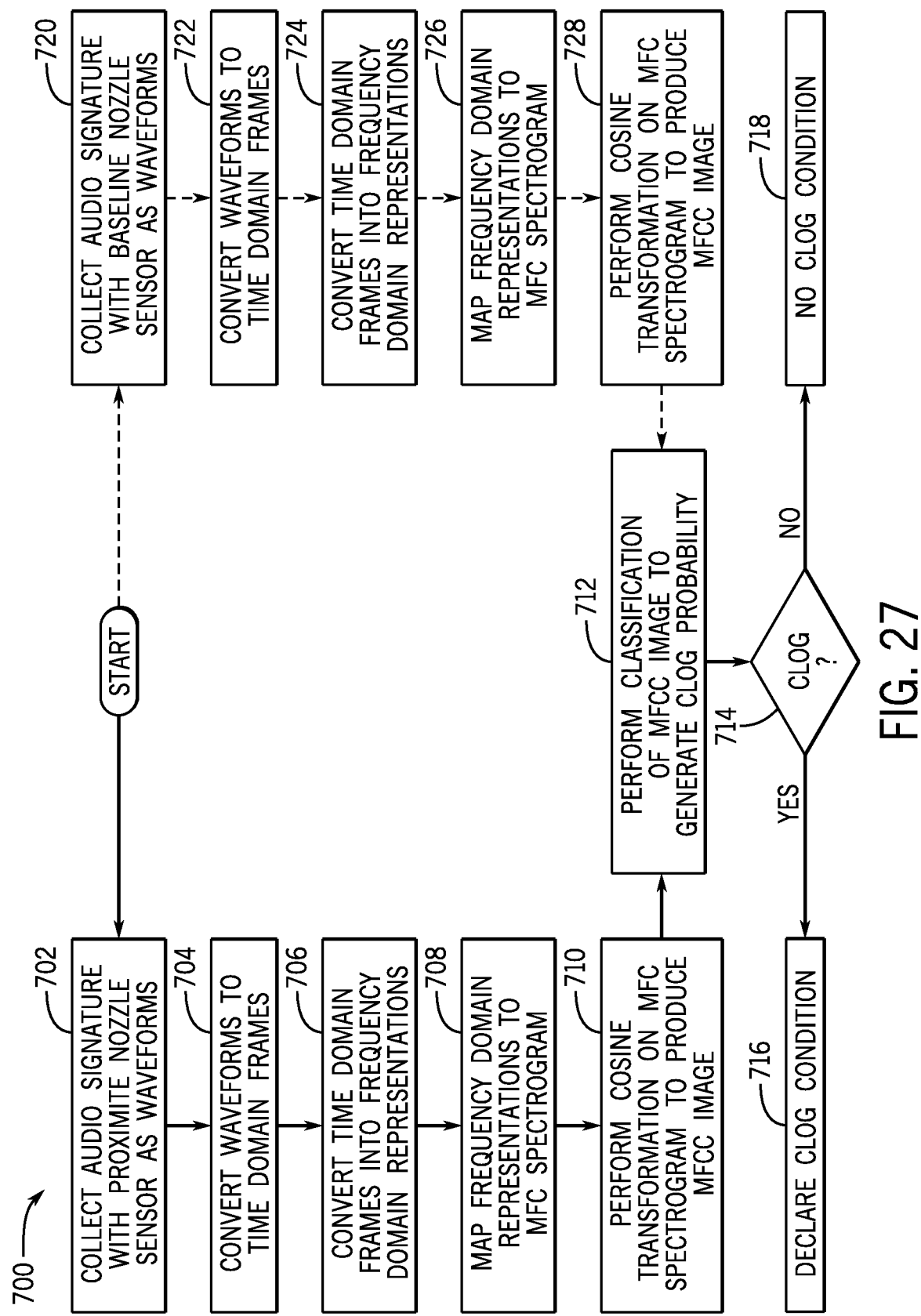
FIG. 27 is a flowchart depicting a method for monitoring a nozzle apparatus device according to an example embodiment.

With reference to the method 700 of FIG. 27, in an initial step 702, a sensor (e.g., piezoelectric sensor 108f, 108h) proximate to the nozzle element may collect or generate signals associated with the vibration in the form of audio signatures such as waveforms generated primarily by the respective nozzle element. In effect, the sensors record the vibrations associated with the operating nozzle elements. The signals are provided to the nozzle cleaning module 134 for evaluation of the waveforms and subsequently generating a response to the evaluation, e.g., initiating and implementing a cleaning event as discussed above.

In step 704, the waveforms are converted or otherwise expressed by the nozzle cleaning module 134 into time domain frames of audio representations or audio data files. In effect, the analog signals from the sensor of step 702 may be transformed into digital signals in step 704. As an example, the waveforms may be expressed as amplitudes of the detected vibrations over a span of time as a duration according to a sampling rate. One or more such waveforms may be collected and further processed according to step 706.

The duration and/or sampling rate may be static or dynamic, and may be adjusted and/or set based on vehicle conditions, such as to avoid collecting data around other known noise generating events impacting nominal nozzle performance, e.g. pump pressure spikes, low pressure events, valve closures, and engine throttles. Generally, the signals should be collected in a way that improves signal to noise ratio with respect to the nozzle relative to all other sources. Typically, the longer the duration, the less sensitivity to nozzle fluctuations caused by intermittent pressure changes, valve openings and other temporary nozzle issues, but the longer durations may require more time to detect clogs or nozzle issues. In one example, the duration may be approximately two seconds.

In step 706, the time domain frames are converted by the nozzle cleaning module 134 into one or more frequency domain representations, each of which may be defined by a frequency scale and an amplitude scale. In one example, the frequency domain representation may be generated by a Fourier transform that expresses the frequency domain representation as functions of time. Such Fourier transform may be, for example, a discrete Fourier transform (DFT) or a fast Fourier transform (FFT).

In step 708, the frequency domain representation is mapped or wrapped by the nozzle cleaning module 134 onto Mel-frequency cepstrum scale (MFC) spectrograms. In one example, log functions of the amplitudes of the frequency domain representation are determined and then mapped onto the MFC scale using triangular overlapping windows to generate the MFC spectrograms.

In step 710, a cosine transformation is performed on the MFC spectrogram by the nozzle cleaning module 134 to produce an image of MFC coefficients. In one example, step 710 is implemented by taking the log functions of the powers at each Mel-frequency and performing a discrete cosine transform of the collection of Mel log powers to establish the MFC coefficients. In other words, the amplitudes of the discrete cosine transformations are the MFC coefficients, which may be represented as an image. It is contemplated that the cosine transformation hides nuances of the MFC spectrogram and enhances audio power distribution of desired frequencies. The mathematical portions of steps 708 and/or 710 may be implemented with any suitable processing package or library, such as the LibROSA package that facilitates the extraction of features from audio signals.

Figure 28:
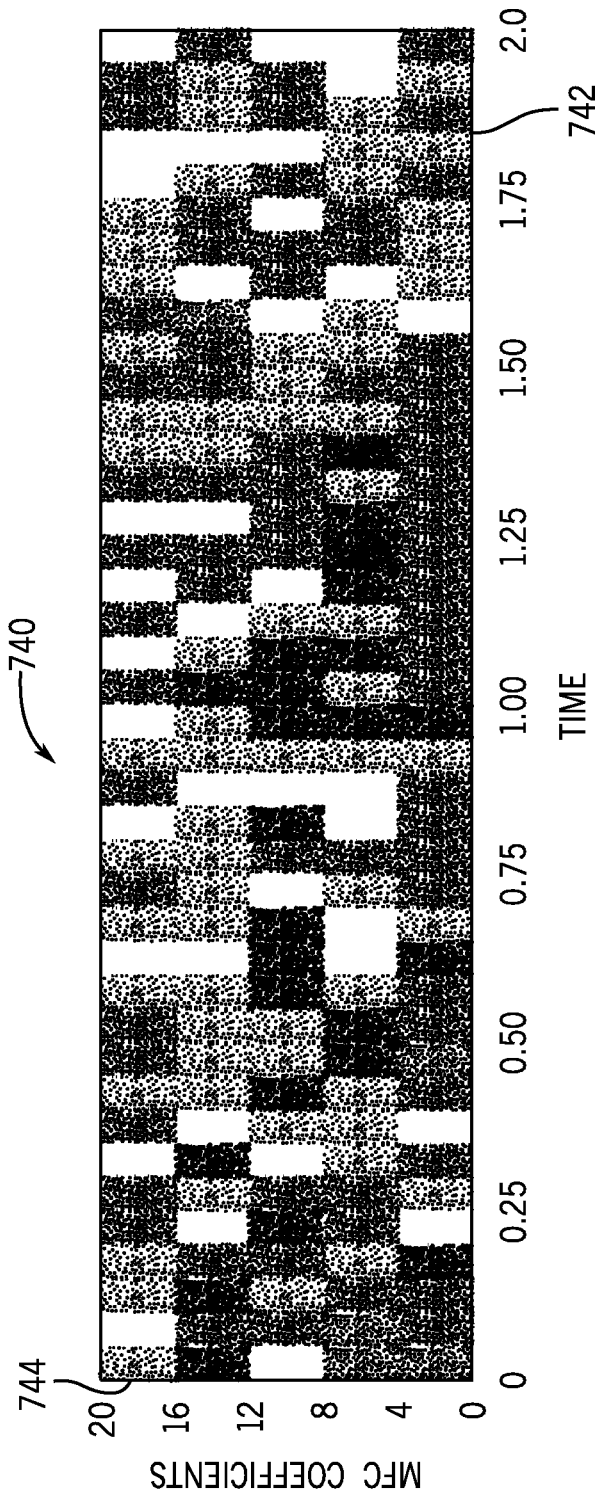
FIG. 28 is an example MFC coefficient image that may be utilized in the nozzle apparatus monitoring method of FIG. 27 according to an example embodiment.

As noted, in one example of step 710, the MFC coefficients may be represented by an image, particularly a two-dimensional MFC coefficient image of the frequency domain audio representation of the vibration signatures. One example of the MFC coefficient image is provided by the image 740 of FIG. 28 in which the MFC coefficients are represented on a vertical axis 744 as a function of time on the horizontal axis 742. In this example, the one-dimensional MFC coefficients are recorded over a collection of samples for a two second recording window to generate the two-dimensional array expressed by the image 740 of FIG. 28. In effect, the MFC coefficients are represented within the MFC coefficient image 740 of FIG. 28 as relative intensity values that may be further considered in the steps below.

Generally, regarding steps 708 and 710, each MFC spectrogram represents the short-term power spectrum of a sound based on a linear cosine transform of a log power spectrum on a nonlinear Mel-based scale of frequency; and the MFC coefficients that collectively make up the MFC spectrogram are derived from a type of cepstral representation of the audio clip (e.g., a nonlinear "spectrum-of-a-spectrum"). It is further contemplated that the difference between a cepstrum-only based spectrogram as compared to the MFC spectrogram is that the frequency bands are equally spaced on the Mel-based scale, which approximates a human auditory system response more closely than the linearly-spaced frequency bands used in the normal cepstrum. As such, this frequency wrapping may allow for better representation of human auditory sound. In other words, the MFC spectrograms may better represent the sound that an operator would "hear" from the nozzle elements. This attribute may be relevant in the context of operator experiences in which the operators believe one can "hear" the difference between a clogged nozzle element and a clear nozzle element, if such elements can be isolated or accessed. As such, it is contemplated that mapping of the data into the MFC spectrograms provides a representation that better simulates human hearing and may provide better results.

In step 712, the MFC coefficient images considered by the nozzle cleaning module 134 are submitted to image classification and/or recognition (generally, "classification") in order to generate a clog condition probability for the respective nozzle element. The classification may be executed by a neural network, particularly a convolutional neural network (CNN) in one example. That is, the MFC coefficient images are applied through a convolutional neural network to classify nozzle types and/or detected nozzle clogs, as will be described in greater below.

In step 714, the nozzle cleaning module 134 evaluates the clog condition probability to determine if a clog condition is present. In one example, the clog condition is declared if the clog condition probability exceeds or is equal to a predetermined clog condition threshold, and a clog condition is not declared if the clog condition probability is less than the predetermined clog condition threshold. The establishment of one or more suitable predetermined clog condition thresholds is discussed in greater detail below.

If a clog condition is declared in step 714, the method proceeds to step 716 in which the nozzle cleaning module 134 generates a command to implement a cleaning event for the respective nozzle element. As an example, the nozzle cleaning module 134 may generate a command to implement a cleaning event for the switching nozzle apparatus 122 in which the internal partial flow path is pivoted to receive a cleaning air flow and/or fluid flow to dislodge and remove debris of a clog. Additionally or alternatively, the generated command may implement a cleaning event for the pinching nozzle apparatus 124 in which a nozzle element is pinched by cooperating pinchers to dislodge and remove debris of a clog.

If a clog condition is not identified in step 714, the method proceeds to step 718 in which no command for a cleaning event is generated by the nozzle cleaning module 134. Subsequently, the nozzle cleaning module 134 may continue to monitor the respective nozzle element according to the preceding steps to declare a cleaning event if and/or when the clog condition occurs.

In one example, the method 700 includes the steps 702, 704, 706, 708, 710, 712, 714, and 716 in order to monitor the nozzle elements. In other examples, additional steps may be also be implemented with the method 700 to improve the monitoring of the nozzle elements. In particular, the nozzle cleaning module 134 may consider additional information in step 712, and such data may be represented by additional MFC coefficient images generated by steps 720, 722, 724, 726, and 728 in FIG. 27. In the discussion below, the MFC coefficient images provided by steps 702, 704, 706, 708, and 710 may be considered "nozzle MFC coefficient images" and MFC coefficient images provided by steps 720, 722, 724, 726, and 728 may be considered "baseline MFC coefficient images," referring to the relative proximity of the sensor on which the image is based to the nozzle element.

Generally, in step 720, a sensor (e.g., piezoelectric sensor 108e, 108g) that is not proximate to the respective nozzle element may collect or generate signals associated with an audio signature in the form of a waveform generated on the work vehicle 100 away from the respective nozzle element. In effect, the sensor in step 720 collects waveforms that may be considered baseline waveforms of audio signatures that may be provided to the nozzle cleaning module 134 for evaluation. Such baseline waveforms may facilitate the distinction between background noise on the work vehicle 100 and noise originating from the nozzle elements. Further, the steps 722, 724, 726, and 728 are respectively analogous to steps 704, 706, 708, and 710 in which the waveforms are converted into an image of MFC coefficients that represents the baseline waveforms, e.g., as a "baseline MFC coefficient image." Subsequently, the baseline MFC coefficient images of step 728 may be considered by the neural network of step 712, introduced above, as additional information to increase confidence in the clog condition probability generated from the nozzle MFC coefficient images from step 710. In other words, the clog condition probability in step 712 may be considered with or without the baseline MFC coefficient images resulting from a combination of steps 722, 724, 726, and 728. In some examples, the baseline MFC coefficient images may enable the neural network of step 712 to consider and in effect "remove" the impact of background noise that does not reflect the condition of the respective nozzle element.

As appearing herein and generally referring to step 712, the term "neural network" algorithm refers to a computer-readable program having a structure composed of multiple layers of interconnected nodes or neurons. The particular structure of a utilized neural network algorithm may vary between embodiments of the present disclosure, noting that several types of neural network algorithms currently exist (including, for example, convolutional neural networks well-suited for image processing as pertinent to several of the work machine applications mentioned herein) and additional neural network types continue to be developed. Generally, a neural network algorithm may include an input layer into which data is fed (e.g., the nozzle MFC coefficient images and/or the baseline MFC coefficient images respectively corresponding to the nozzle and baseline audio waveforms captured by sensors 108 onboard the work vehicle 100); a final output layer at which processing results appear; and any number of hidden layers between the input and output layers. Each node contained in a given layer of the neural network algorithm may be connected to some, if not all of the nodes in a subsequent network layer, thereby forming a processing structure loosely akin to a biological neural network. Prior to implementing the neural network during "live" operation, the neural network may be "trained" by inputting MFC coefficient images that reflect known clogged conditions and MFC coefficient images that reflect known unclogged conditions. Additionally, the behavior or performance of a neural network algorithm may be modified by adjusting certain parameters associated with the nodes and connections of the neural network, including the activation strength or "weight" between node-to-node connections and, in many cases, an inactivity bias assigned to each node. Through iteratively introduction of such known images and associated conditions and modifying such parameters using feedback data, the neural network algorithm may be trained to improve the algorithm performance; that is, the tendency of the algorithm to provide a correct or desired result across a range input data set. Such training may be considered "machine learning" when largely automated by providing the neural network algorithm with feedback data (which may be expressed using cost functions, as an example), with the neural network algorithm or an associated algorithm iteratively adjusting the network parameters (e.g., node-to-node weights and inactivity biases) without reliance or with a reduced reliance on direct human programming, to gradually improve the performance of the neural network algorithm.

As part of, or independently of, the training of the neural network algorithm, one or more suitable clog condition thresholds may be established for initiation of a cleaning event. In other words, such clog condition thresholds may be empirically or observationally established in order to provide the desired or appropriate amount of cleaning events (e.g., to avoid implementing cleaning events too often when otherwise unnecessary or too infrequently when otherwise necessary). In some examples, the clog condition thresholds may be set and/or adjustable by the operator or user.

In one example, the nozzle MFC coefficient images from step 710 may be processed with a convolutional neural network in step 712 without consideration of the baseline MFC coefficient images from step 728. In other words, steps 720, 722, 724, 724, 726, 728 may be considered optional. However, in other examples, the nozzle MFC coefficient images from step 710 and baseline MFC coefficient images from step 728 may be processed in conjunction with one another within a convolutional neural network in step 712 in order to provide a higher accuracy and lower training time than other mechanisms, some of which are discussed below.

During implementation of step 712, the nozzle MFC coefficient images and the baseline MFC coefficient images, representing the two audio signature sources, may be generated independently or simultaneously. In one example, the convolutional neural network structure may have multiple convolutional layers (e.g., three layers) and multiple downstream dense layers (e.g., two layers). The convolutional layers may be applied to the nozzle MFC coefficient images and baseline MFC coefficient images individually, and the results of the convolutional layers may be combined and collectively processed according to the dense layers, thereby yielding a clog condition probability for step 712.

Returning to step 714, as above, the nozzle cleaning module 134 may evaluate the clog condition probability. Again, if the clog condition probability exceeds a clog condition threshold, the method 700 proceeds to step 716 to initiate a cleaning event; and if the clog condition probability fails to exceed the clog condition threshold, the method 700 proceeds to step 718 in which a cleaning event is not initiated and the nozzle elements continue to be monitored. As introduced above, such a clog condition threshold may be established empirically or set by the user or operator; and in some examples, the clog condition threshold may be adjusted or modified by the user or operator.

Figure 29:
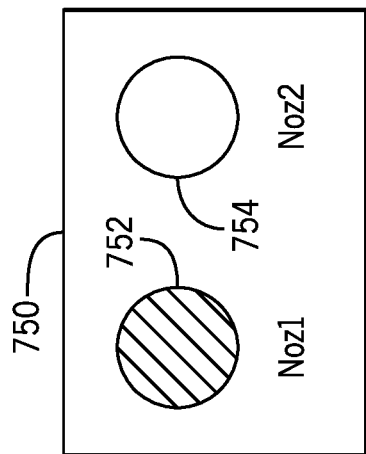
FIG. 29 is an example nozzle clog display that may be utilized in the sprayer system of FIG. 1 according to an example embodiment.

In some examples, the results of steps 716 and 718 may be communicated to operator in any suitable manner. As one example, FIG. 29 depicts a relatively simple display 750 (e.g., corresponding to a display device of operator interface 106 of FIG. 2) in which status indicator 752, 754 (e.g., a light or other suitable mechanism for conveying status) are provided for one or more of the nozzle elements of a work vehicle. In the depicted example, the status indicator 752 is active, thereby indicating that the associated nozzle element is clogged and/or that the associated nozzle element is undergoing a cleaning event; and status indicator 754 is inactive, thereby indicating that the associated nozzle element is not clogged.

Although at least one mechanism for identifying clog conditions is discussed above with reference to FIG. 27, other mechanisms may additionally be provided for identifying a clog condition, including those discussed below as potential modifications to the method 700 of FIG. 27. For example, a frequency analysis may be applied to the frequency domain representation of step 706 in order to identify a clog condition. In particular, the frequency domain representation may be considered to identify and isolate unique peaks that may be compared against baseline peaks to identify a clog condition. As another example, a "k-nearest neighbor" model may be applied to the frequency domain representation of step 706 in which an algorithm considers all available cases and classifies new cases based on a similarity measure (e.g., distance functions) in order to provide a statistical estimation or pattern recognition in order to identify a clog condition.

Accordingly, embodiments discussed herein provide systems and methods to monitor, evaluate, and address clog and debris issues within a sprayer system of a work vehicle.

Also, the following examples are provided, which are numbered for easier reference.

1. A nozzle monitoring system for a sprayer system of a work vehicle comprising: a first sensor configured to generate signals associated with vibrations of a first nozzle apparatus on the work vehicle that disperses a primary fluid from the sprayer system during operation; and a controller having a processor receiving the signals generated by the first sensor and having a memory coupled to the processor and storing instructions, the processor executing the stored instructions to: convert the vibrations into a frequency domain representation; generate an image from the frequency domain representation; classify the image to generate a clog condition probability; and generate, based on the clog condition probability, a command to initiate a cleaning event of the first nozzle apparatus.

2. The nozzle monitoring system of example 1, wherein the controller is further configured to convert the vibrations into time domain frames and to subsequently convert the time domain frames into the frequency domain representation.

3. The nozzle monitoring system of example 2, wherein the controller is further configured to convert the time domain frames into the frequency domain representation with a Fourier transform.

4. The nozzle monitoring system of example 3, wherein the controller is further configured to, prior to generating the image, wrap the frequency domain representation onto a Mel-frequency cepstrum scale (MFC) spectrogram.

5. The nozzle monitoring system of example 4, wherein the controller is further configured to generate the image by performing a cosine transformation on the MFC spectrogram.

6. The nozzle monitoring system of example 5, wherein the controller is further configured to generate the image as an MFC coefficient image by performing the cosine transformation on the MFC spectrogram, identifying amplitudes of the cosine transformation, and expressing the amplitudes as MFC coefficients over time.

7. The nozzle monitoring system of example 6, wherein the controller is further configured to classify the MFC coefficient image with a neural network.

8. The nozzle monitoring system of example 7, wherein the MFC coefficient image generated based on the signals from the first sensor is a nozzle MFC coefficient image, wherein the nozzle monitoring system further comprises a second sensor positioned at a distance from the first nozzle apparatus and configured to generate signals associated with vibrations of the work vehicle during operation; and wherein the controller is further configured to receive the signals from the second sensor, to generate a baseline MFC coefficient image based on the signals from the second sensor, and to classify the nozzle MFC coefficient image with the baseline MFC coefficient image to generate the clog condition probability.

9. The nozzle monitoring system of example 8, wherein the controller is further configured to classify the MFC coefficient image with the neural network as a convolution neural network.

10. The nozzle monitoring system of example 1, wherein the first sensor is a piezoelectric sensor.

11. A sprayer system for dispersing a primary fluid on a work vehicle, comprising: at least a first nozzle apparatus configured to disperse the primary fluid and to execute a cleaning event; a first sensor configured to generate signals associated with vibrations of the first nozzle apparatus during operation; and a controller having a processor receiving the signals generated by the first sensor and having a memory coupled to the processor and storing instructions, the processor executing the stored instructions to: convert the vibrations into a frequency domain representation; generate an image from the frequency domain representation; classify the image with a neural network to generate a clog condition probability; compare the clog condition probability to a clog condition threshold; and generate, when the clog condition probability meets or exceeds the clog condition threshold, a command to initiate the cleaning event of the first nozzle apparatus.

12. The sprayer system of example 11, wherein the controller is further configured to convert the vibrations into time domain frames, to subsequently convert the time domain frames into the frequency domain representation, and to convert the time domain frames into the frequency domain representation with a Fourier transform.

13. The sprayer system of example 13, wherein the controller is further configured to, prior to generating the image, wrap the frequency domain representation onto a Mel-frequency cepstrum scale (MFC) spectrogram, and wherein the controller is further configured to generate the image by performing a cosine transformation on the MFC spectrogram.

14. The sprayer system of example 13, wherein the controller is further configured to generate the image as an MFC coefficient image by performing the cosine transformation on the MFC spectrogram, identifying amplitudes of the cosine transformation, and expressing the amplitudes as MFC coefficients over time 15. The sprayer system of example 14, wherein the controller is further configured to classify the MFC coefficient image with the neural network as a convolutional neural network.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random-access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A nozzle monitoring system for a sprayer system of a work vehicle comprising:
    a first sensor configured to generate signals associated with vibrations of a first nozzle apparatus on the work vehicle that disperses a primary fluid from the sprayer system during operation; and
    a controller having a processor receiving the signals generated by the first sensor and having a memory coupled to the processor and storing instructions, the processor executing the stored instructions to:
        convert the vibrations into a frequency domain representation;
        generate an image from the frequency domain representation;
        execute image recognition to classify the image with regard to a clog condition;
        generate, based on the clog condition of the classified image, a clog condition probability;
        generate, based on the clog condition probability, a cleaning event command; and
        initiate, based on the cleaning event command, a cleaning event of the first nozzle apparatus.

2. The nozzle monitoring system of claim 1, wherein the controller is further configured to convert the vibrations into time domain frames and to subsequently convert the time domain frames into the frequency domain representation.

3. The nozzle monitoring system of claim 2, wherein the controller is further configured to convert the time domain frames into the frequency domain representation with a Fourier transform.

4. The nozzle monitoring system of claim 3, wherein the controller is further configured to, prior to generating the image, wrap the frequency domain representation onto a Mel-frequency cepstrum scale (MFC) spectrogram.

5. The nozzle monitoring system of claim 4, wherein the controller is further configured to generate the image by performing a cosine transformation on the MFC spectrogram.

6. The nozzle monitoring system of claim 5, wherein the controller is further configured to generate the image as an MFC coefficient image by performing the cosine transformation on the MFC spectrogram, identifying amplitudes of the cosine transformation, and expressing the amplitudes as MFC coefficients over time.

7. The nozzle monitoring system of claim 6, wherein the controller is further configured to classify the MFC coefficient image with a neural network.

8. The nozzle monitoring system of claim 7,
    wherein the MFC coefficient image generated based on the signals from the first sensor is a nozzle MFC coefficient image,
    wherein the nozzle monitoring system further comprises a second sensor positioned at a distance from the first nozzle apparatus and configured to generate signals associated with vibrations of the work vehicle during operation; and
    wherein the controller is further configured to receive the signals from the second sensor, to generate a baseline MFC coefficient image based on the signals from the second sensor, and to classify the nozzle MFC coefficient image with the baseline MFC coefficient image to generate the clog condition probability.

9. The nozzle monitoring system of claim 8, wherein the controller is further configured to classify the MFC coefficient image with the neural network as a convolution neural network.

10. The nozzle monitoring system of claim 1, wherein the first sensor is a piezoelectric sensor.

11. A sprayer system for dispersing a primary fluid on a work vehicle, comprising:
    at least a first nozzle apparatus configured to disperse the primary fluid and to execute a cleaning event;
    a first sensor configured to generate signals associated with vibrations of the first nozzle apparatus during operation; and
    a controller having a processor receiving the signals generated by the first sensor and having a memory coupled to the processor and storing instructions, the processor executing the stored instructions to:
        convert the vibrations into a frequency domain representation;
        generate an image from the frequency domain representation;
        execute image recognition with a neural network to classify the image with regard to a clog condition;
        generate, based on the clog condition of the classified image, a clog condition probability;
        compare the clog condition probability to a clog condition threshold;
        generate, when the clog condition probability meets or exceeds the clog condition threshold, a cleaning event command; and
        initiate, based on the cleaning event command, a cleaning event of the first nozzle apparatus.

12. The sprayer system of claim 11, wherein the controller is further configured to convert the vibrations into time domain frames, to subsequently convert the time domain frames into the frequency domain representation, and to convert the time domain frames into the frequency domain representation with a Fourier transform.

13. The sprayer system of claim 12, wherein the controller is further configured to, prior to generating the image, wrap the frequency domain representation onto a Mel-frequency cepstrum scale (MFC) spectrogram, and wherein the controller is further configured to generate the image by performing a cosine transformation on the MFC spectrogram.

14. The sprayer system of claim 13, wherein the controller is further configured to generate the image as an MFC coefficient image by performing the cosine transformation on the MFC spectrogram, identifying amplitudes of the cosine transformation, and expressing the amplitudes as MFC coefficients over time.

15. The sprayer system of claim 14, wherein the controller is further configured to classify the MFC coefficient image with the neural network as a convolutional neural network.

16. The sprayer system of claim 15,
wherein the MFC coefficient image generated based on the signals from the first sensor is a nozzle MFC coefficient image, and
wherein the sprayer system further comprises a second sensor positioned at a distance from the first nozzle apparatus and configured to generate signals associated with vibrations of the work vehicle during operation; and
wherein the controller is further configured to receive the signals from the second sensor, to generate a baseline MFC coefficient image based on the signals from the second sensor, and to classify the nozzle MFC coefficient image with the baseline MFC coefficient image to generate the clog condition probability.

17. The sprayer system of claim 16, wherein the first sensor is a piezoelectric sensor.

18. The sprayer system of claim 17, wherein the second sensor is a piezoelectric sensor.

19. The sprayer system of claim 11, wherein the first nozzle apparatus comprises:
a manifold defining a plurality of manifold faces and a nozzle cavity within an interior of the manifold, wherein the manifold defines a fluid inlet passage extending between a first face of the manifold faces and the nozzle cavity, a fluid outlet passage extending between a second face of the manifold faces and the nozzle cavity, an air outlet passage extending between a third face of the manifold faces and the nozzle cavity, and an air inlet passage extending between an air inlet on at least one of the manifold faces and the nozzle cavity, and wherein the fluid inlet passage is configured to selectively receive the primary fluid and the air inlet passage is configured to selectively receive a flow of air;
a nozzle holder arranged within the nozzle cavity; and
at least one nozzle element mounted to or within the nozzle holder and defining a nozzle element passage with a nozzle element inlet and a nozzle element outlet, and
wherein the nozzle holder is selectively pivotable within the nozzle cavity, including between a nominal position and a cleaning position during the cleaning event initiated by the controller,
wherein, in the nominal position, the nozzle element inlet is oriented toward the fluid passage inlet and the nozzle element outlet is oriented toward the fluid passage outlet such that the primary fluid flows through the fluid inlet passage, through the nozzle element passage, and out of the nozzle element outlet through the fluid outlet passage, and
wherein, in the cleaning position, the nozzle element inlet is oriented toward the air outlet passage and the nozzle element outlet is oriented toward the air inlet passage such that the flow of air is directed through the air inlet passage, through the nozzle element, and out of the air outlet passage to direct at least a portion of any debris within the nozzle element passage from the nozzle element passage out through the air outlet passage.

20. The sprayer system of claim 11, wherein the first nozzle apparatus comprises:
a support plate;
a fluid manifold mounted on the support plate defining a fluid passage to receive the primary fluid;
a fluid nozzle element coupled to the fluid manifold and configured to receive the primary fluid from the fluid passage;
an actuator gear assembly mounted on the support plate;
a pincher gear assembly comprising a first pincher gear and a second pincher gear mounted to the support plate, wherein the first pincher gear is engaged with the second pincher gear and the second pincher gear is engaged with the actuator gear assembly; and
a first pincher mounted on the first pincher gear; and
a second pincher mounted on the second pincher gear, wherein the first and second pincher are positioned on opposite sides of the fluid nozzle element, and
wherein the actuator gear assembly is configured to drive the pincher gear assembly during the cleaning event initiated by the controller between a first position in which the first and second pinchers are positioned to deform the fluid nozzle element and a second position in which the first and second pinchers are positioned such that the fluid nozzle element is undeformed by the first and second pinchers.

* * * * *